United States Patent [19]

Akisada et al.

[11] Patent Number: 5,157,436
[45] Date of Patent: Oct. 20, 1992

[54] APPARATUS FOR MAKING A COLOR PROOF

[75] Inventors: Masahide Akisada; Kazuya Fujimoto; Takatugu Kusayanagi, all of Kanagawa; Yasunobu Tanaka, Tokyo, all of Japan

[73] Assignee: Fuji Photo Film Co., Ltd., Kanagawa, Japan

[21] Appl. No.: 706,150

[22] Filed: May 28, 1991

[30] Foreign Application Priority Data

| May 28, 1990 | [JP] | Japan | 2-137358 |
| May 28, 1990 | [JP] | Japan | 2-137359 |
| May 28, 1990 | [JP] | Japan | 2-137360 |
| May 28, 1990 | [JP] | Japan | 2-137361 |

[51] Int. Cl.$^5$ .................. G03B 27/32; G03B 27/52
[52] U.S. Cl. .................. 355/27; 355/100; 355/106
[58] Field of Search .................. 355/27, 100, 106

[56] References Cited

U.S. PATENT DOCUMENTS 4,547,066 10/1985 Murai .................. 355/100

FOREIGN PATENT DOCUMENTS 289057 3/1990 Japan.

Primary Examiner—Monroe H. Hayes
Attorney, Agent, or Firm—Sughrue, Mion, Zinn, Macpeak & Seas

[57] ABSTRACT

An apparatus for making a color proof. An original loading portion having a loading opening provided for loading the original is disposed side by side at an exposure portion so that a carriage may be substantially horizontally moved between the exposure position of the exposure portion and the copy exchange position of corresponding to the loading opening. When the original is exchanged and recharged, the loading opening is open by a lid member and when the carriage is positioned to the copy exchange position, the original is placed. Since the exposure portion and the like are not disposed upwardly of the original loading portion, the exposure unit and the like are not mounted with the result that the lid member can be made compact and lightweight while exchange of the original can be eased. In addition, the carriage is not withdrawn into the working space allowed for the operators.

18 Claims, 43 Drawing Sheets

APPARATUS FOR MAKING A COLOR PROOF

BACKGROUND OF THE INVENTION

1. Field of the Invention

The present invention relates to making a color proof with a photosensitive material, which may be used as the quality of a color print is checked.

2. Description of the Related Art

In general, when a large quantity of color prints, for example, color bills (known as inserted bills) as appended to a newspaper, or the like are printed by a printing machine, their copy is usually checked using an apparatus for making a color proof before actually being printed by the printing machine. The apparatus for making the color proof includes a platen portion, to which a photosensitive material and a developed original, which is developed after its image is exposed, are each conveyed and positioned, a corresponding exposure portion disposed proximate the platen portion for exposing the image recorded on the original onto the photosensitive material, a processor portion for developing the photosensitive material and a transfer portion for transferring the exposed photosensitive material from the platen portion to the processor portion. A plurality of the originals forms a single unit and the image is exposed onto the plurality of films for each color-separated composition and then subject of to a developing operation. The apparatus sequentially exposes the images originals to a single photosensitive material positioned on the above-described platen using the above-described exposure portion. The exposed photosensitive material is conveyed from the platen portion through the transfer portion to the processor portion where it is subjected to developing, bleaching-/fixing, rinsing and drying operations respectively. The quality of the image can then be checked prior to being actually printed. Thus, when the image rerecord on the photosensitive material is not acceptable because of color tone or its layout and the like, or any printing error is detected. The original can be revised before actually being printed in large quantities.

Incidentally, in the above-described apparatus, the original is placed on a carriage to be treated. The carriage is disposed between an exposure unit such as a light source, which is provided with the exposure portion, and the platen portion where the photosensitive material is positioned, and light beams emitted from the light source pass through the original to the photosensitive material so that the image of the original is exposed to the photosensitive material. In addition, as described above, in this apparatus, since a plurality of original images are sequentially exposed onto the single photosensitive material positioned on the platen portion, the original charged on the carriage is exchanged, while the photosensitive material remains positioned on the platen.

This original is exchanged and charged by opening a lid portion provided on the upper portion of the apparatus. At this lid portion, the above-described exposure unit such as the light source or the like is mounted, and when it is open, the carriage is exposed to allow exchange and loading of the original. In addition, since, with this lid portion open, the interior of the exposure portion becomes bright, a light shielding member such as a black-out curtain or the like is provided upwardly of the platen portion, where the photosensitive material is positioned, in order to prevent exposure of the photosensitive material. The light shielding member is repeatedly tensioned and retracted each time the lid portion is open and closed, as the original is exchanged or charged, to prevent exposure of the photosensitive material to light, which can be caused by leakage of the light to the platen.

However, as described above, since the exposure unit, such as the light source or the like, is mounted at the lid portion, the lid portion can become bulky and overweight while the exposure unit stands in the way as the original is exchanged and recharged, which makes it difficult for operators to exchange and recharge the original. In order to solve this problem, an apparatus with a pull-out type carriage adapted for the same purpose is also available, but is not easily operable because the carriage must be withdrawn into the working space allowed for the operator.

As described above, according to the conventional apparatus, it is necessary an operator to open and close the bulky lid portion or to withdraw the carriage into the working space the operator while the original is charged or exchanged. This poses a great burden on the operator, thus lowering the working efficiency of the device.

In addition, as describe above, when the exposure of the photosensitive material to light is to be prevented by the light shielding member, which repeatedly overhangs and retracts each time the original is exchanged and recharged, extra time is needed until the exposure portion is securely darkened by means of the light shielding member such as the dark-out curtain, resulting in a reduced working efficiency. In addition, since a boundary between the dark chamber portion and the bright chamber portion occupies the substantially entire area of the platen portion, the light shielding member can become bulky thus requiring a complicated driver means.

In view of the foregoing circumstances, the present invention was made and its object lies in achieving an apparatus for making color proof which allows working efficiency when the original is exchanged, to be increased.

SUMMARY OF THE INVENTION

In order to achieve the above-described end, the apparatus according to the present invention comprises a platen portion, where a photosensitive material and an original are each conveyed and positioned, an exchange portion, which opposes the platen portion, for printing an image recorded on the original onto the photosensitive material, an original loading portion disposed side by side with the exposure portion and provided with a loading opening for loading the original, a lid portion for opening and closing the loading opening, a carriage for substantially horizontally moving between the exposure position of the exposure portion and the copy exchange position corresponding to the loading opening, where the original is to be placed thereon, and a processor portion disposed side by side with the platen portion for transferring the exposed photosensitive material from the platen portion to the processor portion.

In addition, the above-described apparatus is preferably provided with a partitioning plate disposed between the original loading portion and the exposure portion and formed with a window for passing the carriage therethrough and a light shielding member, moving together with the carriage, for closing the window and insulating the light as the carriage is positioned at the copy exchange position.

Further, an inhibitor means is preferably provided to inhibit movement of the lid portion in the direction of opening the loading opening as the window is not closed by the light shielding member.

Still further, the invention is preferably provided with guide shafts each disposed at both end portions of the carriage, as viewed in its crosswise direction, and coaxially in the moving direction of the carriage, separated at the exposure portion and the original loading portion, with the window as its boundary, and a plurality of supporting members interposed between the carriage and the guide shaft to support the carriage against the guide shaft. When part of the supporting members passes through the above-mentioned separating portion, the other part of the supporting members is each supported against the guide shaft disposed at both end portion of the carriage, as viewed in the crosswise direction, so that the carriage is supported of two points as viewed in the feeding direction.

In addition, the apparatus is preferably provided with a lid member provided corresponding to the window for closing the window by a force energized by the energizing means while, pressed as the carriage is moved from the exposure portion toward the original loading portion, it is withdrawn from the closing position of the window against the energizing means.

In the present invention, an original loading portion provided with a loading opening for loading the original is disposed side by side with the exposure portion so that the carriage may be substantially horizontally shifted between the exposure position of the exposure portion and the copy exchanging position corresponding to the loading opening. When the original is exchanged and recharged, the loading opening is open by the lid member and, with the carriage positioned at the copy exchanging position, the original is placed thereon. Since the exposure portion and the like are not disposed upwardly of the original loading portion, it is not necessary to mount the exposure unit and the like at the lid member, and the lid member can be made compact and lightweight to allow easy exchange of the originals. In addition, the carriage is not withdrawn into the working space allowed for the operator. In consequence, a burden placed on the operator can be reduced and the working efficiency is accordingly improved.

Incidentally, the apparatus is preferably provided with a partitioning plate disposed between the original loading portion and the exposure portion and formed with a through hole through which the carriage passes, and a light shielding member shifted along with the carriage for closing the window, with the carriage positioned at the original loading portion, to screen the light. The exchange and reloading of the original may be performed, with the carriage positioned at the copy exchange position corresponding to the loading opening of the original loading portion, in which condition, the light shielding member closes the window. As a result, even if the loading opening is open as the original is exchanged and recharged, no light cannot enter the exposure portion through the window. In addition, the window may be of size large enough for the carriage to pass therethrough, and need not provide for a size corresponding to the entire area of the platen portion. Therefore, the light shielding member for closing the window can be made compact. In addition, since the window screens light moved along with the carriage, a drive means or the like becomes unnecessary to move the light shielding member resulting in a simplified device.

In addition, when the window is not blocked by the light shielding member, an inhibitor means for inhibiting movement of the lid member in the direction of opening the loading opening is preferably provided. As a result, since movement of the lid member in the direction of opening the hole as, for example, the carriage is being shifted, it is impossible for the lid portion to accidentally open so that light enters the exposure portion.

In addition, an inhibitor means for inhibiting movement of the lid portion in the direction of opening the loading opening is preferably provided as the window is not closed by the light shielding member. As a result, since movement of the lid portion in the direction of opening the hole is inhibited while, for example, the carriage is being moved, it is impossible for the lid portion to be accidentally open so that light enters the exposure portion.

In addition, the apparatus is preferably provided with guide shafts each disposed at both end portions of the carriage, as viewed in the crosswise direction, and separated into the exposure portion side and the original loading portion side, with the window as its boundary to run coaxially in the traveling direction of the carriage, and a plurality of supporting members interposed between the carriage and the guide shaft to support the carriage against the guide shaft. When part of the supporting members passes through the above-mentioned separating portion, the other part of the same is each supported against the guide shaft disposed at both end portions of the carriage, as viewed in the crosswise direction. This provides for two, supporting points as viewed in the feeding direction. As a result, since the carriage is supported by the guide shafts respectively, it is stabilized without sloping in the crosswise direction while being stably moved without sloping in the feeding direction because it is supported at two or more supporting points. In consequence, the carriage cannot be moved or offset away from the guiding direction of the guide shaft, with the result that it can be smoothly moved between the exposure portion and the original loading portion.

Still further, the apparatus is preferably provided with a lid member provided corresponding to the window for closing the window by the force energized by the energizing means while being pressed as the carriage is moved from the exposure portion toward the original loading portion to exit from the closing position of the window against the force of the energizing means. As a result, when the carriage is present at the exposure position of the exposure portion, the light insulating condition of the exposure portion may be held by the lid member. When the carriage is moved from the exposure portion toward the original loading portion, the lid member is pressed by the carriage and, as the carriage moves, the lid member is moved against the above-described energized force. As a result, the lid member can be withdrawn from the closing position of the window and the carriage can be smoothly moved to the original loading portion. As described above, since the lid member can be open and closed as the carriage moves, the arrangement of the apparatus becomes simple and the exposure portion can be reliably screened from light.

BRIEF DESCRIPTION OF THE DRAWINGS

The present invention is now hereinafter described in greater detail with reference to the accompanying drawings in which.

DETAILED DESCRIPTION OF THE PREFERRED EMBODIMENT

Figure 1:
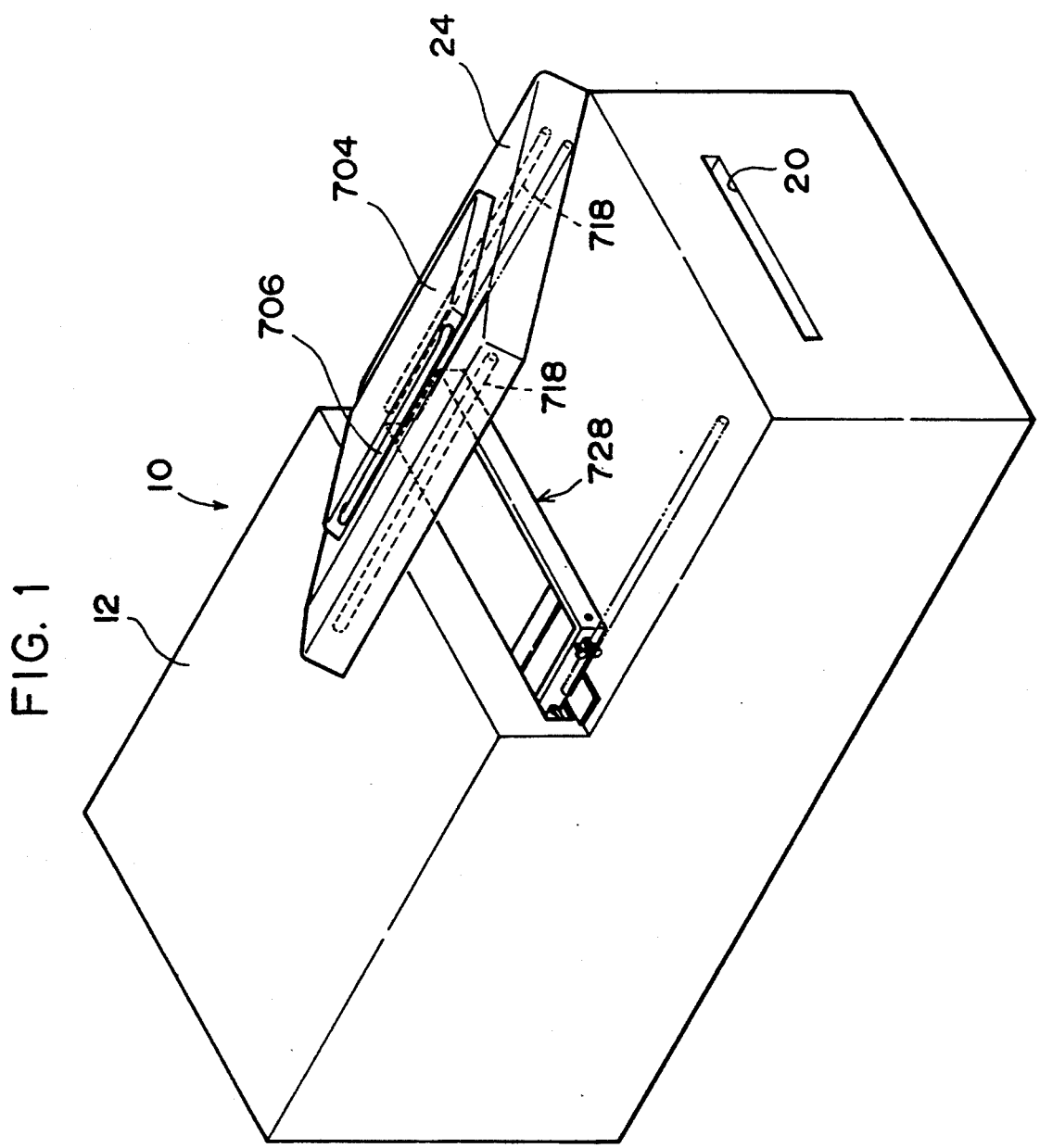
FIG. 1 is a perspective view illustrating an apparatus for making a color proof according to the present invention.
Figure 2:
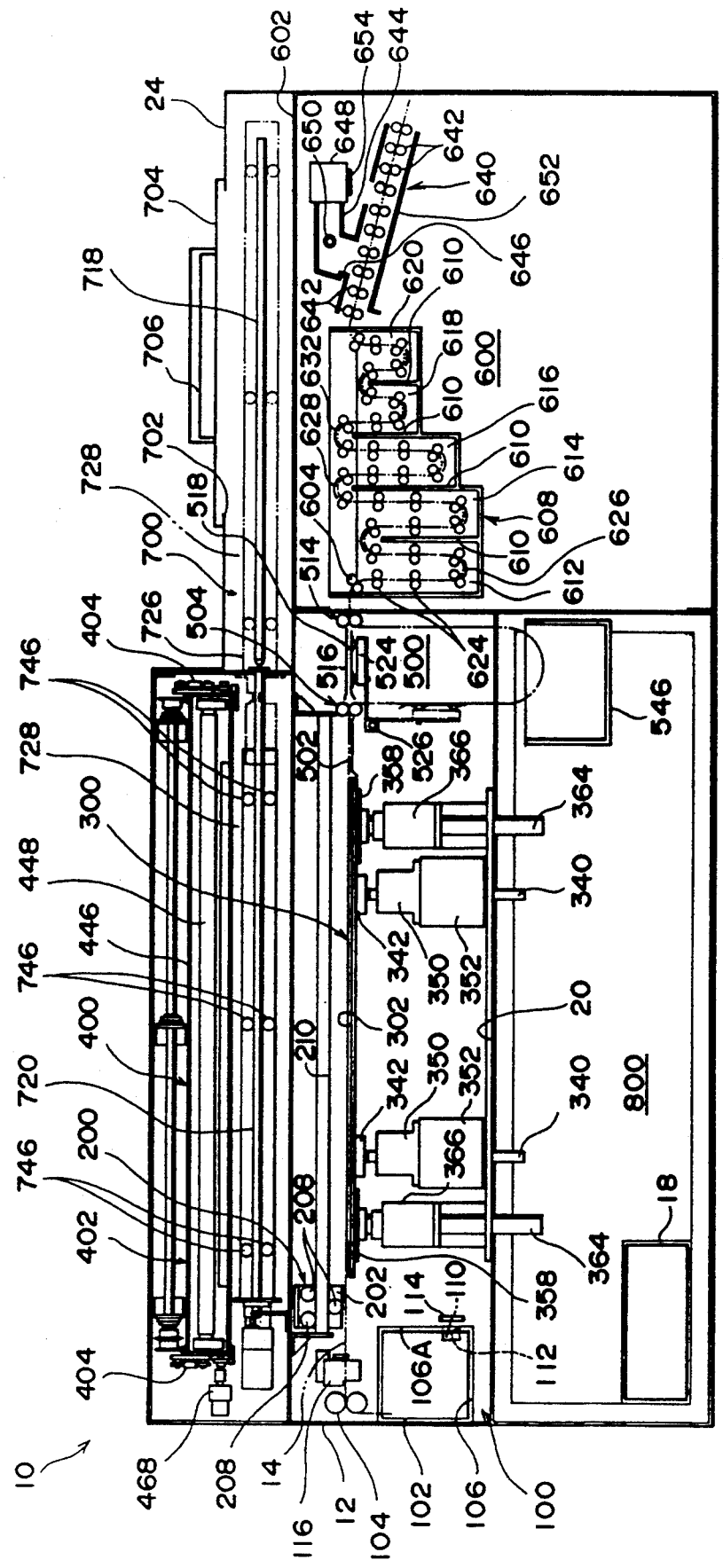
FIG. 2 is a schematic frontal view illustrating the internal structure of the apparatus of FIG. 1.
Figure 3:
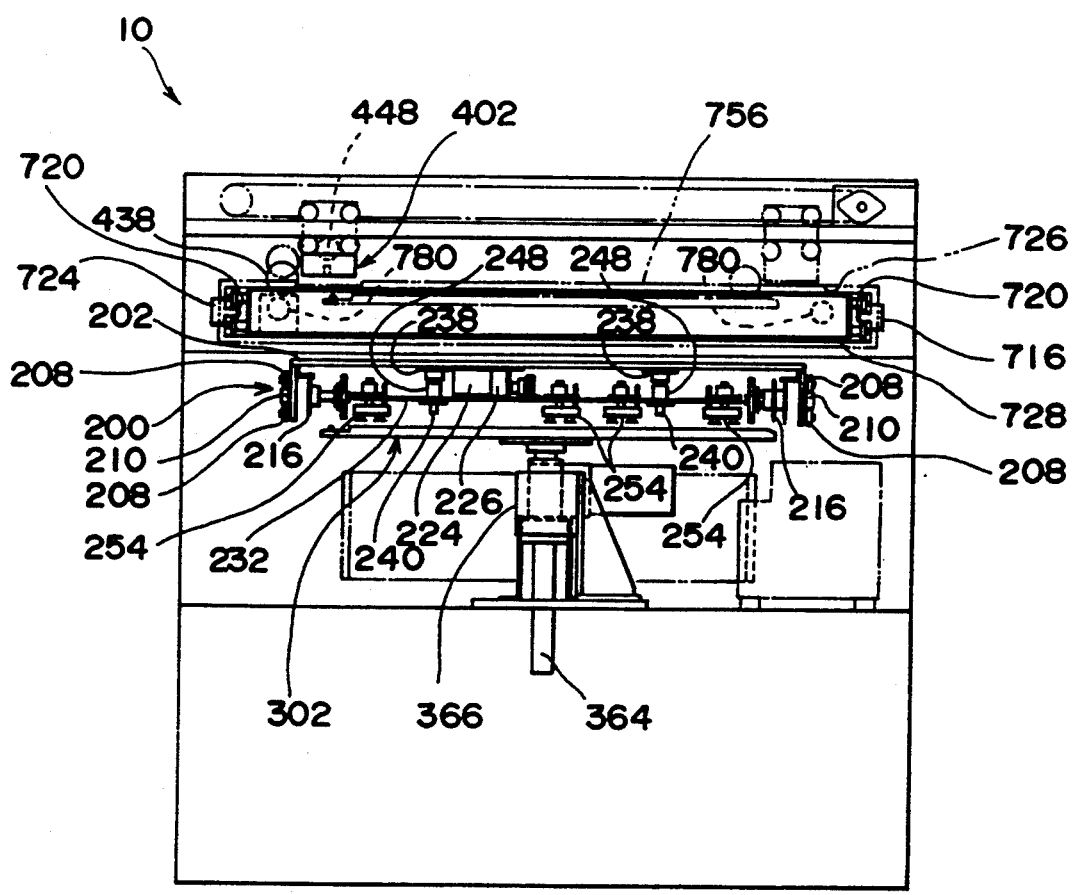
FIG. 3 is a schematic lateral view illustrating the internal structure of the apparatus.

FIGS. 1 through 3 illustrate an apparatus 10 for making a color proof according to the present invention. First, the entire arrangement of the same is described.

(1) A magazine loading portion 100 is disposed at the left lateral surface of its casing 12, as viewed in FIG. 2, in which a magazine 100 storing a photosensitive material 14 (see also FIG. 4) is charged. The tip end portion of the photosensitive material 14 is pulled out from the magazine 102 in the upward direction of FIG. 2 and is converted in direction by 90 degrees wound about a pair of rollers 104 to be horizontally conveyed. The photosensitive material 14, is then fed to (3) a platen 300 disposed adjacent to the magazine loading portion 100 by (2) a photosensitive material feeding portion 200. In addition, upwardly of this platen portion 300, as viewed in FIG. 2, (4) an exposure portion 400 is disposed and a light source unit 402 of this exposure portion 400 reciprocates along the platen 302 in the direction intersecting at a right angle with the feeding direction of the photosensitive material 14.

In the apparatus 10 according to the present invention, (5) a photosensitive material transfer portion 500 and (6) a processor portion 600 are provided side by side. The transfer portion 500 passes the photosensitive material 14 exposed at the platen portion 300 over to the processor portion 600, where the photosensitive material is subjected to developing, bleaching/fixing and rinsing treatments respectively to be delivered after dried.

Figure 27:
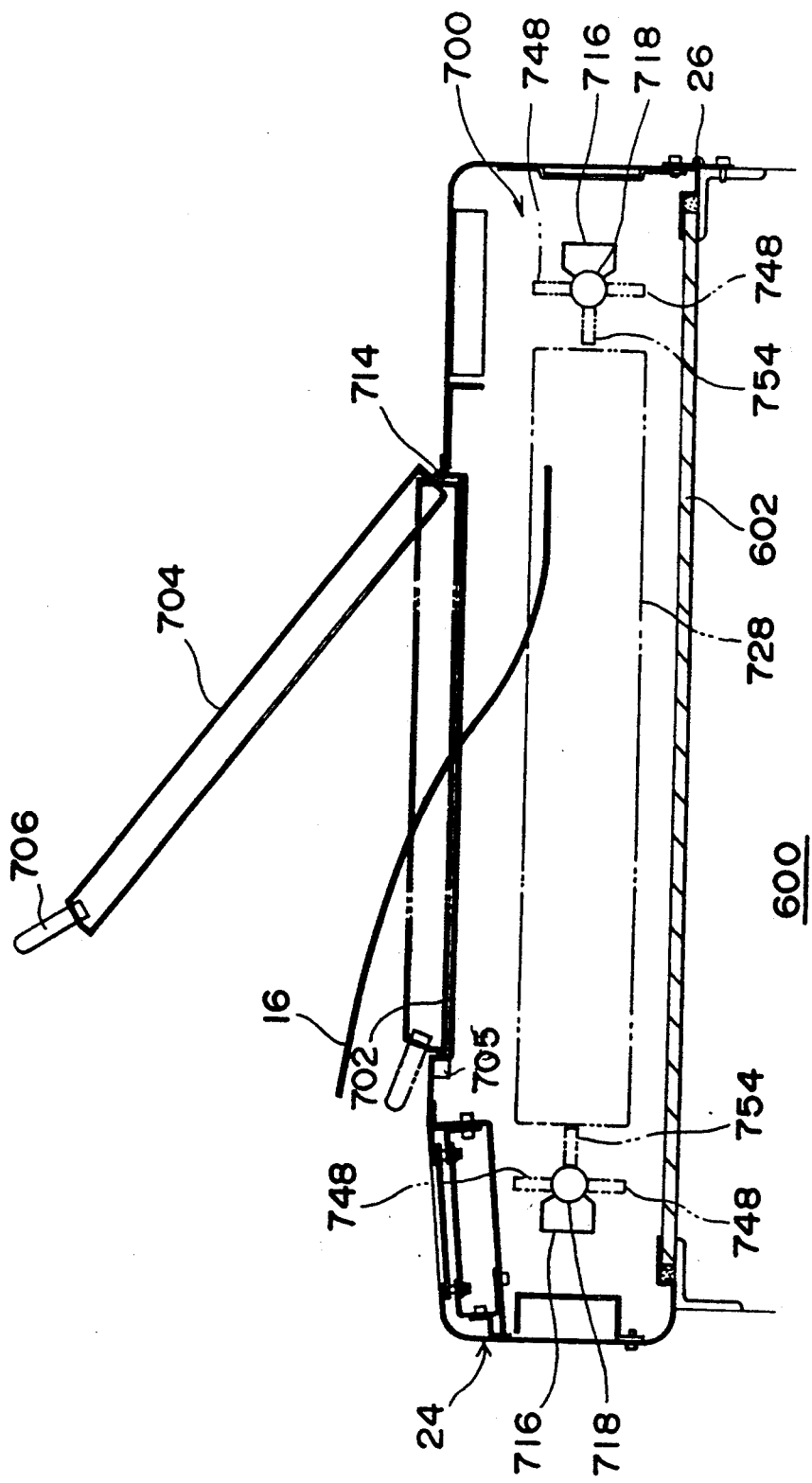
FIG. 27 is a lateral cross-sectional view of a film loading portion.

The upper side of the processor portion 600, as viewed in FIG. 2, is intended for providing (7) a film loading portion 700 for loading the original 16. (see FIG. 27) This film loading portion 700 is disposed upwardly of a ceiling member 602 of the processor portion 600. As a result, the height of the film loading portion 600 is relatively low, on the order of the height of the operator's waist. The film loading portion 700 is covered with a large lid 24, which is mounted via a screw 26. Therefore, the large lid 24 may be open by turning the lid 24 in the clockwise direction of FIG. 1, with the hinge 26 as its axis. In addition, as shown in FIG. 27, a rectangular hole 702 which serves as the original loading opening is provided at this large lid 24 and further, corresponding to the rectangular hole 702, a small hole 704 is attached as the lid portion via a hinge 714. The small lid 704 is open by turning it from this side of the apparatus 10, as viewed in FIG. 2, toward its innermost side by grasping a handle 706. This small lid 704 is open as the original 16 is charged into the film loading portion 700. Incidentally, a locking means 705 which serves as an inhibitor means is mounted at the edge of the rectangular hole 702. The locking means 705 may be locked with the small lid 704 closed.

An enframed supporting base 728, which forms the carriage, is disposed on the film loading portion 700 so as to reciprocate relative to the exposure portion 400. That is, the film loading portion 700 and the exposure portion 400 are in communication with the rectangular hole 726. This rectangular hole 2 is open while the supporting base 728 is moving but is otherwise blocked. An overlay sheet 708 (see FIG. 28) on which the original is placed is attached to the supporting base 728.

The supporting base 728 conveys the original 16 placed on the overlay sheet 708 at the film loading portion 700 toward the exposure portion 400 to expose the image recorded on this original 16 to the photosensitive material 13, and returns it again to the film loading portion 700 after completion of the exposure. The apparatus according to the present invention is intended for checking whether the layout, color, and print is proper prior to making an actual regular print using each original 16 separated in color into a Y—, M—, C— and BK (black)-print, and positions the original one by one, closely overlapping it with the photosensitive material 14 for exposure to make a color picture. By so doing, the errors of the original can be detected so that the copy can be in advance and modified. Incidentally, in this embodiment, when a positive type photosensitive material is used, as the original 16, BK print is overlapped on the Y print, BK print on the M print, BK print on the C print to make them closely adhere to the photosensitive material 14 to expose using B (blue), G (green) and R (red) filters 480 respectively. When a negative type photosensitive material is used, Y, M, C and BK prints, which are originals 16, are sequentially closely adhered to the photosensitive material while the B (blue), G (green), R (red) and BK (black) filters are used for exposure.

Disposed downwardly of the platen portion 300, as viewed in FIG. 2, is (8) a control unit 800, which controls feeding of the photosensitive material 14, driving of the supporting base 728 at the film loading portion 700, exposure of the exposure portion 400, temperature of the treating solution at the processor portion 600, heater temperature, feeding speed and the like.

The arrangement of each portion (1) to (8)) above is hereinafter described in greater detail.

(1) MAGAZINE LOADING PORTION 100

Figure 4:
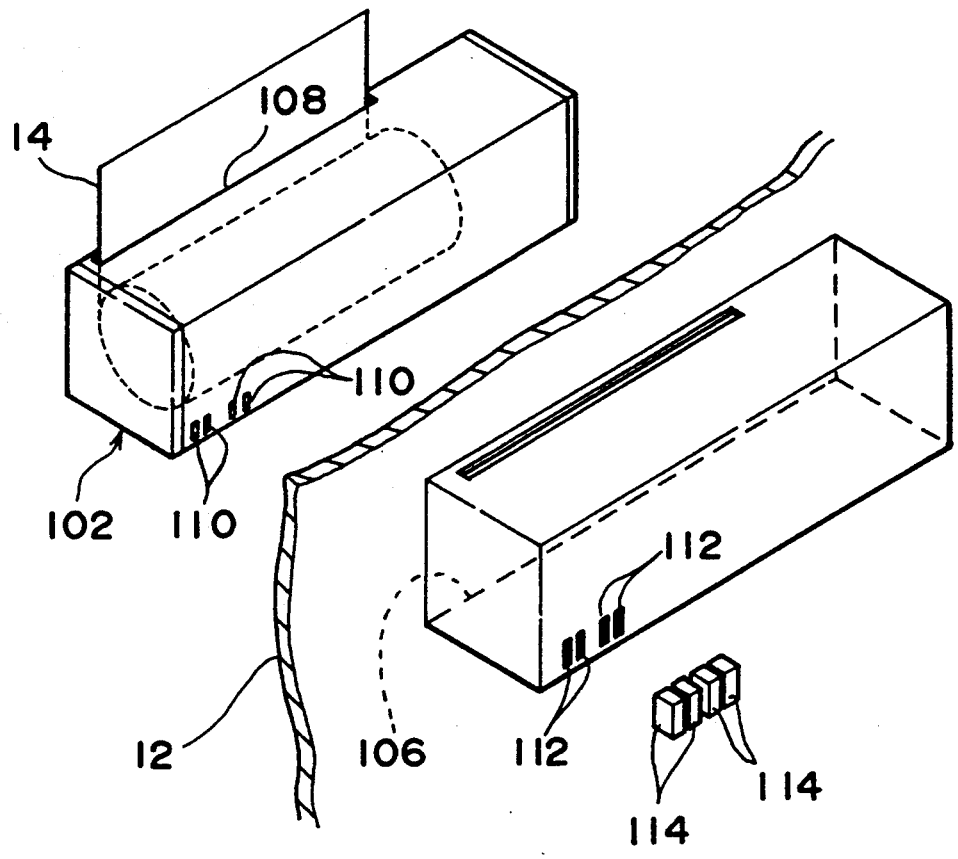
FIG. 4 is a perspective view illustrating a magazine loading portion.

As shown in FIG. 4, a rectangular recess is provided on the left lateral surface of the apparatus 10 to serve as a chamber 106 for loading with the magazine 102. The magazine 102 is a box-type and a hole 108 for withdrawing the photosensitive material 14 stored in a rolled form is provided on its upper surface. The hole 108 is in communication with the interior of the magazine 102, but entrance of light therethrough is prevented.

A light reflecting sheet 110 is adhered to the wall surface opposed of the magazine 102 opposed to the loading chamber 106. There are at most four light reflecting sheets 110 depending on the kind or size of the stored photosensitive material 14, and the presence or absence of each sheet is determined to determine the kind and size of the photosensitive material 14. In this embodiment, as the photosensitive materials, three kinds are available such as the positive, and negative paper or positive film, and as for the crosswise dimension, three size are available. Either one of the nine (3×3) available photosensitive materials 14 is stored within the magazine 102. The kind of the photosensitive material 14 stored within the magazine 102 is distinguished depending on the arrangement of light reflecting sheets 110 are adhered to the magazine 102 or not.

Four rectangular holes 112 are provided on the innermost wall surface 106A of the loading chamber 108 corresponding to the light reflecting sheets 110.

A photoelectric sensor 114 is disposed on the rear surface of the wall surface 106A, corresponding to each rectangular hole 112. Photoelectric sensors 114 are comprised of a light emitting element and a light receiving element, and a signal line of the latter is connected to the control unit 800. When the light reflecting sheet 110 is adhered to the magazine 102, light emitted from the light emitting elements of the sensor 114 passes through the rectangular hole 112 to reflect against the sheet 110 to be received again by the sensor 114. As a result, the presence or absence of each reflecting sheet 110 is converted into an electrical signal to be supplied to the control unit 800.

When the magazine 102 is charged into the loading opening 106, the loading chamber 106 is screened and entry of light from the chamber 106 into the apparatus 10 is blocked.

With the magazine 102 charged into the loading chamber 106, a guide plate (not shown) is provided at the upper position of the withdrawing hole 108, and the photosensitive material 14, guided by this guide plate, is pinched by the pair of rollers 104 (see FIG. 2).

This pair of rollers 104 is coupled to the driving shaft of the motor (omitted). The motor is connected to the control unit 800 and its operation is controlled by the control unit 800 so that the photosensitive material 14 may be converted by 90 degrees in direction and fed.

A cutter 116 is disposed on the feeding passageway of the photosensitive material 14. The cutter 116 is connected to the control unit 800. At the moment the photosensitive material is fed by a predetermined amount, a signal is emitted from the control unit 800 and the cutter is actuated to cut the photosensitive material.

(2) Photosensitive Material Feeding Portion 200

Figure 5A:
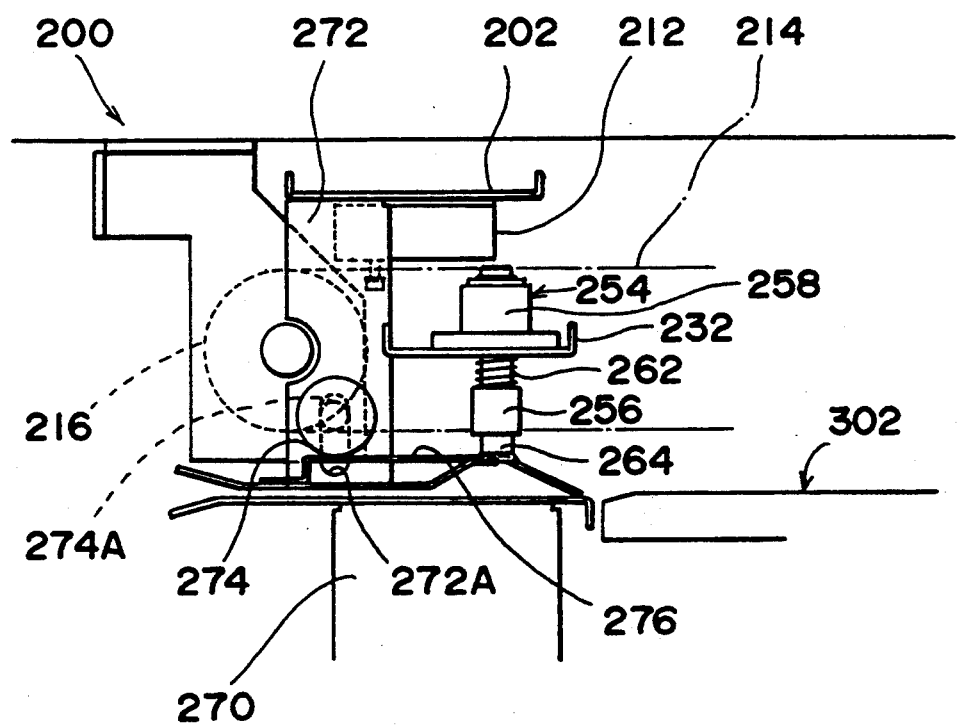
FIG. 5A is a frontal view of a photosensitive material feeding portion.
Figure 5B:
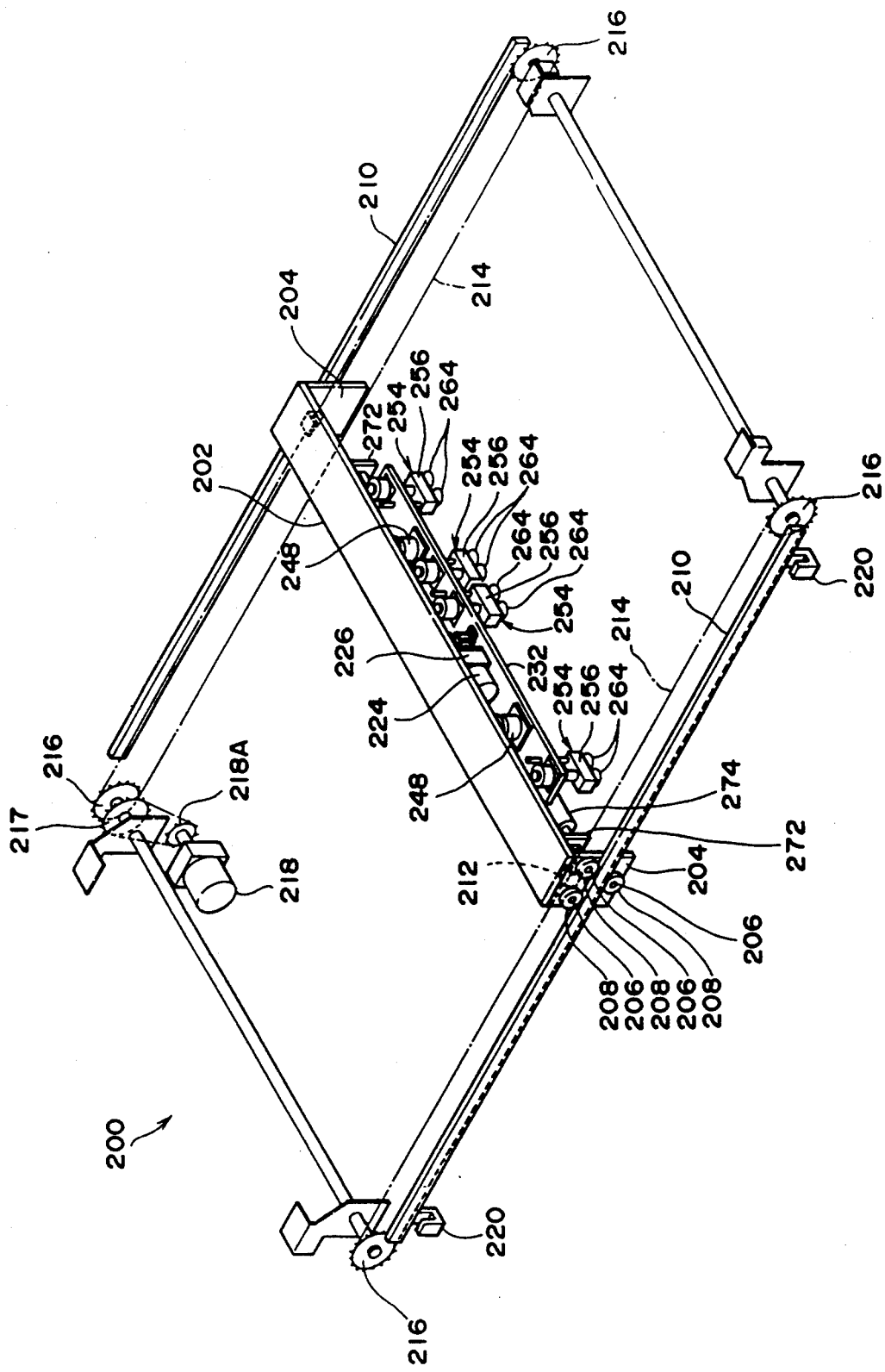
FIG. 5B is a perspective view of the photosensitive material feeding portion.

As shown in FIG. 5A and FIG. 5B, a transfer member 202 which constitutes part of the photosensitive material 200 is disposed along the extension of the photosensitive material 14, as viewed in the feeding direction. The photosensitive material 14 is further conveyed to a predetermined position by this transfer member 202.

As shown in FIG. 5B, the transfer member 202 is disposed so that its longitudinal direction may coincide with the crosswise direction of the photosensitive material 14. Tripod plates 204 which run parallel to each other depend at both end portions of this transfer member 202, as viewed in the longitudinal direction. Three shafts 206 disposed at predetermined intervals in the vertical direction protrude in the outward direction from the lateral surface of each tripod plate 204. (two for the upper side and one for the lower side) A roller 208 is supported against each shaft 206. A pair of rollers 210 extending in the feeding direction of the photosensitive material is pinched between two rollers 208 supported against the upper shaft and one roller 208 supported against the lower shaft 206. As a result, the transfer member 202 is supported against a rail 210 by the roller 208 and is capable of moving along the rails 210.

In addition, a bracket 212 is mounted adjacent to both end portions of the transfer member 202, as viewed in the longitudinal direction, and is anchored to part of a chain 214 disposed along the rail 210. The chain is looped and is tensioned about a pair of sprockets 216 disposed adjacent to both end portions of the rail 210, as viewed in the longitudinal direction. One sprocket 216 is coupled to a rotating shaft 218A of a motor 218 via a coupling means 217.

When the motor 218 is driven, this driving force is transmitted to rotate the sprockets 216, which in turn causes the transfer member 202 to move along the rails 210.

Incidentally, the transfer member 202 can reciprocate along the rails 210 by the clockwise and counterclockwise rotation of the motor 218. Photoelectric sensors 220 are each provided adjacent to both end portions of the rail 210, as viewed in the longitudinal direction. The signal lines of these photoelectric sensors 220 are each connected to the control unit 800. The light emitting portion and the light receiving portion of the photoelectric sensor 220 are positioned opposed to each other at both sides of the transfer passageway of the tripod plate 204 of the transfer member 202. The sensors 220 are each disposed corresponding to the stopping position of the transfer member 202. As a result, the control unit 800 can sense the stopping position of the transfer member 202 in accordance with the signal from the sensor 220.

Figure 6:
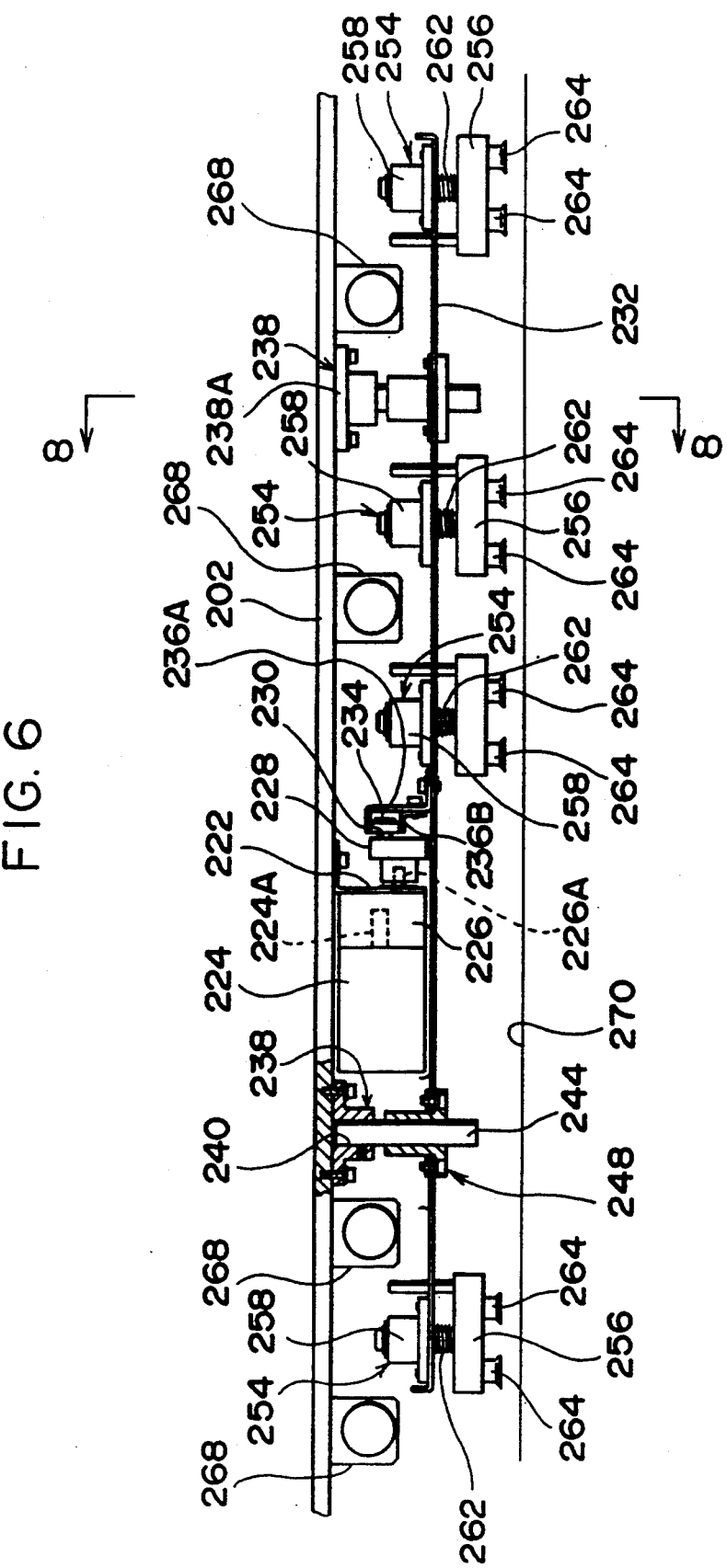
FIG. 6 is a right side lateral view of the photosensitive material feeding portion of FIG. 5B.
Figure 7:
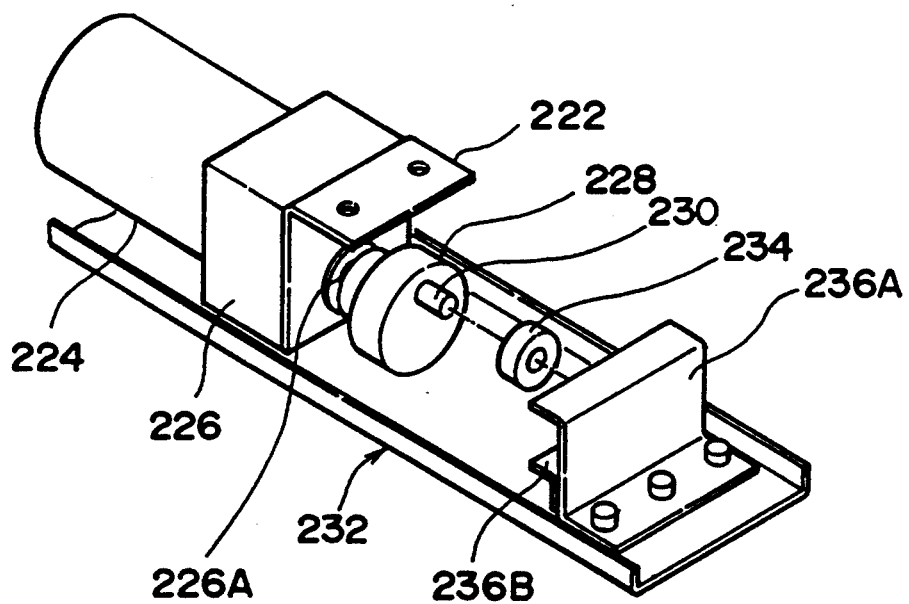
FIG. 7 is a perspective view of a motor.

As shown in FIGS. 6 and 7, on the lower end surface of the transfer member 202, a motor 224 is mounted via a flange 222. The motor 224 is connected to the control unit 800. A rotating shaft 224A of the motor is coupled to a gear box 225, which reduces the speed of the rotating shaft 224A to transmit the torque to an output shaft 226A to rotate the latter 226A. A circular cam 228 is mounted to the output shaft 226A and on the end surface of the cam 228, a connecting shaft 230 is mounted at a position eccentric from its axis. This connecting shaft 230 is disposed downwardly, as viewed in FIG. 6, while being inserted into a bearing 234 provided at a supporting plate 232 running parallel to the transfer member 202. The outer circumference of the bearing 234 is fixed by means of two brackets 236A and 236B mounted on the upper surface of the supporting plate 232. As a result, the bearing 234 is moved along with the supporting plate 232.

In this case, when the motor 224 is driven, the output shaft 226A of the gear box 226 is rotated at a reduced speed and the connecting shaft 230 is rotated about the axis of the cam 228. When the connecting shaft 230 makes a turn, the bearing 234 reciprocates in the directions coming close to and moving away from the transfer member 202, that is, in the vertical direction, as viewed in FIG. 6.

Figure 8:
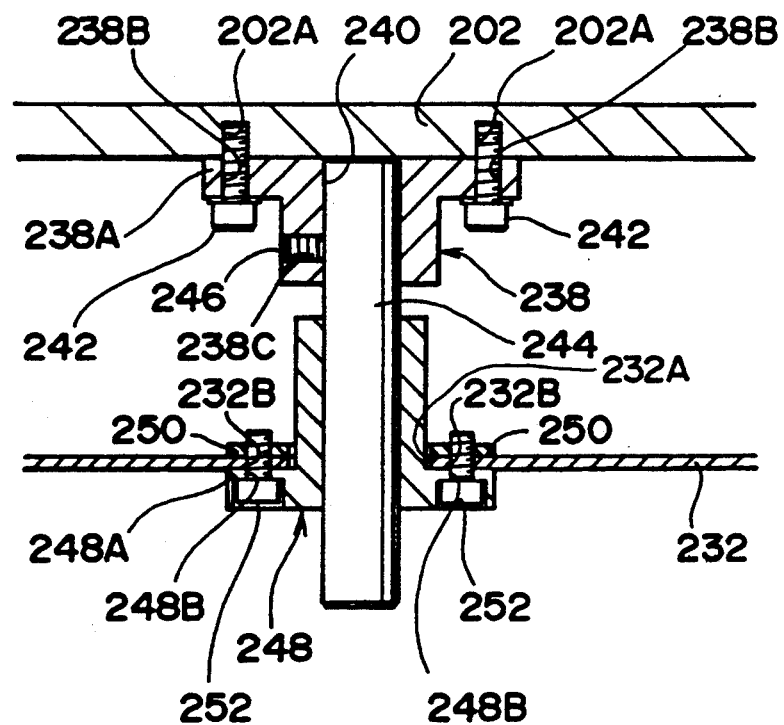
FIG. 8 is a cross-sectional view taken along the line 8—8 of FIG. 6.

As shown in FIG. 8, internally of the transfer member 202 relative to the pair of tripod plates 204, fixed bases 238 are each mounted at positions equal from each tripod plate 204. The fixed base 238 is of cylindrical form with a circular hole 240 provided at the axis portion and, at its end portion at the side of the transfer member 202, a flange portion 238A protruding in the radial direction is formed. A plurality of circular holes 238B are provided at this flange portion 238A while, correspondingly thereto, female threads 202A are formed on the transfer member 202. In this case, a bolt 242 is forced into the circular hole 238B to engage the female thread 202A to fix the fixed base 238 to the transfer member 202.

One end of a shaft rod 244 is inserted into the circular hole 240 of the fixed base 238. The shaft rod 244 is fixed by a screw 246 screwed into a female thread hole 236C, which is forced from the outer periphery of the fixed base 238 into a circular hole 240.

The other end of the shaft rod 244 passes through the circular hole of a circular sliding base 248 provided on the supporting plate 232 so as to move in the axial direction. The sliding base 248 is inserted into a circular hole 232A provided at the supporting plate 232. A flange portion 248A protruding in the radial direction is formed in the end portion of the sliding base 248, as viewed in its axial direction. This flange portion 248A abuts the lower end surface of the supporting plate 232. A circular hole 248B is provided at the flange portion 248A. A circular hole 232B is provided at the supporting plate, corresponding to this circular plate 248B and a nut plate 250 is deposited on its upper surface. As a result, a bolt 252 may be forced into the circular hole 248B of the flange portion 248A and the circular hole 232B of the supporting plate 232 to engage the nut plate 250 to fix the sliding base 248 to the supporting plate 232.

The shaft rod 244 fixed to the fixed base 238 and supported against the sliding base 248 restricts rotation of the supporting plate 232 as the supporting plate 232 reciprocates by rotation of the above-described motor 224 to guide it so as to reliably move only in the vertical direction.

As shown in FIG. 6, a plurality of sucker units 254 for sucking the photosensitive material 14, are mounted on the supporting plate 232. This sucker unit 254 is disposed in plural number according to the lateral dimension of the photosensitive material 14 in order to at least suck both end portions of the photosensitive material 13, as viewed in the lateral direction. Incidentally, in this embodiment, the number of the lateral dimensions of the photosensitive material applied is three and the sucker units 254 are each provided at a reference position of the photosensitive material 14 (dimension of its one end, as viewed in the lateral direction, is set constant for any photosensitive material 14) and at positions each corresponding to the other end portion, as viewed in the lateral direction. (four units in all)

Figure 9:
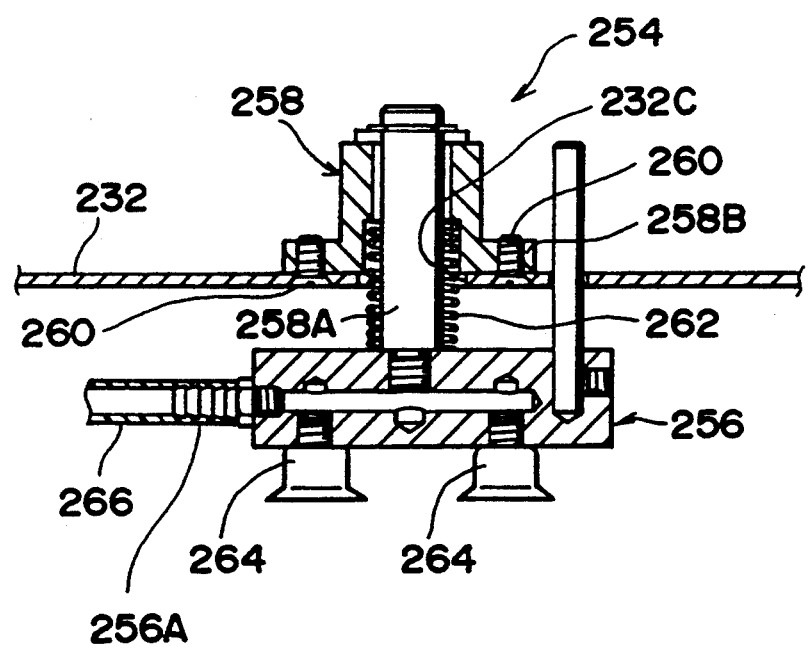
FIG. 9 is an enlarged view of a sucker unit.

As shown in FIG. 9, a window 232C is provided at the position of the supporting plate 232 where the sucker unit 252 is mounted. A shaft 258A of a damper 258 supporting the sucker base 256 is passed through the window 232C. The damper 258 supports the shaft 258A so as to move it in a predetermined amount the axial direction. A flange portion 258B is provided at the damper 258 and is fixed to the upper surface of the supporting plate 232 by means of a bolt 260. A coiled compression spring 262 is mounted at the shaft 258A between the supporting plate 232 and the sucker base 256, the spring 262 being energized in the direction separating, the sucker base 256 from the supporting plate 232.

Two suckers 264 of small dimension (about 15 to 20 mm in diameter) are provided side by side at the sucker base 256. Therefore, a suction force caused by a single sucker unit 254 is not focused on one position of the photosensitive material 14, acting in a relatively wide range. In addition, the suction force applied to the single sucker 264 can be made small. As a result, in this embodiment, the suction force applied to the sucker 264 can be made half as small as in a case in which the photosensitive material 14 is sucked by a single sucker unit 254 having a single sucker.

The suction surface of the sucker 264 and the interior of the sucker base 256 are in communication with each other. In addition, a suction nozzle 256A is provided at the sucker base 256 and is connected to a suction unit 18 (see FIG. 2) via a tube 266. The suction unit 18 is connected to the control unit 800, which controls its operation.

In addition, a solenoid valve 268 (see FIG. 6) attached to the transfer member 202 is interposed at the intermediate portion of the tube 266. The solenoid valve 268 is connected to the control unit 800, which opens and closes a line within the solenoid valve 268 to control suction and release of the photosensitive material by the sucker 264.

Disposed on the lower surface of the photosensitive material 14 is a base plate 270 (see FIG. 5A). When the photosensitive material 14 is sucked to the sucker 264, the above-described connecting shaft 230 is rotated by one half of a rotation to downwardly move the supporting plate 232 to pinch the photosensitive material 14 with the sucker 264 and the base plate 270. At this time, since the sucker base 256 is moved in the direction coming close to the supporting plate 232 against the energizing force of the coiled compression spring 262, the force by which the photosensitive material 14 is pinched by the sucker 264 and the base plate 270 can be held approximately constant.

The photosensitive material 14 sucked by the sucker 264 is sucked up by a further one half rotation of the connecting shaft 230 and, in this state, it is moved on the platen 302 of the platen portion 300 in a predetermined amount because the transfer member 202 is moved along the rails 210, to be severed by the above-described cutter 116 and further the tip end of the photosensitive material 14 is conveyed to a predetermined position.

When the photosensitive material 14 is conveyed to the predetermined position by the transfer member 202, the connecting shaft makes a half rotation and the photosensitive material 14 is placed onto the platen 302 to actuate the solenoid valve 268 to release the suction of the material with the result that the transfer member 202 and the photosensitive material 14 are separated.

Figure 10:
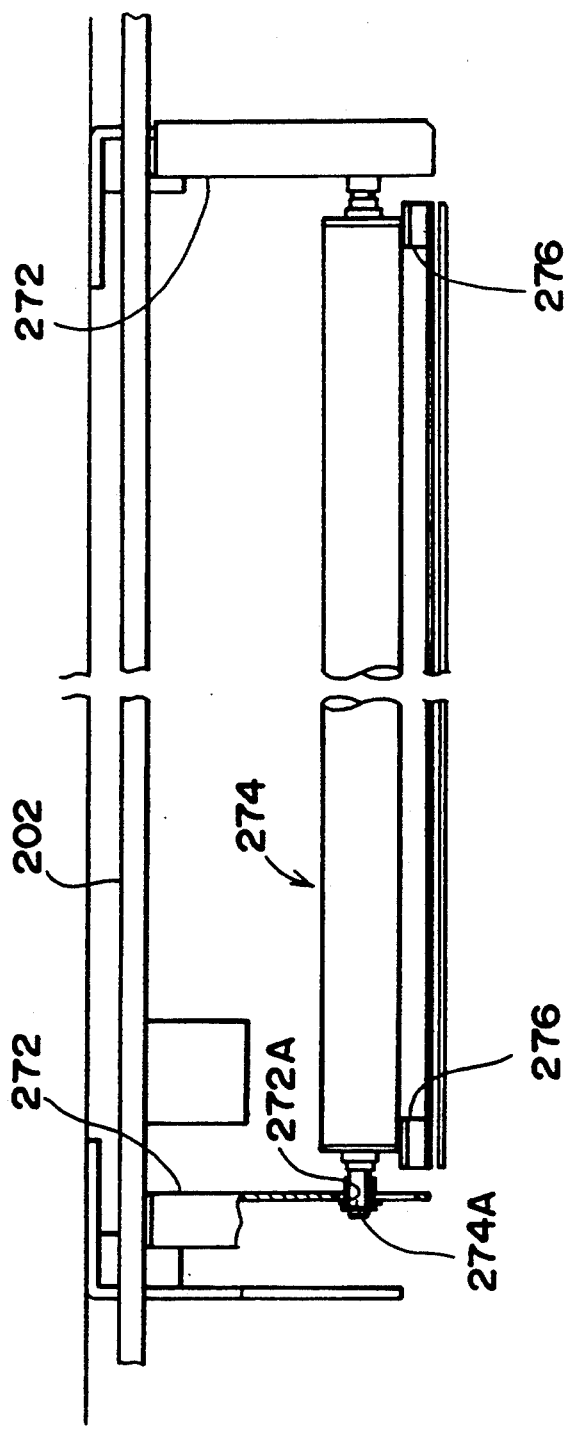
FIG. 10 is a right side lateral view of a photosensitive material squeeze roller of FIG. 5B.

As shown in FIG. 5A and FIG. 10, brackets 272 are each mounted at the transfer member 202 internally of the pair of tripod plates 204. An elongated hole 272A is provided in the vertical direction of each bracket 272 and a rotating shaft 274A of a squeeze roller 274 for the photosensitive material is suspended between two elongated holes 272A. With the rotating shaft 274A positioned at the lower end of the elongated hole 272A, this squeeze roller 274 is placed onto the platen 302 of the platen portion 300. In addition, a cam plate 276 is mounted at the base plate 270 and corresponding to the rotating shaft 274A of the squeeze roller 274. As a result, with the transfer member 202 stopped at the above-described original position, the squeeze roller 274 climbs up the cam plate 276 to form a gap between the same and the base plate 270. In consequence, the squeeze roller 274, which has stopped at the original position, cannot interfere with the photosensitive material 14 conveyed from the magazine loading portion 100.

When the transfer member 202 reciprocates, in the advancing stroke, the squeeze roller 275, placed on the photosensitive material 14, is moved without rotating while, in the returning stroke, it is moved while rotating on the photosensitive material 14. This rotating motion of the squeeze roller 274 in the returning stroke causes the air present between the photosensitive material 14 and the platen 302 to be squeezed out.

(3) Platen Portion 300

Figure 11:
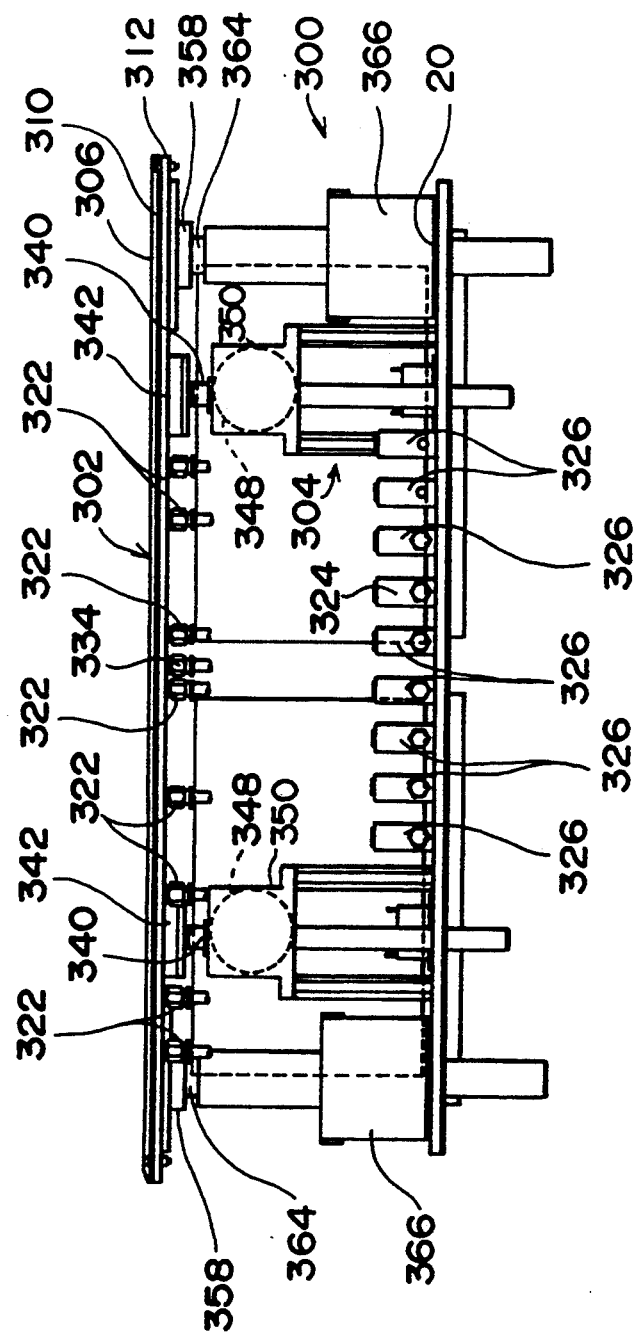
FIG. 11 is an exploded perspective view of a platen portion.

As shown in FIG. 11, the platen portion 300 is comprised of the platen 302 supported on the intermediate base of the apparatus 10 and a driving portion 304 for vertically moving this platen 302.

Figure 12:
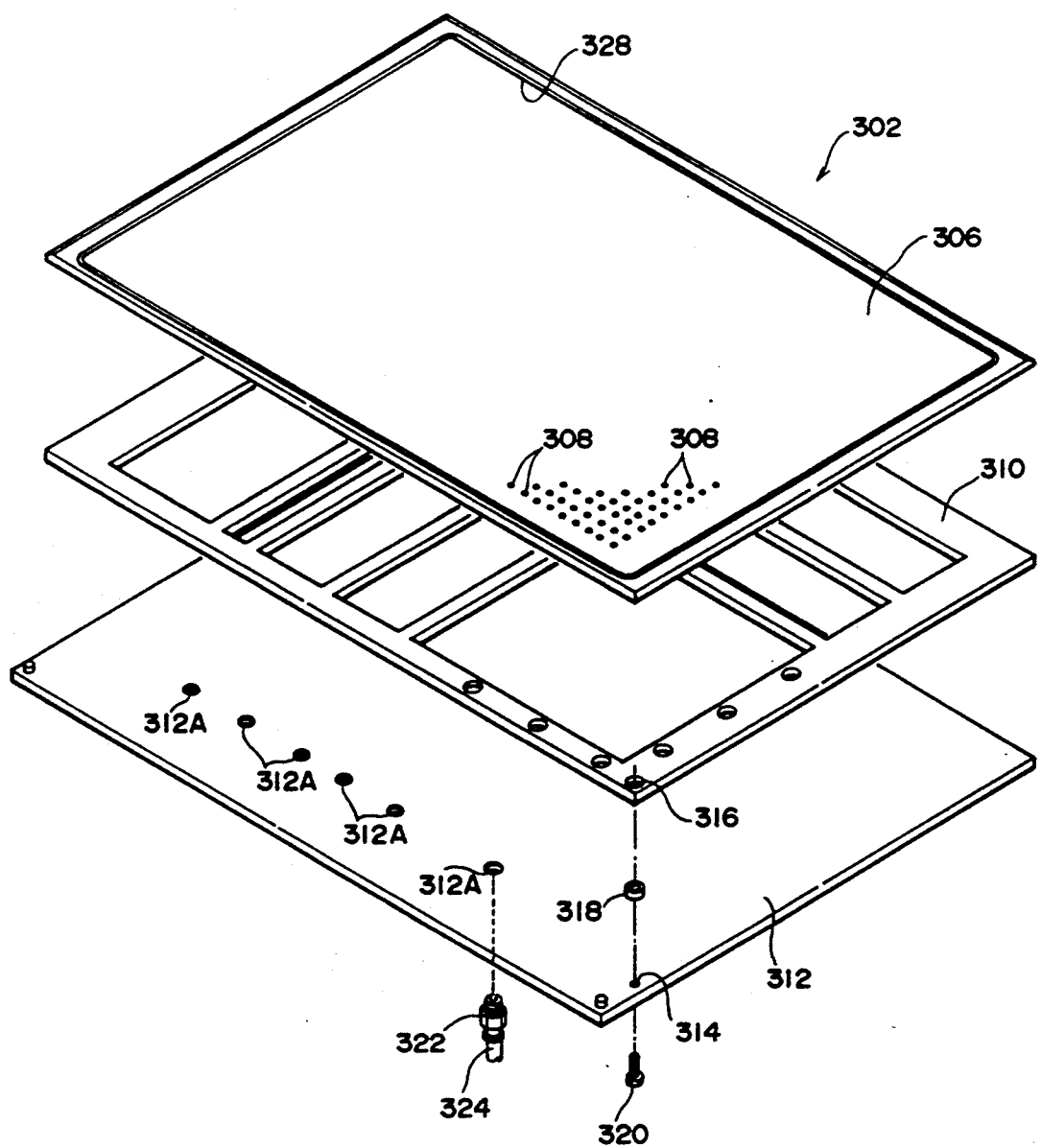
FIG. 12 is an exploded perspective view of a platen.
Figure 15:
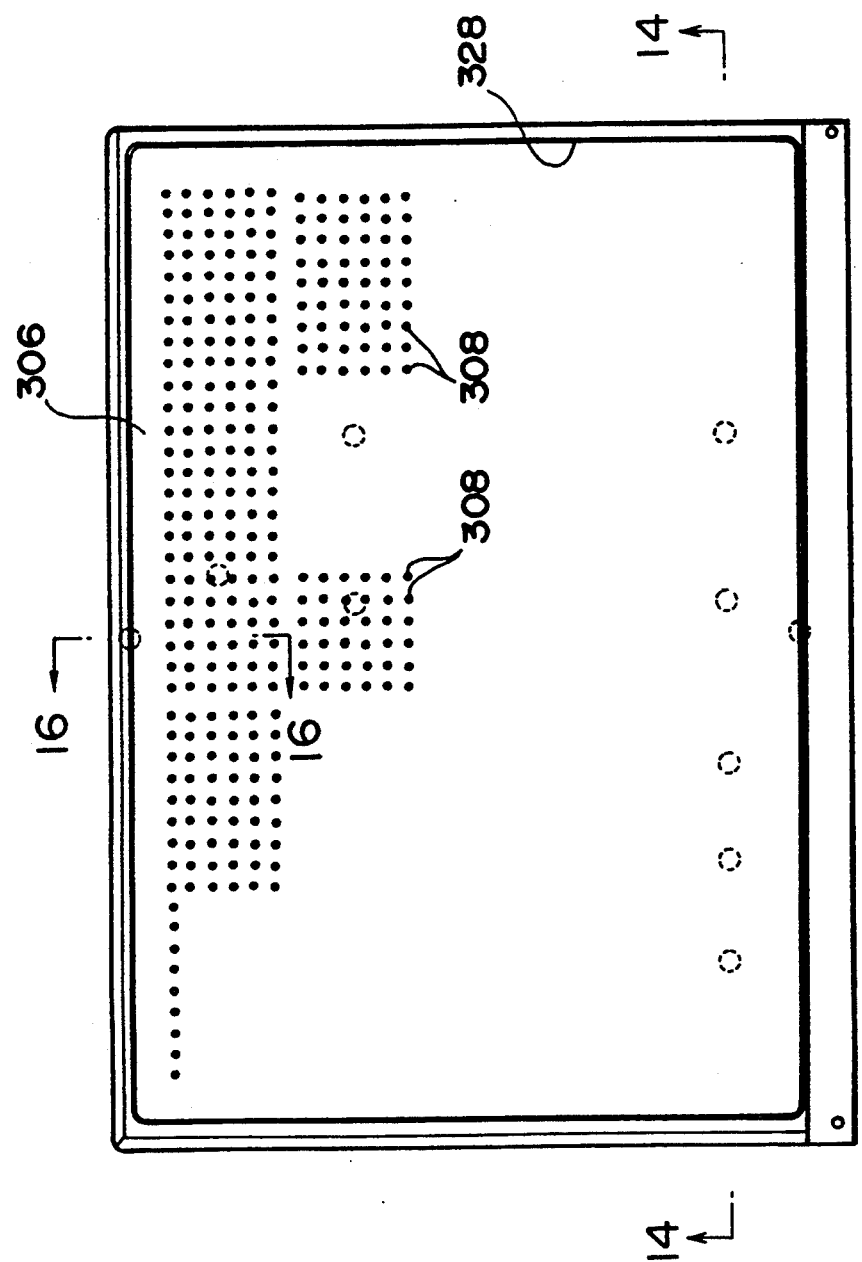
FIG. 15 is a plan view of a platen.

As shown in FIG. 12, the platen 302 is of triple layer construction and the above-described photosensitive material 14 is placed on the uppermost platen body 306. As also shown in FIG. 15, a plurality of holes 308 are provided through the platen body 306. These holes 308 are provided corresponding to each platen formed on a pattern forming plate 310, which is the intermediate layer.

Figure 13:
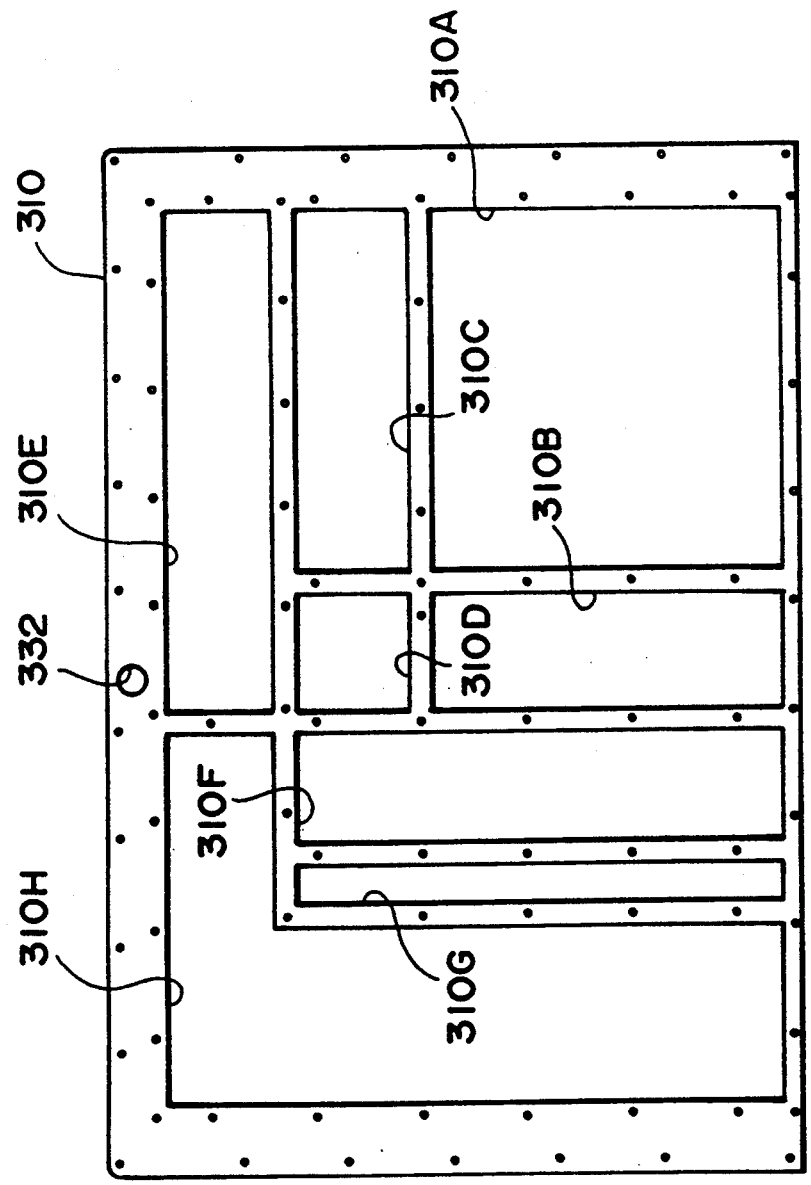
FIG. 13 is a plan view of a pattern forming plate.

The pattern forming plate 310 is formed of a sponge containing closed cells, and as shown in FIG. 13, predetermined patterns 310A through H are stamped depending on its type. The patterns 310A through H are eight including the large and small sizes and these are combined with the eight sizes of the photosensitive material 14.

Figure 14:
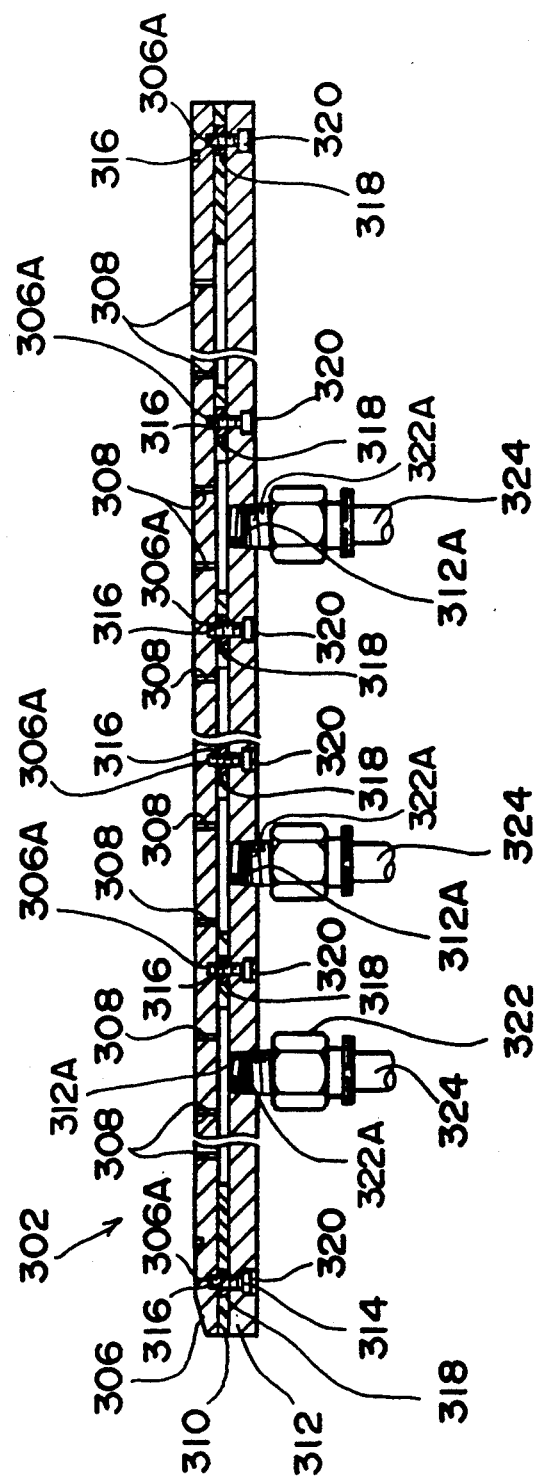
FIG. 14 is a cross-sectional view taken along line 14—14 of FIG. 15.

As also shown in FIG. 14, the pattern forming plate 310 is pinched by the platen body 306 and the lowermost base plate 312. A plurality of circular holes 316 is provided along its peripheral edge of the base plate 312 while circular holes are also provided on the pattern forming plate 310 coaxially with the circular holes 314. This circular hole 316 is made larger than that 314 of the base plate 312 and a ring-shaped spacer 318 is inserted therein. The dimension of the spacer 318, as measured in the axial direction, is set to 2 mm in this embodiment, which is slightly smaller than that of the thickness of the pattern forming plate 310.

In addition, corresponding to these circular holes 314, 316, a female thread 306A is formed on the platen body 306 coaxially with the circular holes 314, 316. In this case, screw 320 is forced into the circular holes 314, 316 to engage the female thread 306A to fix the pattern forming plate 310 pinched by the platen body 306 and the base plate 312. In this case, since the pattern forming plate 310 is made of a soft member, it is collapsed by a tightening torque caused by the screw 320, but since the spacer 318 is disposed at the circular hole 316, it is collapsed up to the axial dimension (2 mm) of this spacer 318 and thereafter the distance between the platen body 306 and the base plate 312 is held constant by the spacer 318. In consequence, a plurality of spaces partitioned by the pattern forming plate 310 are independently formed between the platen body 306 and the base plate 312.

Corresponding to each partitioned pattern space, a female thread hole 312A is pierced through the base plate 312 and a male thread 322A of a line plug 322 is engaged therewith. The line plugs 322 are each connected to one end of the tube 324 while the other end of the tube 324 is connected to a solenoid valve 326 (see FIG. 11) arranged on an intermediate base 20 of the apparatus 10. The solenoid valves 326 are each connected to a sucker unit 18. As a result, opening of the solenoid valve 326 causes a negative pressure to act on the pattern space communicating through the sucker unit 118 and the tube 324 with the result that the air is sucked in from a hole 308 provided on the platen body 306. Make/break control of the solenoid valve 326 is achieved so as to correspond to the size of the photosensitive material 14. As a result, the photosensitive material 14 placed on the platen body 306 is sucked onto the platen body 306 by the above-described suction force in its entirety.

Figure 16:
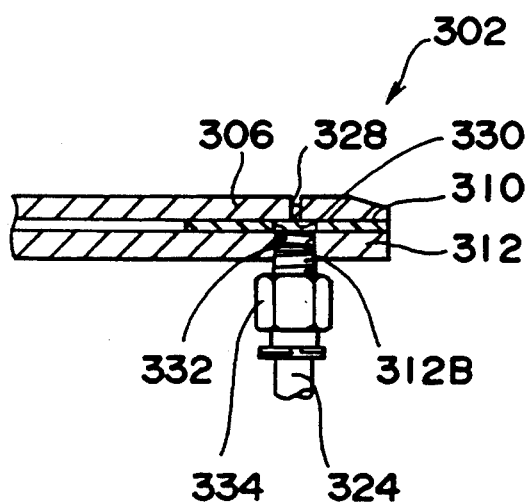
FIG. 16 is a cross-sectional view taken along line 16—16 of FIG. 15.

As shown in FIG. 16, formed adjacent to the peripheral edge portion of the platen body 306 is a continuous groove 326. Provided at part of the groove 328 is a window 330 passing through the platen body 306. Also, a window 332 corresponding to this window 330 is provided on the pattern forming plate 310. The window 332 forms a hollow portion with the base plate 312 attached. A female thread hole 312B which communicates with this window 332 is formed on the base plate 312B and a conduit plug 334 is engaged therewith. This conduit plug 334 is also connected to the sucker unit 18 via the solenoid valve 336, as in the above-described other conduit plug 322. As a result, when the solenoid valve is open, a negative pressure acts on the interior of the hollow portion of the window 332 and air is sucked therein from the groove 328 provided at the platen body 306. A transparent overlay sheet 708 (see FIG. 28), which is larger than the photosensitive material 14 and the original 16, is placed on the groove 328 and this overlay sheet 708 708 is adsorbed by the groove 328 so that the photosensitive material 14 and the original 16 is closely adhered to the platen body 306. Incidentally, the overlay sheet will be later described.

Figure 17:
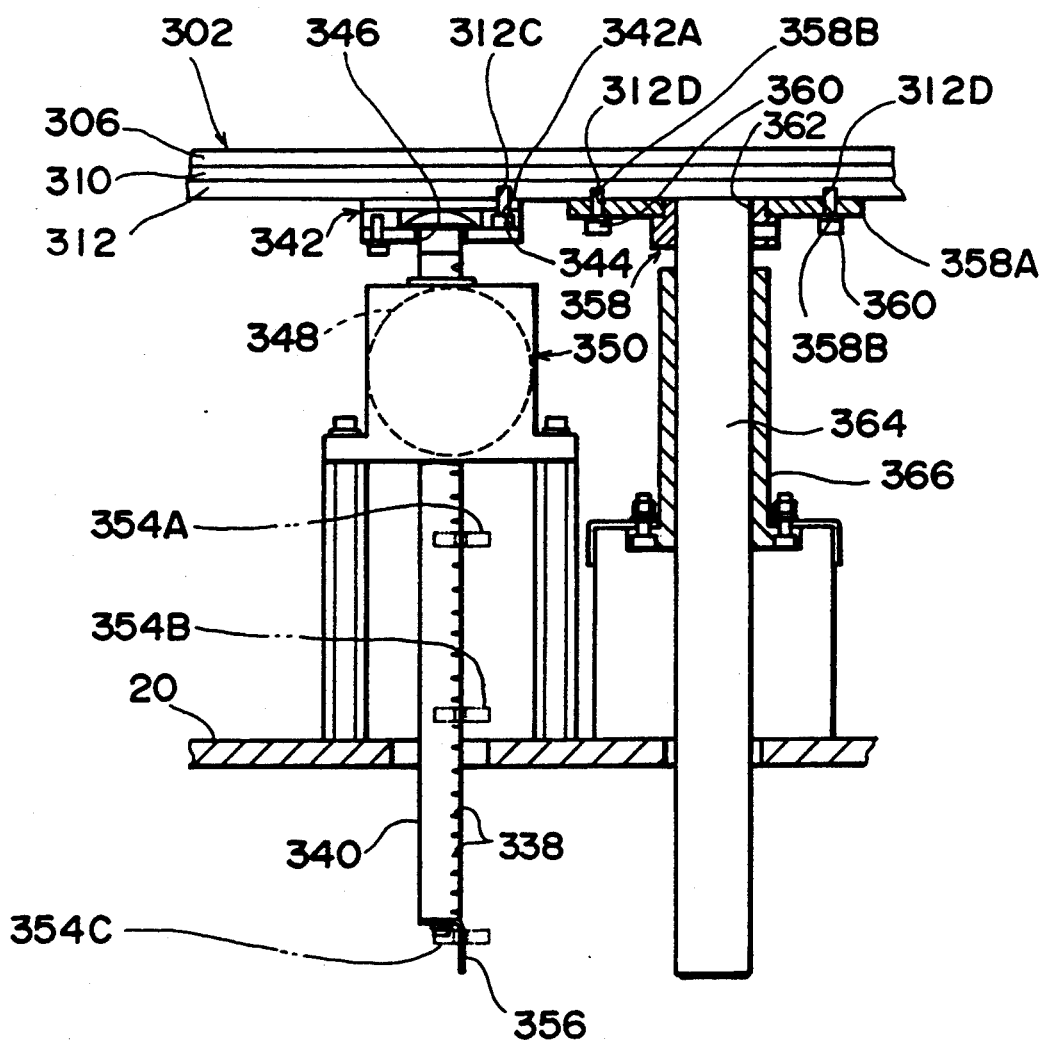
FIG. 17 is an enlarged frontal view of a driving portion.

As shown in FIG. 17, the platen 302 is supported by the tip end portion of a pair of cylindrical racks 340, along which outer periphery a tooth portion 338 is formed to form part of a rack and pinion. Corresponding to the tip end portion of the rack 340, a cylindrical rack base 342 is disposed on the base plate 312 of the platen 302. The rack base 342 is fixed to the base plate 312 because the bolt 344 forced into a circular hole 342A provided at the rack base 342 engages a female thread groove 312C provided on the base plate 312. The rack 340 is inserted for fixation into the circular hole 346 provided at the axial portion of the rack base 342. The intermediate portion of the rack 340 passes through a gear box 350. (see FIG. 11) The gear box 350 incorporates a pinion gear (omitted) coupled to the rotating shaft of the motor 348, which engages the tooth portion 338 formed on the rack 340. Two motors 348 are each connected to the control unit 800 so that they may be actuated in synchronism with each other by the control unit 800. As a result, the platen 302 can be vertically shifted while maintaining a horizontal condition.

Figure 18:
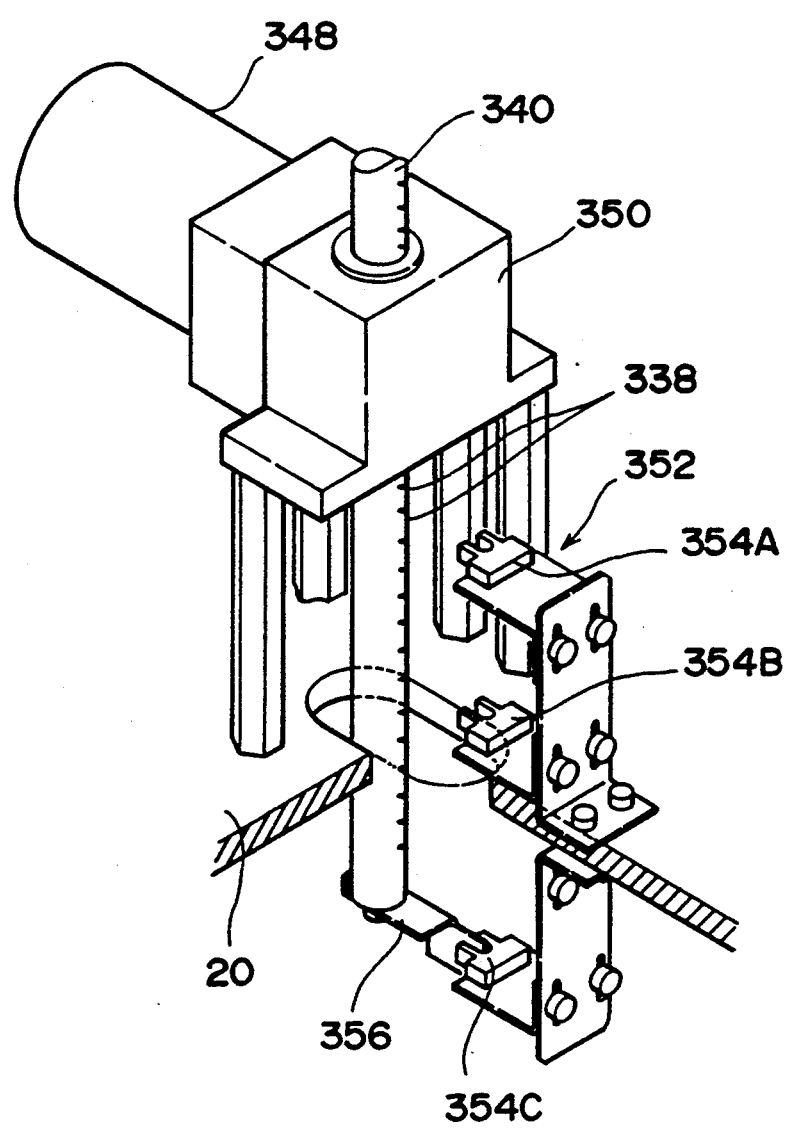
FIG. 18 is a perspective view of a rack.

As also shown in FIG. 18, downwardly of the gear box 350, a sensor unit 352 is disposed. At the sensor unit 352, photoelectric sensors 354A to C are each attached corresponding to the upper limit, lower limit and intermediate positions as the platen 302 is vertically shifted. The signal lines of the photoelectric sensors 354A to C are connected to the control unit 800. Meanwhile, a screen plate 356 is provided at the lower end portion of the rack 340. The screen plate 356 screens the intermediate portion between the light emitting portion and the light receiving portion of the photoelectric sensors 354A to C while the rack 340 travels. As a result, the upper limit, lower limit and intermediate portion, as the rack 340 is vertically shifted, can be each recognized in accordance with the output signal from the photoelectric sensors 354A to C.

In addition, as shown in FIG. 17, adjacent to the rack base 342, a bracket 358 is mounted to the base plate 312 of the platen 302. A flange portion 358A is formed on the outer periphery of the bracket 358 and a bolt 360 forced into a circular hole 358B provided through the flange portion 358A engages a female thread groove 312D provided on the base plate 312 to be fixed to the base plate 312. A sliding shaft 364 is inserted for fixation into a circular hole 362 provided at the axial portion of this bracket 358. The sliding shaft 364 passes through a sliding shaft bearing portion 366 provided on an intermediate base 20 to limit the slope and rotation as the platen 302 is vertically shifted to guide the platen 302 in the horizontal condition.

Figure 19:
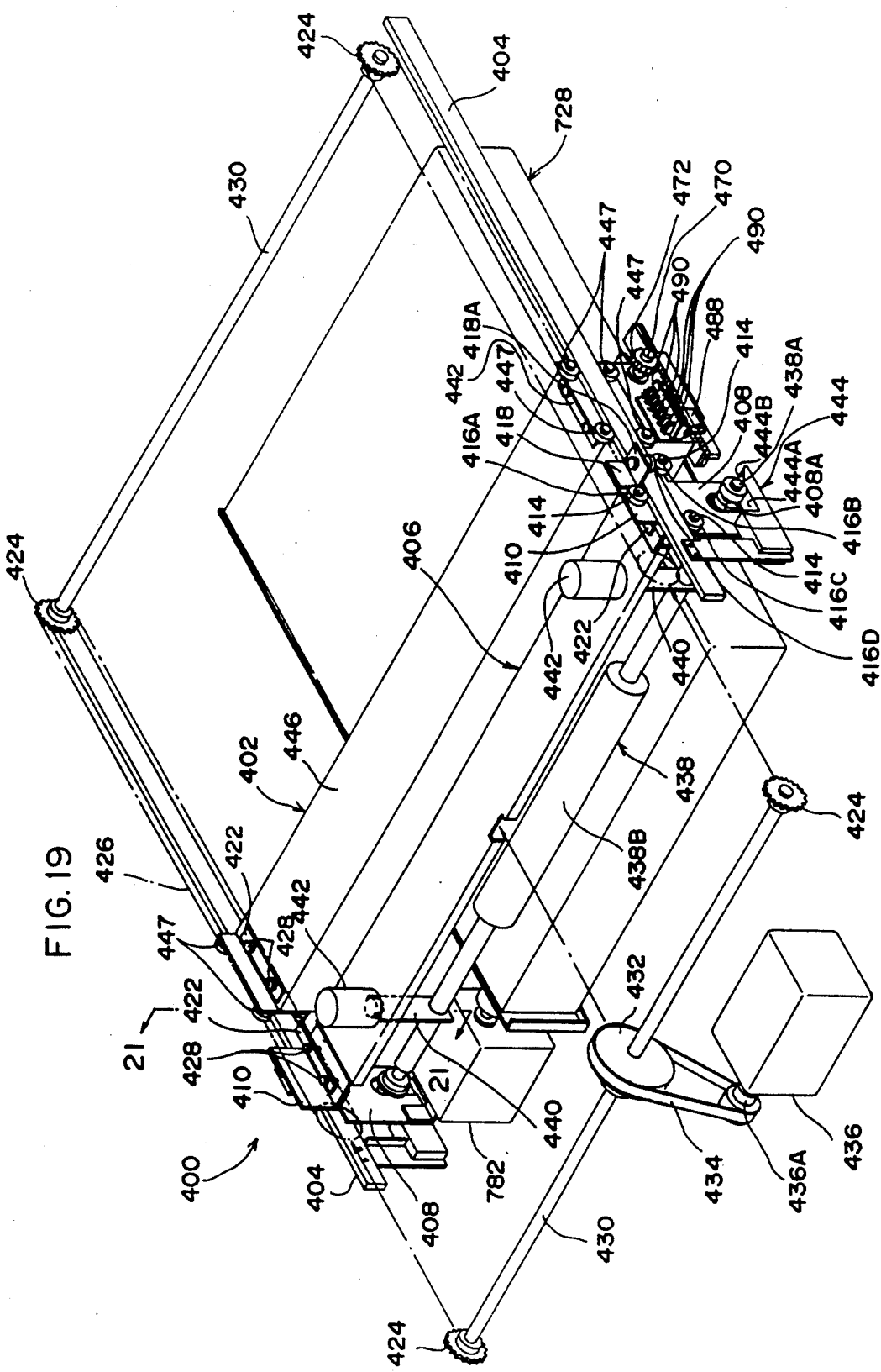
FIG. 19 is a perspective view of an exposure portion.

As shown in FIG. 19, an exposure portion 400 disposed upwardly of the platen portion 300 is provided with a pair of rails 404 disposed so that its longitudinal direction may coincide with the crosswise direction of the photosensitive material 14. These rails 404 lie outside of the end portion of the platen 302 as viewed in the longitudinal direction.

A supporting plate 406 is suspended over the rails 404. The supporting plate 405 is curved at a substantially right angle to form a tripod plate 408 so that its both end portions, as viewed in the longitudinal direction, may downwardly run parallel to each other. Further, at the curved proximal portion of this tripod plate 408, a bracket 410 is fixed curved in a substantially L-shaped form in the direction opposite to the curved direction of the tripod plate 408.

Three rollers 416A to C are each supported via a shaft 414 on the outer surface of the tripod plate 408 and the bracket 410. (two rollers 416B and C for the tripod plate 408 and a single roller 416A for the bracket 410) These rollers 416A to C pinch the above-described rails 404. As a result, the supporting plate 406 can travel in the longitudinal direction of the rail 404. Incidentally, although three rollers 416A to C are disposed on this embodiment, the number of the rollers is not necessarily restricted to three.

In addition, adjacent to the roller 416A, a bracket 418 is mounted to the bracket 410. The lower end portion of this bracket 418 is curved at a right angle outwardly of the tripod plate 408 to form an extension portion 418A, against which a roller 416D is supported via a shaft 420 (see FIG. 20) on this extension portion 418A to contact the outside of the rail 404. As a result, the supporting plate 406 is supported against the rail 404 from three sides and smoothly slides without rattling as it travels along the rail 404.

At the supporting plate 406, coupling brackets 422 are each mounted to the inside of the tripod plates 408. This coupling bracket 422 is fixed to part of an endless chain 426 wound about a pair of sprockets 424 via a screw 428. The sprockets 424 are each disposed adjacent to their both end portions, as viewed in the longitudinal direction. As a result, the supporting plate 406 can receive a driving force for traveling in the longitudinal direction of the rail 404 by rotation of the sprockets 424.

The sprockets 414 disposed at each end portion, as viewed in the longitudinal direction of the rail 404 are each fixed to both end portions of a single shaft 430, as viewed in the longitudinal direction, and a wheel 432 is mounted at the intermediate portion of the shaft 430 disposed in front of the sprocket, as viewed in its axial direction in FIG. 19. A belt 434 is wound about this wheel 432. This belt 434 is also wound about the rotating shaft 436 of the motor 436 fixed to the apparatus 10. When the motor 436 is driven, the shaft 430 is rotated to transmit a driving force to the sprockets 424. In addition, the rotating shaft 436A of the motor 436 is rotated in the crosswise as well as counterclockwise direction. This rotation of the motor 436 in both senses causes the supporting plate 406 to reciprocate along the rail 404 between the original position, which lies at this side of the apparatus and the innermost side of the same.

Elongated holes 408A are each formed at the tripod plates 408. Both end portions of the rotating shaft 438A of a squeeze roller 438 are each inserted into the elongated holes 408A. The intermediate portion of the squeeze roller 438 is covered with a felt-like soft member 438B and is moved on the platen 302 rotated by its own weight as the supporting plate 406 travels.

Figure 21:
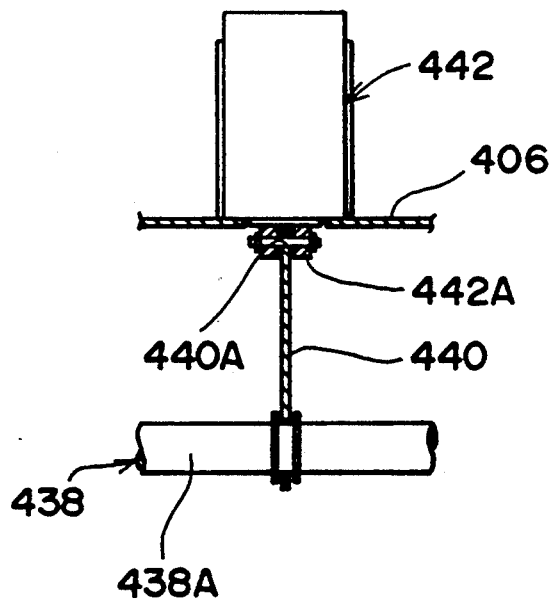
FIG. 21 is a cross-sectional view taken along line 21—21 of FIG. 19.

As also shown in FIG. 21, two points of the squeeze roller 438, which lie at equal intervals from the center position of the squeeze roller 438, as viewed in its axial direction, toward both end portions, thereof are supported by one end of a suspension bracket 440. The other end portion of the suspension bracket 440 extends toward the supporting plate 406. A hole 440A is provided at the other end portion of the suspension bracket 440, which in turn is fixed via a screw to an actuator 442A of a solenoid 442 disposed on the supporting plate 406. When electrically conducted, the solenoid draws in the actuator 442A with the result that the squeeze roller 438 is pulled up via the suspension bracket 440 to create a gap between the former and the platen 302. Incidentally, in this embodiment, pulling up of the squeeze roller 436 by the solenoid 442 is conducted while the supporting plate 406 is returning rather than while advancing.

Figure 20:
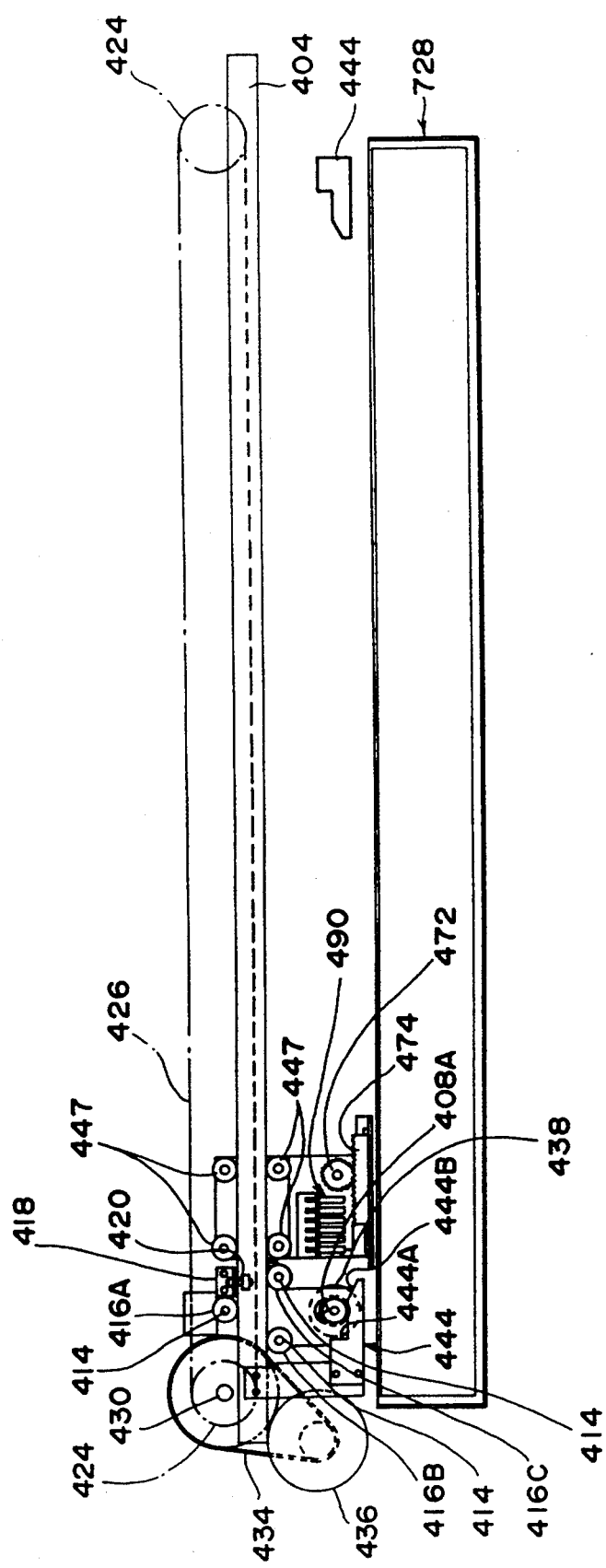
FIG. 20 is a right side lateral of an exposure portion.

As shown in FIG. 20, corresponding to both end portions of the rail 404, as viewed in the lingitudinal direction, a cam bracket 444 is each mounted so as to interfere with the traveling path of the squeeze roller 438. At this cam bracket 444, a high portion 444A is formed so as to provide a gap between the squeeze roller 438 and the platen 302, and a slanted surface portion 444B runs continuously from the height position of the platen 302 up to this high portion 444A. In consequence, when the supporting plate 406 lies at the original position, even if the solenoid 442 is not energized, the gap is formed therebetween. In addition, also at the folding point at the innermost side of the apparatus, the squeeze roller 438 may climb up the cam bracket 444.

As shown in FIG. 19, the supporting plate 406 and a casing 446, which forms a light source unit 402 and the supporting plate 406 reciprocate on the platen 302 along the rails 404. The box-shaped casing 446, which constitutes the light source unit 402, may be fixed to one end portion of the supporting plate 406, as viewed in the crosswise direction, via a connecting member so as to be supported against the rails 404 by means of four rollers 447.

Figure 22:
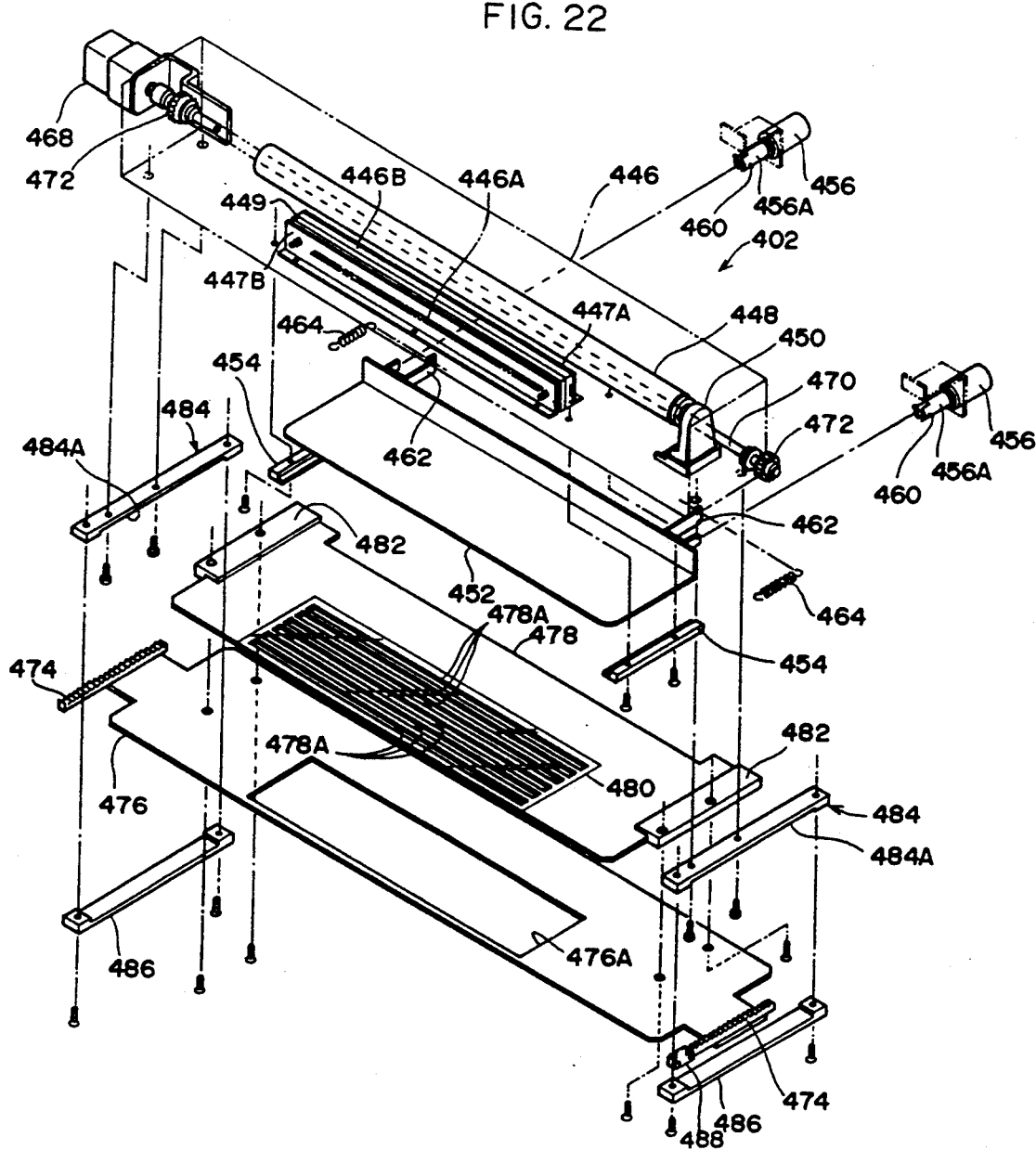
FIG. 22 is an exploded perspective view of a light source unit.

As shown in FIG. 22, a fluorescent lamp 448, which serves as the light source, is disposed within the casing 446 to be suspended over to a pair of sockets 450 fixed to the lower end surface of the casing 446. A slit hole 446A is provided on the lower end surface of the casing 446 and corresponding thereto, a shutter 452 is mounted at the casing 446. Disposed at the upper portion of the slit hole 446A is a lens 446B (for example, SELFOC lens), at which one side a bracket 447A is fixed and at the opposite side a resin plate 449 is fixed pressed via a bracket 447A and a screw 451A. The brackets 447A and 447B are fixed to the casing 446 by means of screws 451B and 451C.

Figure 23:
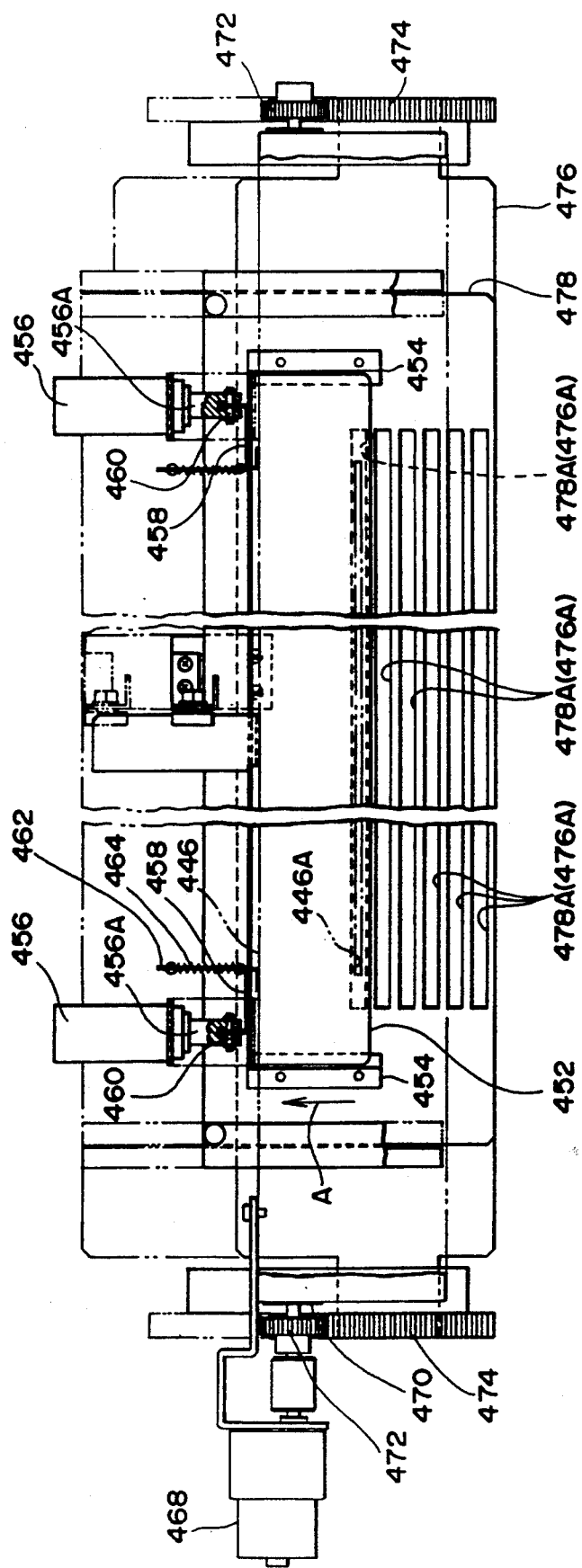
FIG. 23 is a plan view of a light source unit.

The shutter 452 is moved in the crosswise direction by means of guide rails 454. As shown in FIG. 23, one end portion of the shutter 452, as viewed in the crosswise direction, is curved at a substantially right angle and a bracket 458 is mounted there to be connected to the actuator 456A of the solenoid 456 via a shaft 460. In this case, when the solenoid is energized the actuator 456A is drawn in to shift the shutter 452 in the crosswise direction (in the direction of arrow A of FIG. 239 to open the slit hole 446A.

In addition, a bracket 462 is mounted at the above-described yielded portion of the shutter 452 and one end of a tensile coil spring 464 is anchored thereto. The other end of this tensile coil spring 464 is anchored to the casing 446. As a result, when the solenoid 456 is not energized the actuator 456A is drawn out by a force energized by the tensile coil spring 464 to close the slit hole 446A by the shutter 452.

A motor 468 is mounted on one of the lateral surfaces of the casing 446. A driving shaft 470 is coaxially mounted to the rotating shaft of the motor 467. The driving shaft 470 passes through both lateral surfaces of the casing 446. At the driving shaft portions outside of the lateral surface of the casing 446, gears 472 are each attached so as to mate with each tooth portion formed on the upper surface of the pair of racks 474. When the motor 468 is driven, the rack 474 is moved in the crosswise direction of the slit hole 446A via the gear 472.

The pair of racks 474 is fixed to both end portions of a filter supporting plate 476. The neighborhood of both end portions of the filter supporting plate 476 is contained within a groove portion 484A of a plate 484 mounted to the casing 446. Mounted to the plate 484 is a fixed plate 486 having a groove portion corresponding to this groove portion 484A so as to pinch the filter supporting plate 476. As a result, the filter supporting plate 476 can be moved in the longitudinal direction of the groove portion 484A, that is, in the crosswise direction of the filter supporting plate 476 relative to the casing 446. A plate 482 is mounted on the upper surface of the filter supporting plate 476 to fix both end portions of a filter sheet 476 as viewed in the longitudinal direction. Six slit holes 476A are provided at the filter sheet 478 and a filter 4870 is adhered to each slit hole 478A.

In this embodiment, on the filter 480, six colors are allocated in a long and narrow form along the slit hole 446A and are selectively used depending on whether the used photosensitive material is of negative type or positive type. In other words, a R (red) filter used for negatives and positives (green) filter and a B (blue) filter for each of these negatives and positives and a BK (black) filter exclusively used for negatives are disposed side by side. In consequence, a single filter sheet 478 includes the filters for the negative and positive thus eliminating a need to exchange the photosensitive materials depending on their type (negative or positive).

A screen plate 488 moved along with the filter supporting plate 476 is mounted on one lateral surface of the rack 474 of the filter supporting plate 476. In addition, at the side of the casing 446, six photoelectric sensors 490 are disposed corresponding to a locus described as the screen plate 488 moves. (see FIG. 19) When the filter supporting plate 476 moves relative to the casing 446, the screen plate 488 correspondingly sequentially passes through the light emitting portion and the light receiving portion of the six photoelectric sensors 490. These photoelectric sensors 490 are each connected to the control unit 800.

The interval between the six sensors 490 is set to coincide with that between the filters 480 adhered to the filter supporting plate 476. As a result, a signal from either one of the six photoelectric sensors 490 may be selected to control driving of the motor to thereby make the selected filter 480 correspond to the slit hole 446A.

(5) Photosensitive Material Transfer Portion 500

Figure 24:
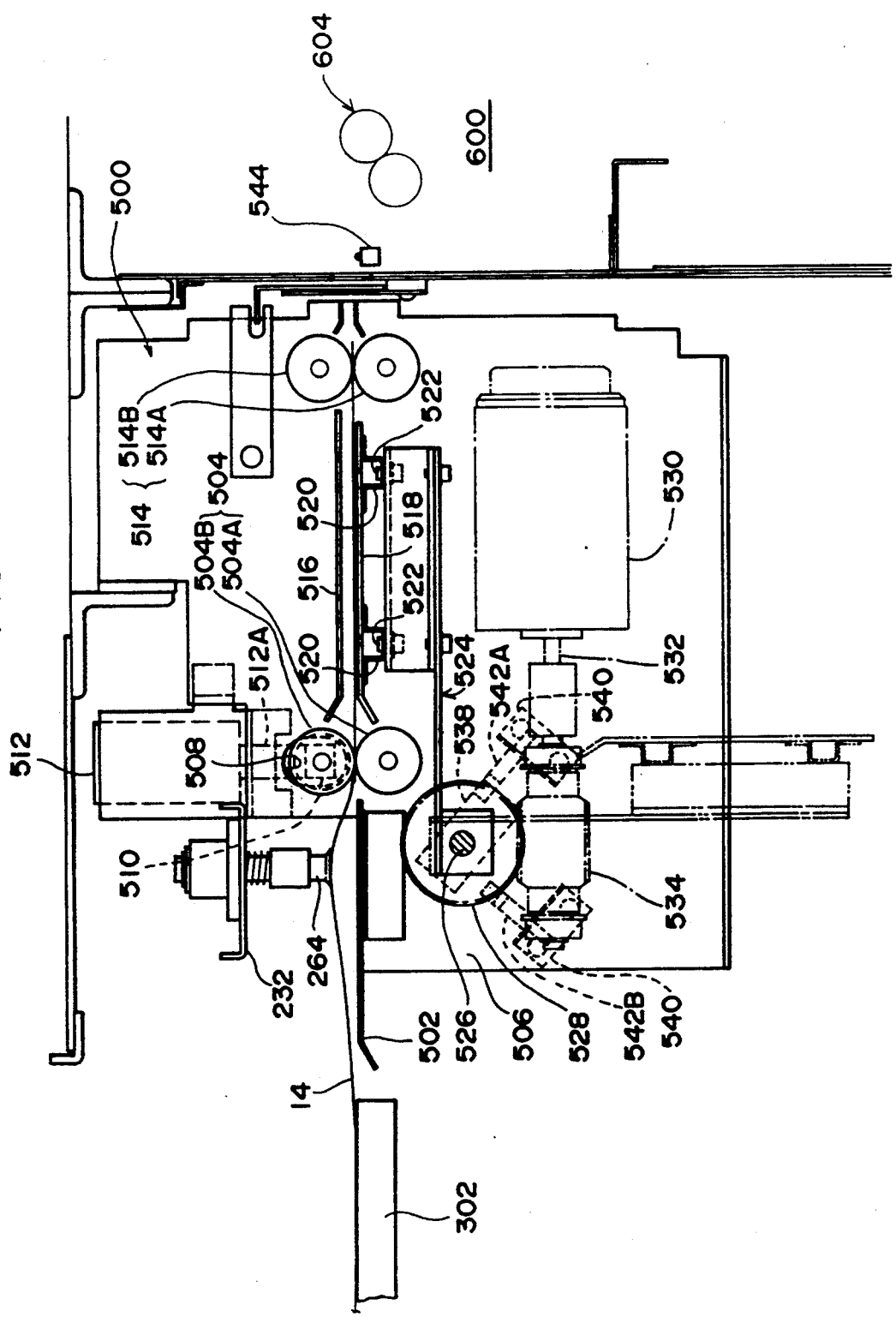
FIG. 24 is an enlarged view of a photosensitive material transfer portion.

As shown in FIG. 24, the photosensitive material 14 subjected to exposure on the platen 302 is sucked to the sucker 264 of the photosensitive material feeding portion 200 to be fed to the photosensitive material transfer portion 500. That is, a guide plate 502 is disposed at the photosensitive material transfer portion 500 adjacent to the platen 302, and the sucker 264, guided by the rails 210, feeds the photosensitive material 14 onto this guide plate 502.

Disposed downstream of the guide plate 502 is a pair of rollers 504. One of the pair of rollers 504 is chosen as a driving roller 504A, which is rotated at a speed of V (V is constant) receiving a driving force of a motor (not shown), and the photosensitive material 14 is pinched between the same and the other driven roller 504B to apply a feeding force to the photosensitive material 14.

The shaft of the driven roller 504B is accommodated with the elongated hole 508 formed on the lateral plate 506 of the transfer portion 500 so that it may move in the directions of coming in contact with and moving away from the driving roller 504A respectively. In addition, the end portions of a pair of tensile coil springs (omitted) are respectively engaged with the rotating shaft of the driving roller 504A and the driven roller 504B so as to bias the rollers in the direction in which they contact each other by the force of the tensile springs.

In addition, the driven roller 504B is connected to the actuator 512A of the solenoid 512 via the suspension bracket 510. The solenoid 512 draws in the actuator 512A while being energized with the result that it moves apart the driving roller 504A and the driven roller 504B against the force energized by the tensile coil springs. In this state, the tip end portion of the photosensitive material 14, which has been fed sucked to the sucker 264, may be inserted into a gap between the driving roller 504A and the driven roller 504B.

In this embodiment, when the photosensitive material 14 is inserted into the gap, the driving roller 504A is rotated and stopped once after the photosensitive material has been inserted. As a result, even if the tip end portion of the photosensitive material 14 is more or less curled, it may be guided into the gap by the rotating force of the driving roller 504A, and so an abrupt feeding of the photosensitive material 14 can be prevented at the moment an energized state of the solenoid is stopped.

When the photosensitive material 14 is pinched by the pair of rollers 504, suction of the photosensitive material by the sucker 264 is released and the transfer members 202 including the sucker 264 may be returned to its original position guided by the rails 210.

A pair of rollers 514 is further disposed downstream of the pair of rollers 504. This pair of rollers 514 is also comprised of a driving roller 514A rotated by the driving force of a motor (not shown) and a driven roller 514B rotated contacting this driving roller 514A. In this case, the rotating speed of the driving roller 514A can be changed in three stages, its maximum speed being the same as that of the driving roller 514A and the other two speeds being set to those (Vfilm, Vpaper) slower than that rotating speed. In this case, Vfilm corresponds to the feeding speed at the processor portion 600 when the photosensitive material 14 is a film while Vpaper is set to correspond to the feeding speed at the processor portion 600 when the photosensitive material is paper.

An upper guide plate 516 and a lower guide plate 518 which each guide the head and tail surfaces of the photosensitive material 14 are disposed between the pair of rollers 504 and the pair of rollers 514. A gap is provided between the upper guide plate 516 and the lower guide plate 518 so that the photosensitive material may be fed thereto.

The upper guide plate 516 is fixed to the lateral plate 506. The lower guide plate 518 is mounted to a swing base 524 by a screw via a hat type bracket 20. The swing base 524 extends in the direction of the guide plate 502 in parallel to the lower guide plate 518 to be mounted to the rotating shaft 526 supported against the lateral plate 506.

A bevel gear 528 is fixed to the rotating shaft 526. This bevel gear 528 mates with a worm gear 534 mounted to the rotating shaft 532 of the motor 530. The motor 530 has a self-braking function and, even when it is not supplied with electric power, the worm gear 534 is not rotated.

In this case, the lower guide plate 518 is supported against the rotating shaft 526 via the swing base 524, but since the bevel gear 528 fixed to the rotating shaft 526 mates with the worm gear 534, it can be prevented that the lower guide plate 518 be rotated by its own weight with the rotating shaft 526 as its axis.

A screen plate 538, which extends in the radial direction of the rotating shaft 526, is mounted to the rotating shaft 526 and, corresponding to the motion locus described by this screen plate 538, two photoelectric sensors 542A to B are mounted on the lateral plate 506 via the bracket 540. The photoelectric sensors 542A to B are each connected to the control unit 800. The photoelectric sensors 542 A to B are each provided with a light emitting portion and a light receiving portion and the above-described screen plate 538 enters a space formed therebetween.

The photoelectric sensor 542A is disposed at a position at which the space between the light emitting portion and the light receiving portion is screened by the screen plate 538 as the lower guide plate 518 lies in the horizontal plane (indicated by the solid line of FIG. 24) while the photoelectric sensor 542B is disposed at a position at which the space between the light emitting portion and the light receiving portion is screened by the shielding plate 538 as the lower guide plate 518 lies in the vertical plane (indicated by the imaginary line of FIG. 24). As a result, the control unit 800 may control driving of the motor 530 in accordance with the signal emitted from the photoelectric sensors 542A to B so that the lower guide plate 518 may be positioned to the above-described horizontal and vertical positions.

Disposed further downstream of the pair of rollers 514 is a photoelectric sensor 544 at the lower side of the feeding passageway of the photosensitive material 14. This photoelectric sensor 544 is connected to the control unit 800. It changes its output signal depending on whether the photosensitive material is present or not at the site where it is disposed. The control unit 800 may sense the tip end portion and rear end portion of the photosensitive material 14 based on the output from the photoelectric sensor 544.

The control unit 800 may rotate the downstream pair of rollers 514 at the same speed as the photosensitive material 14 pinched by the upstream pair of rollers 504 is fed. Consequently, the photosensitive material 14, pinched by those pairs of rollers 504 and 514, is conveyed with a predetermined tension. In this case, when the tip end portion of the photosensitive material 14 is sensed by the photoelectric sensor 544, the rotating speed of the downstream pair of rollers 514 is slowed down to Vfilm or Vpaper depending on the kind of the photosensitive material 14. At the same time or slightly earlier than that, the moter 530 is driven so that the lower guide plate 518 may be rotated in the direction of vertical position. As a result, loosening of the photosensitive material 14, which is caused by a difference of the feeding speeds at the upstream and downstream pairs of rollers 504 and 515, can take place in the lower space where the lower guide plate 518 is positioned in its vertical position.

In addition, disposed at the lowermost portion of this lower space is a tray 546. (see FIG. 2) When the photosensitive material 14 is fed by the upstream pair of rollers 504 and its rear end portion is let off the upstream pair of rollers 504, it is accommodated into the tray 546.

(6) PROCESSOR PORTION 600

Figure 25:
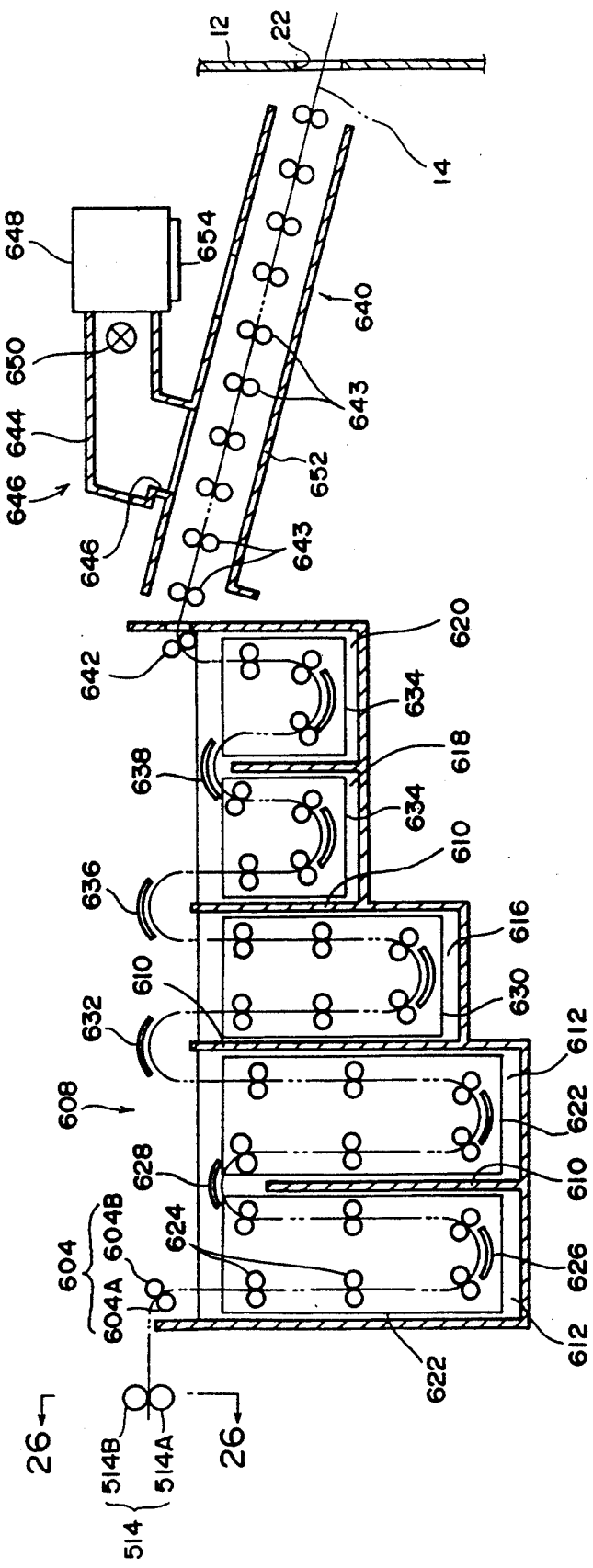
FIG. 25 is a schematic view of a processor portion.

As shown in FIG. 25, the photosensitive material 14 is fed at a predetermined speed, pinched by the downstream pair of rollers 514 of the photosensitive material feeder portion 500, to be pinched by a pair of rollers 604 disposed at the inlet of the processor portion 600. Of this pair of rollers 604, one roller is chosen as a driving roller 604A rotated by the driving force of a motor (not shown) and the other is chosen as a driven roller 604B rotated by receiving the driving force from this driving roller 604A. The rotating speed of the driving roller 604A is set to approximately coincide with the rotating speed (Vfilm or Vpaper) as the downstream pair of rollers 614 is rotated at a slower speed.

Figure 26:
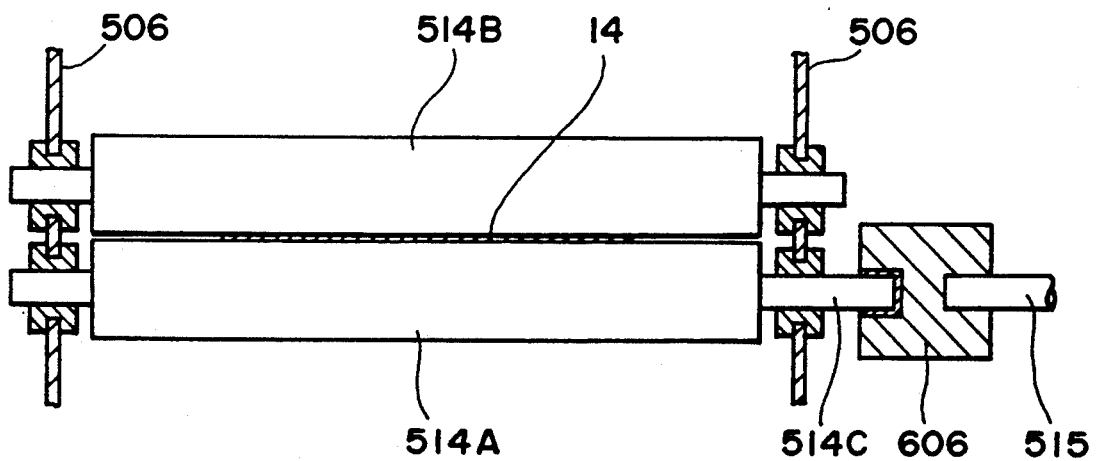
FIG. 26 is a cross-sectional view taken along line 26—26 of FIG. 25.

In this case, as shown in FIG. 26, a one-way clutch 606 is interposed between the rotating shaft 514C of the driving roller 524A of the downstream pair 514 and that 515 of the motor so that when the outer circumference of the roller is rotated at a slower speed than the rotating speed of the motor it may be relatively rotated between the roller and the rotating shaft. Therefore, in this embodiment, the rotating speed of the pair of rollers 604 at the side of the processor portion 600 is rotated slightly slower than the rotating speed of the downstream pair 514 so that the photosensitive material 14 may be fed with a predetermined degree of tension.

A treating tank 608 is disposed at the processor portion 600. The treating tank 608 is divided into developing tanks 612 and 614, a bleaching/fixing tank 616 and rinsing tanks 618 and 620 along the feeding passageway of the photosensitive material 14 by means of a partitioning plate 610. A developing solution, bleach/fixing solution and a rinsing water are each stored within each treating tank 608. In addition, the partitioning plate 610 between the developing tanks 612 and 614 is set in height lower than the surface level of the developing solution while another partitioning plate 610 is also set in height lower than the surface level of the rinsing water between the rinsing tanks 618 and 620. A treating rack 622 is immersed within the developing tank 612. This treating rack 622 is provided with a plurality of pairs of rollers 624 and a guide plate 626 to form a feeding passageway of the photosensitive material 14. After the tip end portion of the photosensitive material 14, which comes along fed by the pair of rollers 604, is passed over, it is pinched by the pair of rollers 624 and is fed in a substantially U form within the developing tank 612, guided by the guide plate 626.

Meanwhile, a treating rack 622 of identical form is also disposed at the adjacent developing tank 614. An arcuate guide plate 628 which protrudes in the upward direction is disposed upwardly of the partitioning plate 610 between the developing tanks 612 and 614, and by this guide plate 628, the photosensitive material 14 is passed over to be fed in a substantially U-form. Incidentally, the photosensitive material 14 is passed over within the developing solution from the developing tank 612 into the developing tank 614.

A treating rack 630 is disposed at the bleaching/fixing tank 616 to guide and feed the photosensitive material 14 in a substantially U-form within the bleaching/fixing tank 616. An arcuate guide plate 632 which protrudes upwardly is disposed upwardly of the partitioning plate 610 between the developing tank 614 and the bleaching/fixing tank 616 and, guided by this guide plate 632, the photosensitive material 14 is passed over to the treating rack 630 of the bleaching/fixing tank 616. Incidentally, the photosensitive material is passed over upwardly of the surface level of the developing solution and the bleaching/fixing solution.

Treating racks 634 of identical form are each disposed at the rinsing tanks 618 and 620. An arcuate guide plate 636 which protrudes in the upward direction is disposed upwardly of the partitioning plate 610 between the bleaching/fixing tank 616 and the rinsing tank 618 and, guided by this guide plate 636, the photosensitive material 14 is passed over to the treating rack 634 of the rinsing tank 618. This guide plate 636 is disposed upwardly of the surface level of the bleaching/fixing solution and the rinsing water.

In addition, an arcuate guide plate 638 which protrudes in the upward direction is disposed upwardly of the partitioning plate 610 between the rinsing tanks 618 and 620, this guide plate 638 being disposed within the rinsing water. As a result, the photosensitive material 14 is passed over, within the rinsing water, from the treating rack 634 of the rinsing tank 618 to the treating rack 634 of the rinsing tank 620.

The photosensitive material discharged from the rinsing tank 620 is pinched by a pair of rollers 642 disposed at a drying portion 640 to be passed over to a plurality of pairs of rollers 643 for feeding. At this drying portion 640, a duct 644 is provided upwardly of the pair of rollers 642. A port portion 646 of this duct 644 is directed toward the pairs of rollers 634. A fan 648 is attached to the proximal portion of the duct 643. The fan 648 feeds air under pressure into the duct 644. A heater 650 is mounted between the fan 648 and the port portion 646 within the duct 644. The air fed out by the above-described fan 648 is heated by the heater 650 to be blown out of the port portion 646 turned into hot air. This hot air is blown to the photosensitive material 154 fed pinched by the pair of rollers 643 to dry the photosensitive material 14.

A guide plate 652 is disposed downwardly of the pairs of rollers 643 to guide the hot air to the rear surface of the photosensitive material 14 while recycling it by guiding it in the direction of a suction hole 654 of the fan 648.

The photosensitive material 14 discharged from the drying portion 640 is withdrawn from the delivery hole 22 provided at the casing 12.

As shown in FIG. 27, the upper portion of the processor portion 600 is screened from the external environment by means of a ceiling member 602. This ceiling membr 602 can be removed during maintenance and is removed with a large lid 24 of the casing 12 open. (see FIG. 1)

(7) Film Loading Portion 700

As shown in FIG. 27, the inner portion of the large lid 24, that is, the upper portion of the ceiling member 602 of the processor portion 600 is intended for serving as the film loading portion 700 for loading and exchanging the original 16.

Guide shafts 718 running parallel to each other are mounted on the lateral surfaces of this side and innermost side of the apparatus 10 via the bracket 716. These guide shafts 718 are disposed so as to coaxially run with a pair of guide shafts 720 provided at the exposure portion, with the large lid 24 closed.

Figure 28:
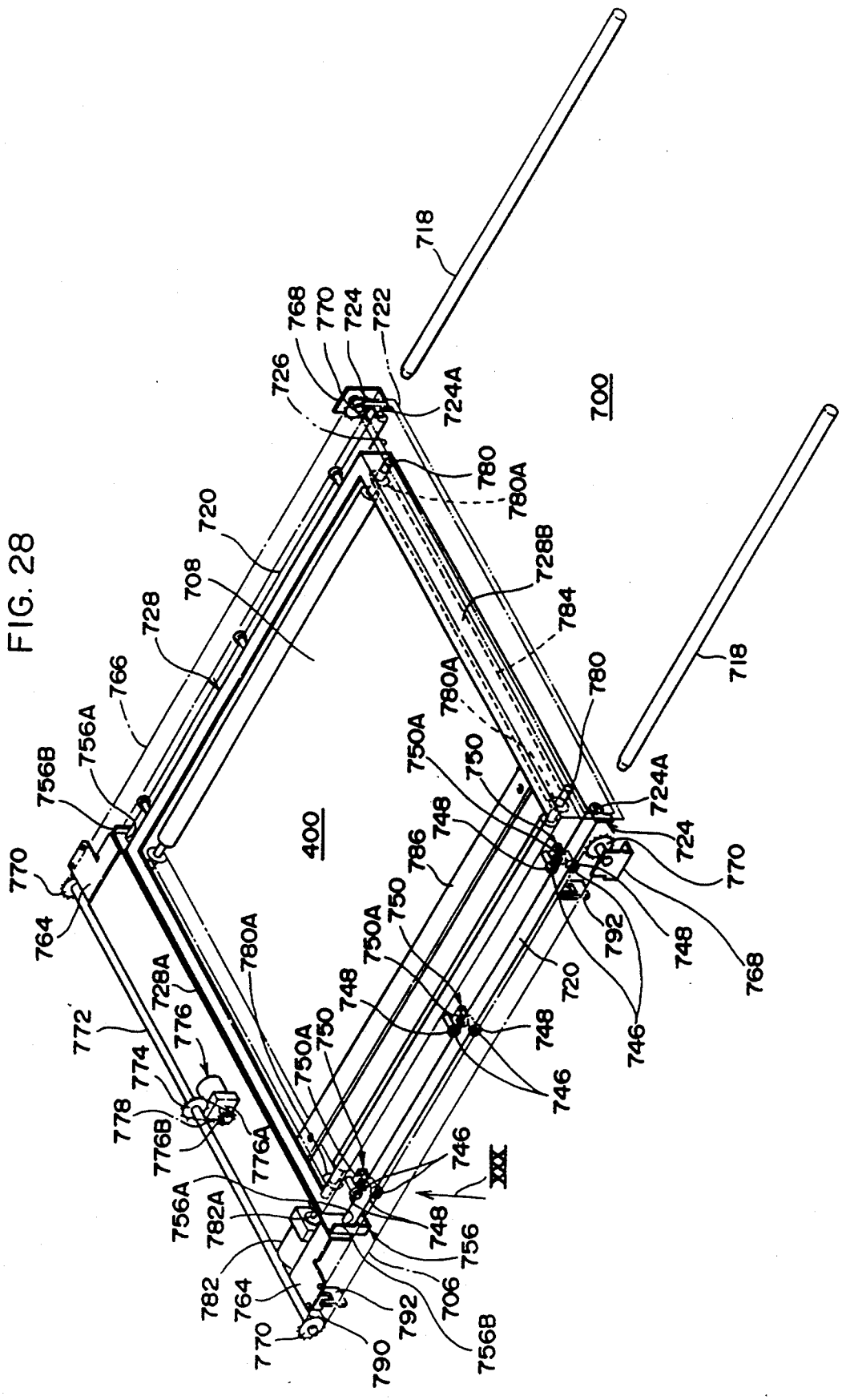
FIG. 28 is a perspective view of a film loading portion.

As shown in FIG. 28, a lateral plate 722, which serves as the partitioning plate, is provided between the exposure portion 400 and the film loading portion 700. One end of the guide shaft 720 at the side of the exposure portion 400 is fixed to the lateral plate 722 via the bracket 724. This bracket 724 is provided with a tongue piece 724A having an arcuate surface of substantially the same diameter as that of the outer circumference of the guide shaft 720 at its end, and the guide shaft 720 is fixed to this tongue piece 724A. The other end portion of the guide shaft 72 is fixed to a bracket (not shown) fixed to the apparatus 10.

A rectangular hole 726 which serves as a window is provided at the lateral plate, communicating the exposure portion 400 with the film loading portion 700. This rectangular hole 726 serves as a passageway for communicating with the supporting base 728 in which the original is charged.

Figure 29:
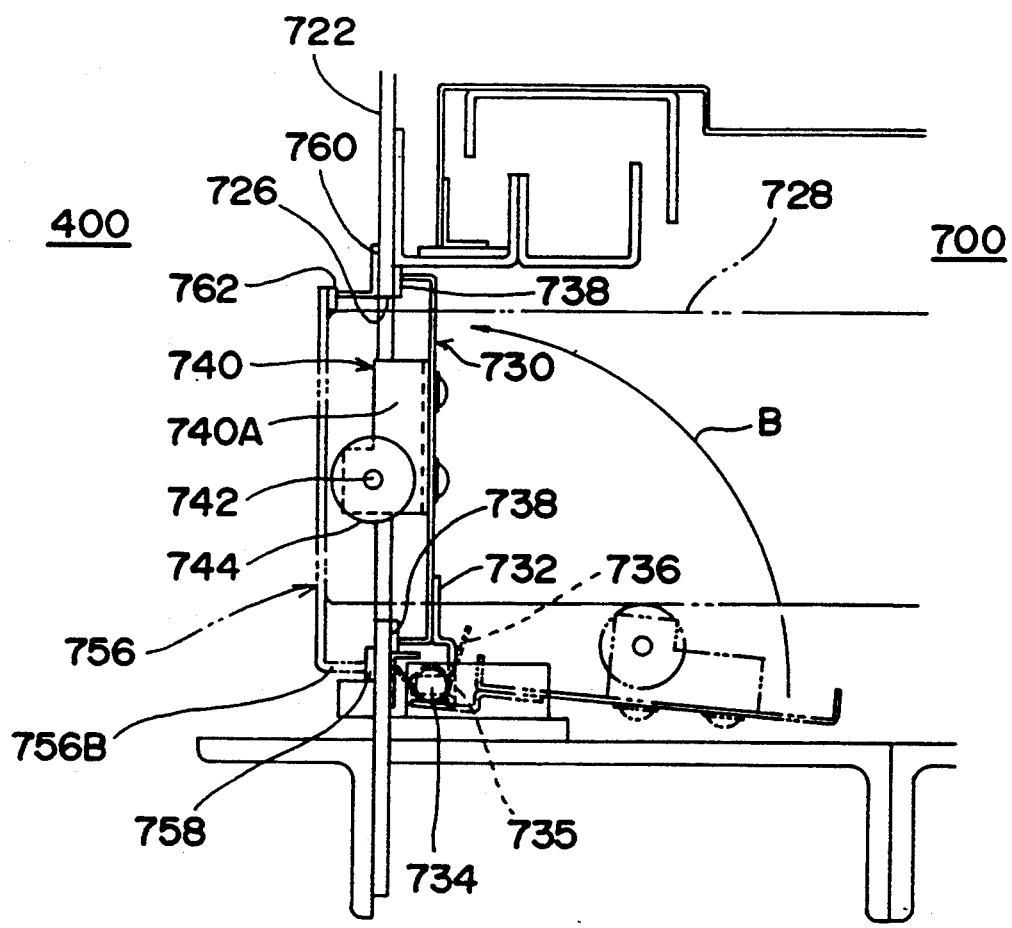
FIG. 29 is a schematic view illustrating a boundary portion between the film loading portion and the exposure portion.

As shown in FIG. 29, a lid member 730 for closing the hole 726 is disposed at the side of the film loading portion 700 of the lateral plate 722 formed with the hole 726. The lid member 30 is dish-shaped and the dish-shaped inside is opposed to the rectangular hole 726. One end portion of the bracket 732 is fixed to the rear portion of the lid member 730. The other end of the bracket 732 is fixed to a shaft 734 provided underneath the hole 732 in the longitudinal direction of the hole 726 by means of a screw 735. A torsion coil spring 736 is mounted to the shaft 734, and one end of the spring 736 is anchored to the bracket 732 while its other end is anchored to the lateral plate 722 under the rectangular hole 726. As a result, the lid member 730 is energized in the direction closing the hole 726 (in the direction of arrow B of FIG. 29) by the force energized by the spring 736. A felt-like light shielding member 738 is adhered about the hole 726 where the dish-shaped peripheral edge portion of the lid member 730 abuts. The light shielding member 738 blocks entry of the light from the film loading portion 700 into the exposure portion 400 when the lid member 730 is closed.

A bracket 740 having a substantially U-shaped cross section is mounted on the bottom surface of the inside of the lid member 730 and a shaft 742 is suspended over between tripod plates 740A of the bracket 740 running parallel to each other. A roller 744 is supported against this shaft 742.

As shown in FIG. 28, the supporting base 728 is framed and a pair of shafts 746 are each mounted at three points on its outer lateral surface opposed to the guide shaft 720. The pairs of shafts 746 are each disposed at intervals, as viewed in the vertical direction, each supporting rollers 748. The circumferential surface of these rollers is arranged to abut the upper surface and lower surface of the outer periphery of the guide shaft 718 or 720.

Figure 30:
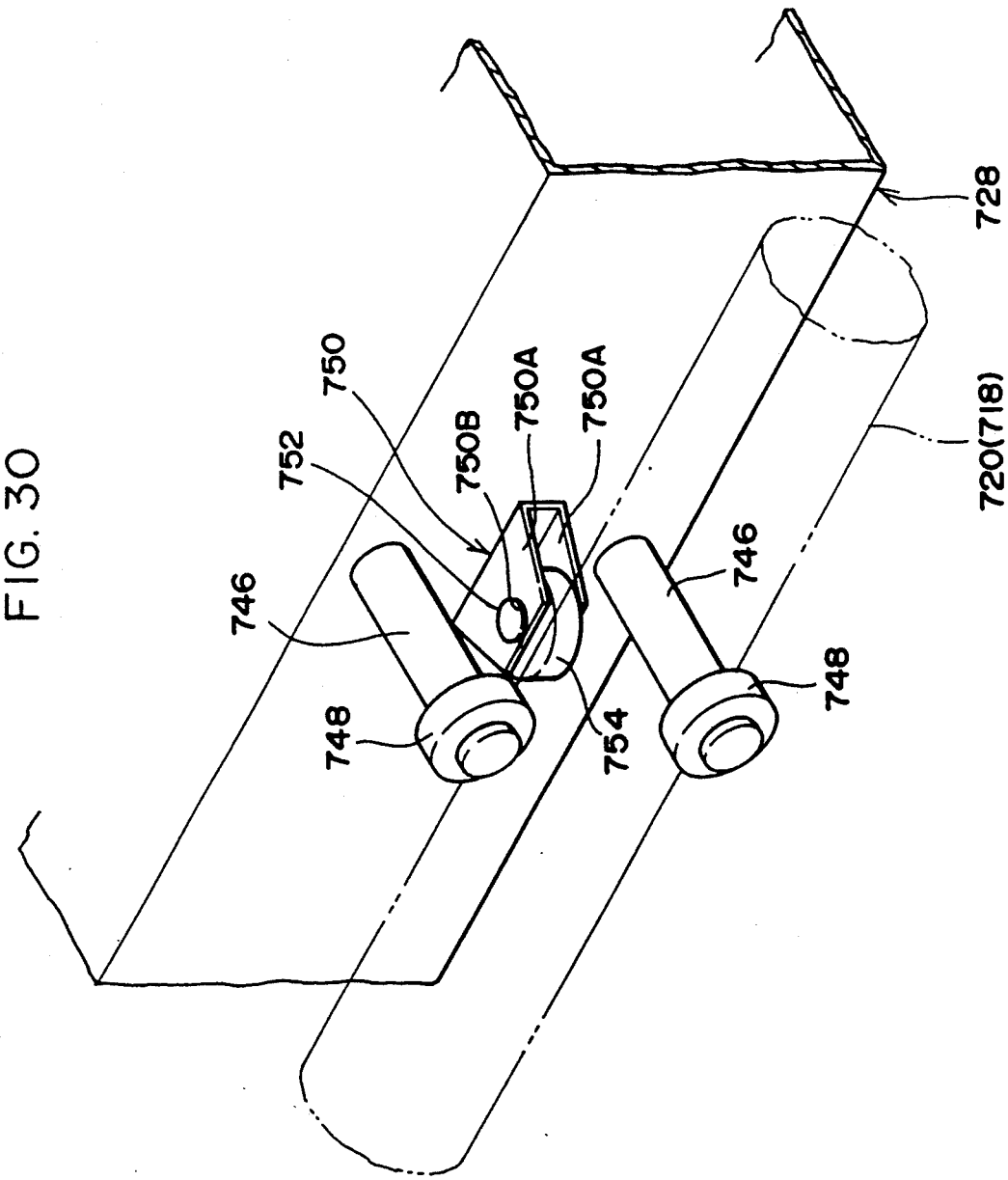
FIG. 30 is an ennlarged view taken along line 30—30 of FIG. 28.

In addition, as shown in FIG. 30, a bracket 750 is disposed between the pair of shafts 746. The bracket 750 is formed with tripod plates 750A running parallel to each other. Circular holes 750B are coaxially provided through each tripod plate 750A. A shaft 752 is suspended over through these circular holes 750B and a roller 754 is supported at the intermediate portion of the shaft 752. The circumferential surface of this roller 754 abuts the lateral surface of the outer circumference of the guide shaft 718 or 728. In consequence, the supporting base 728 is supported against the guide shaft 718 or 720 at six points (by three rollers 748, 754 for each point) while being arranged to move in the axial direction of the guide shafts 718, 720.

The end portion of the guide shaft 720 is spaced apart from that of the guide shaft 24 of the large lid 718, but when the supporting base 728 is moved in the direction of the guide shaft 718, the rollers 748, 754 at its tip end side, as viewed in the moving direction, are separated from the guide shaft 720 to be supported against the guide shaft 718 of the large lid 24. In this case, even when two rollers 748, 754 are separated from the guide shaft 720, the supporting base 728 may be supported against the guide shaft 720. Therefore, while moving, the supporting base 728 is supported by the guide shaft 720 or 718 respectively at both end portions of the supporting base, as viewed in the crosswise direction while, being supported at least two or more points in the traveling direction. As a result, the supporting base 728 passes through the rectangular hole 726 to be smoothly passed over between the guide shaft 720 at the side of the exposure portion 400 and that 718 at the side of the film loading portion 700.

In this case, as shown in FIG. 29, when the supporting base 728 is shifted from the exposure portion 400 toward the film loading portion 700, the roller 744 of the lid member 730, which closes the rectangular hole 726, abuts the supporting base 728, which causes a rotating force to be applied to the lid member 730 in the direction of opening the hole 726 with the shaft as its axis. As a the result, the supporting base is further moved and the roller 744 is rolled from the lateral surface of the supporting base 728 onto its bottom surface so that the lid member 730 is rotated against the force energized by the torsion coil spring 738. That is, opening of the lid member 730 is automatically achieved as the supporting base 728 moves.

As shown in FIG. 29, a blocking member 756 which constitutes part of the light shielding members is mounted on the extreme portion of the lateral surface of the supporting base 728, as viewed in the direction in which it moves toward the film loading portion 700. A circular hole 756A is formed at both end portion of this blocking member 756, as viewed in the longitudinal direction, through which the above-described guide shaft 720 passes.

Formed at the blocking member 756 is a flange portion 756B three edge portions of which are curved at a substantially right angle except for its upper side. This flange portion 756B is opposed to the peripheral edge portion of the rectangular hole 726, with the supporting base 728 moved to the film loading portion 700. A felt-like light shielding member 758 (see FIG. 29) is adhered to the peripheral edge portion of this hole 726. The female part of a magicross (trademark) or the like may be used as this light shielding member 758. In addition, a flange portion 760 curved at a substantially right angle is fixedly attached on the upper side of the hole 726, and its tip end portion may be opposed to the above-described upper piece of the blocking member 756. A light shielding member 762 is adhered to the upper piece. As a result, the supporting base 728 pushes open the lid member 730 to be moved toward the film loading member 700, and when the blocking member 756 is abutting the hole 726, entrance of the light from the hole 726 into the exposure portion 400 can be prevented.

In addition, an oil seal (not shown) is interleaved between the guide shaft 70 and a circular hole 756A through which it passes so that leakage of light from this circular hole 756A may be prevented.

As shown in FIG. 28, a pair of brackets 764 are fixedly attached to the back portion of the blocking member 756 at both end portions, as viewed in the longitudinal direction. Each bracket 764 extends from the upper piece of the blocking member 756 at a substantially right angle in the direction departing therefrom while their tip end portions extend in the direction departing from each other. The tip end portion is anchored to part of a chain 766 via the guide shaft 720. The chain 766 is wound about a pair of sprockets 770 mounted to the body of the apparatus 10 at both end portions of the guide shaft 720, as viewed in its axial direction, via a bracket 768 (only its right side is shown in FIG. 28) to form a loop.

The sprockets 770 at this side of the apparatus 10 are each coaxially fixed to a single shaft 772 to be simultaneously driven.

A screen plate 790 which extends downwardly of the apparatus is mounted to one of the pair of brackets 764. This screen plate 790 is moved along with the supporting plate 728 and two photoelectric sensors 792 are disposed along the locus described by this traveling screen plate 790. The photoelectric sensors 792 are each mounted adjacent to both end portions of the guide rail 720, as viewed in its axial direction, so that the screen plate 790 passes between its light emitting portion and the light receiving portion. The sensors 792 are each connected to the control unit 800. The control unit 800 controls displacement of the supporting pate 728 caused by the motor 776 based on the output signal from the sensor 792 to position the supporting plate 728 at predetermined positions of the exposure portion 400 and the film loading portion 700.

Incidentally, when the supporting plate 728 is positioned at the predetermined position of the film loading portion 700 and entrance of light from the hole 726 into the exposure portion 40 is prevented by the light shielding members 758, 762, locking of the small lid 704 by the locking means 705 is not released. As a result, the original 16 may be charged from the hole 702 by opening the small lid 704. Other than that, when the supporting plate 728 lies stridingly between the exposure portion 400 and the film loading portion 700, locking of the small lid 704 by the locking means 705 is not released, so that entrance of light from the hole 702 into the exposure portion 400 is prevented.

A gear 774 is fixed at the intermediate portion of the shaft 772, as viewed in its axial direction, coupled to a gear 776B mounted to the rotating shaft 776A of the motor 776 via a chain 778. In this case, when the motor 776 is driven, the shaft 772 is rotated via the chain to thereby drive a chain 766. Driving of the chain 766 causes the supporting base 728, which is fixed to part of the chain 766 via the bracket 764, to be moved in the axial direction of the guide shaft 720.

A pair of shafts 780 is suspended between the lateral surfaces 728A and 728B corresponding to both end portions of the guide shaft 720, as viewed in its axial direction. One of the shafts 780 is coupled to the rotating shaft 782A of the motor 782. Gears 780A are each fixed at the inside of the lateral surfaces 728A and 728B of the shaft 780, about which an endless chain 784 is wound so as to drive the chain 784 by driving of the motor 782. A transparent overlay sheet 708 is mounted to the chain 784. This overlay sheet 708 is substantially identical in area to the aperture of the supporting base 728 so that when the chain 784 is driven it is positioned to the lower and upper sides of the gear 780A.

Figure 31:
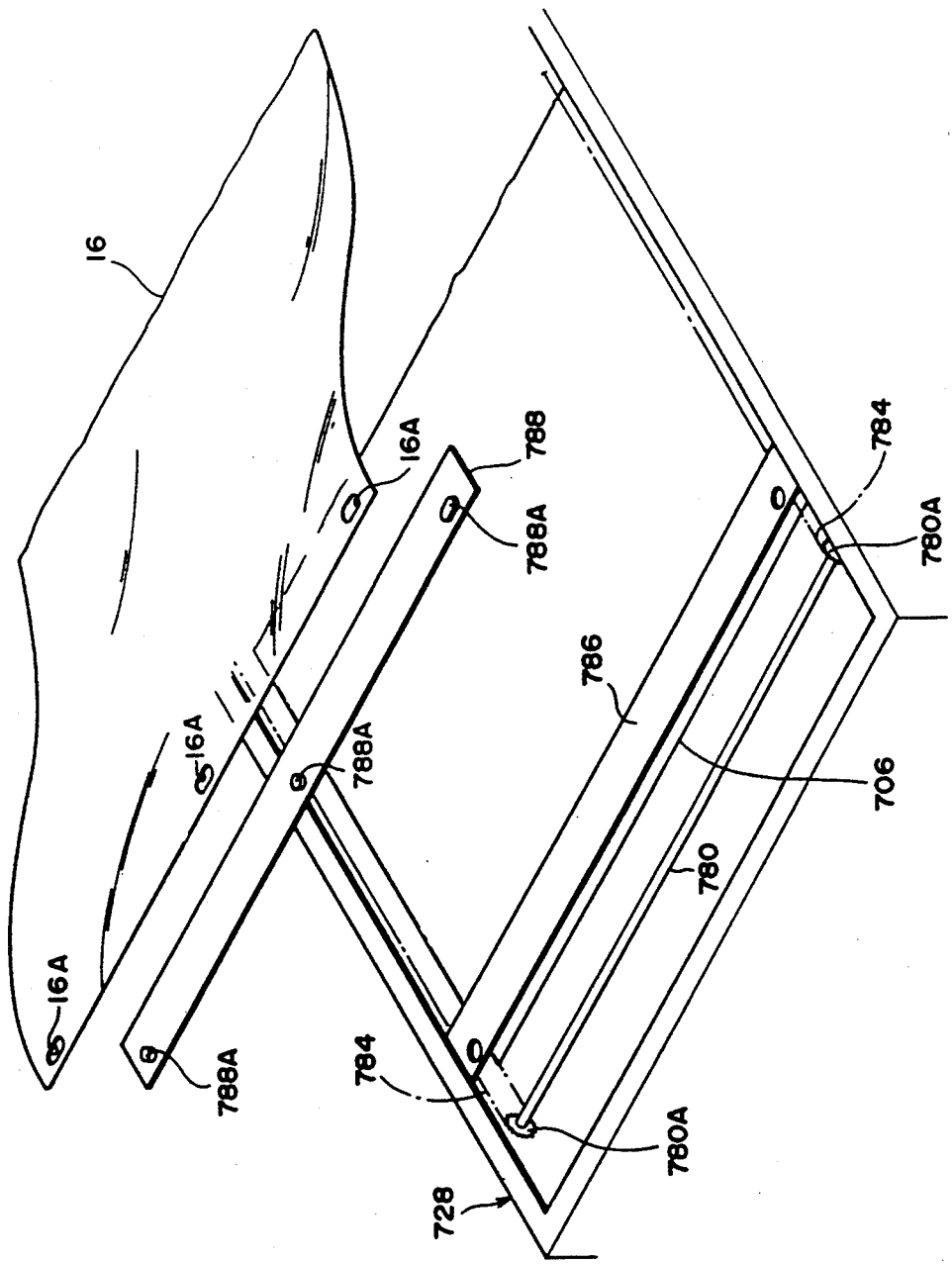
FIG. 31 is an exploded perspective view illustrating how an original is disposed on a supporting base.

In addition, mounted on the upper surface of the supporting base 728, which lies at this side of the apparatus 10, is a positioning plate 786 for positioning the original 16. As shown in FIG. 31, a sizing plate 788 made of metal is fixed to this positioning plate 786 by means of a double side adhesive tape. Three knocking pins 788A are protrudingly formed on the sizing plate 788 in the longitudinal direction of the sizing plate 788. A locking pin 788A at one end of the sizing plate 788 protrudes with an oval cross-sectional form while the other two 788A each protrude with a circular cross-sectional form. The above-described oval knocking pin 788A corresponds in shape to an elongated hole 16A provided through the original 16 while the other two 788A having locking pins 788A have an outer diameter which allows them to be readily inserted into the elongated hole 16A. In this case, the positioning plate 786 and the sizing plate 788 may be fixed to each other by a magnetic force rather than by the adhesive tape.

When the original 16 is charged, with the supporting base 728 positioned at the top loading portion 700, the overlay sheet 708 is disposed to the underside of the gear 780A and the knocking pin 788A is inserted into the circular hole 16A of the original 16 to support the original 16 on the overlay sheet 708.

Meanwhile, when the original 16 is disposed onto the photosensitive material 14 placed on the platen 302, with the supporting base 728 disposed on the exposure portion 400, the motor 782 is driven to move the overlay sheet 708 on to the gear 780A. In this condition, the photosensitive material 14, original 16 and the overlay sheet 708 are laminarly disposed one after another on the platen 302.

(8) Control Unit 800

The control unit 800 is disposed downwardly of an intermediate base 20 of the apparatus 10, that is, downwardly of the platen portion 300.

Figure 32:
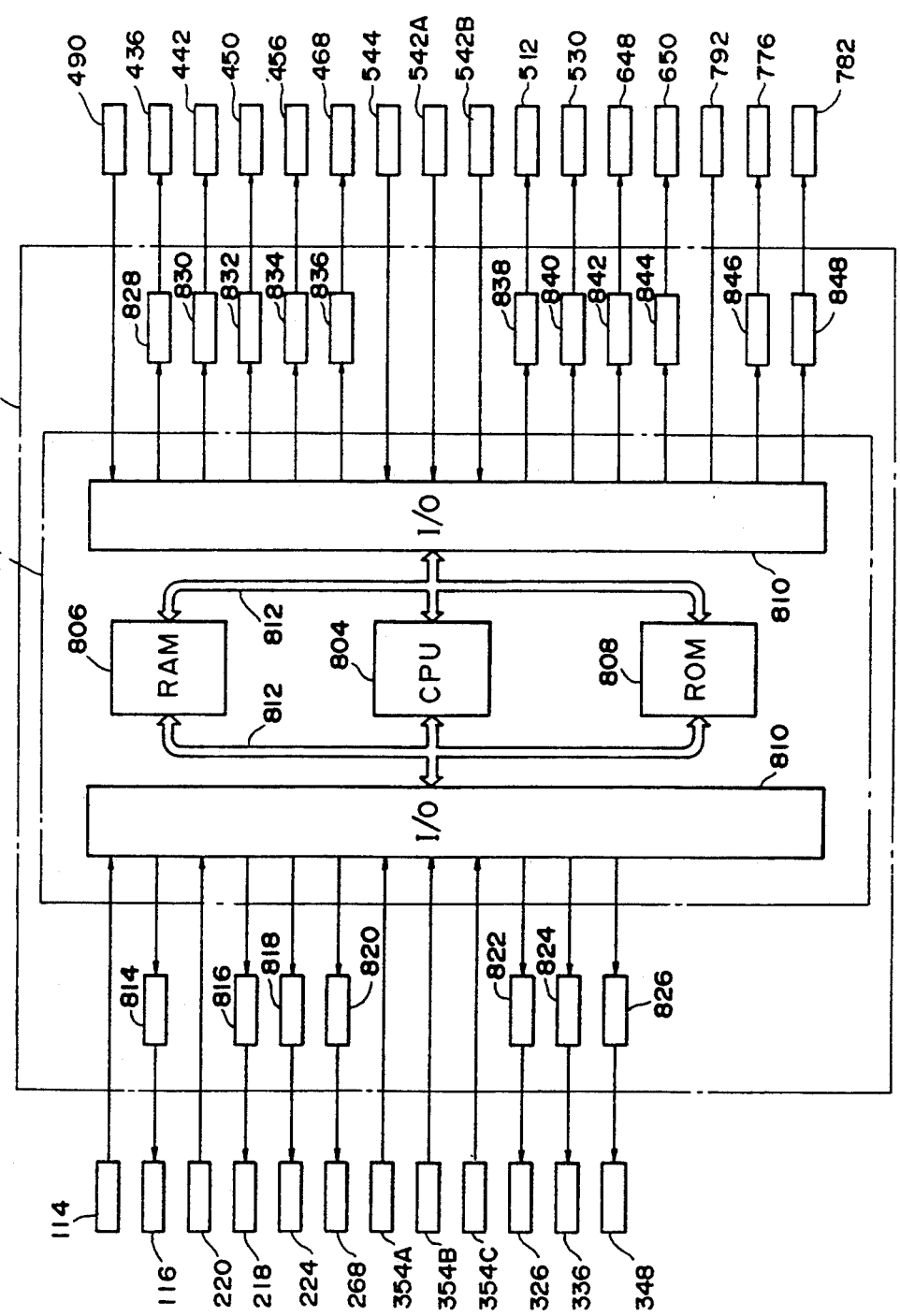
FIG. 32 is a control block diagram.
Figure 33:
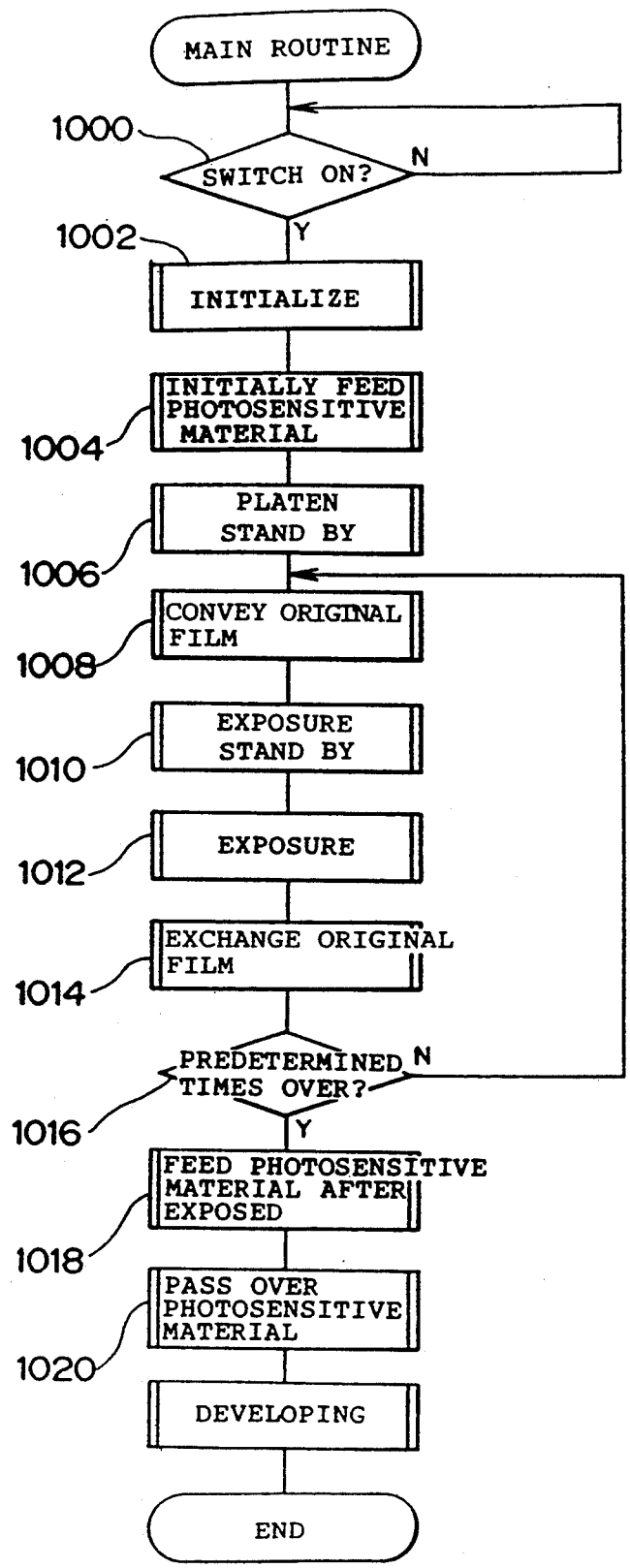
FIGS. 33 through 42 are respectively a control flowchart.
Figure 34:
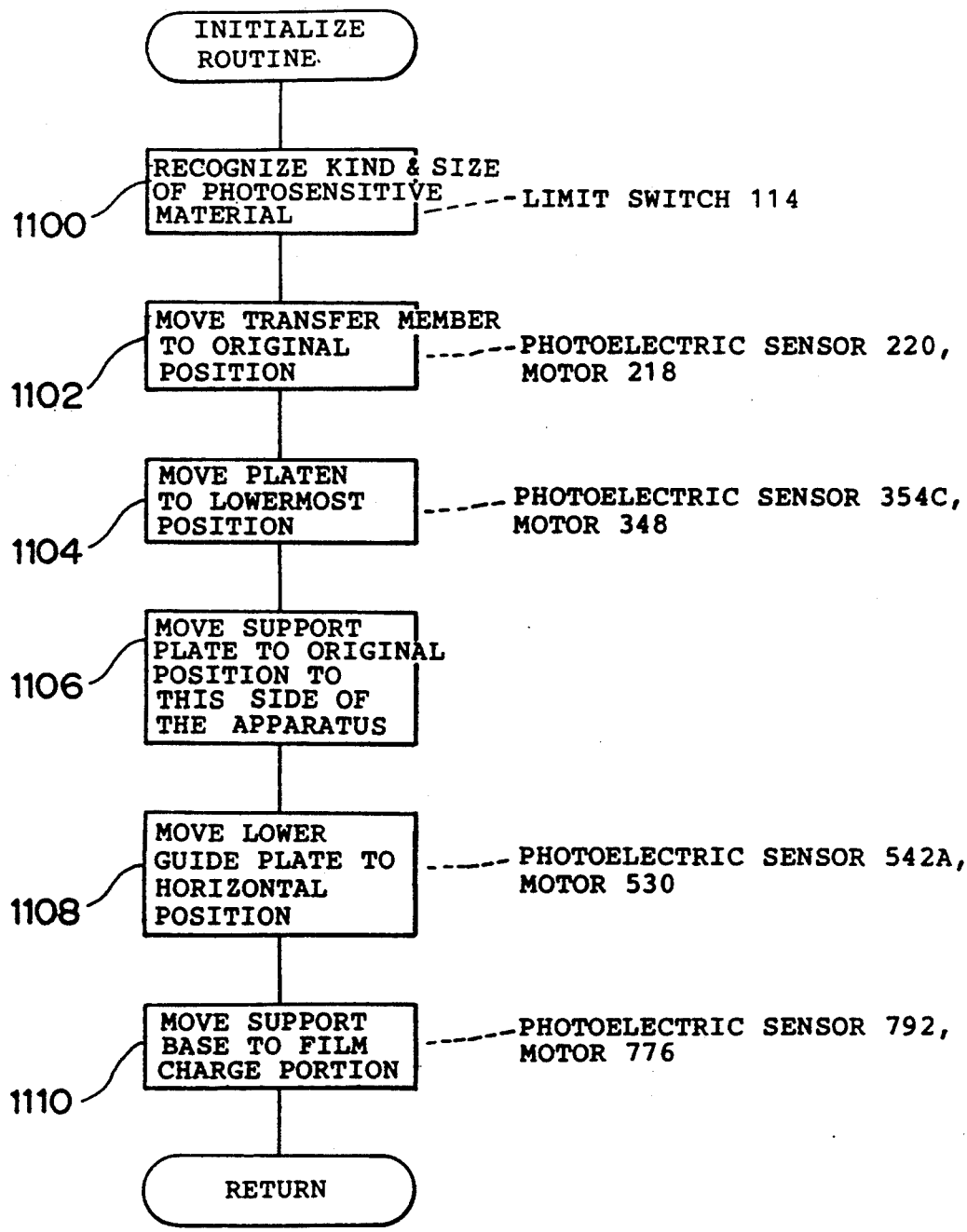
Figure 35:
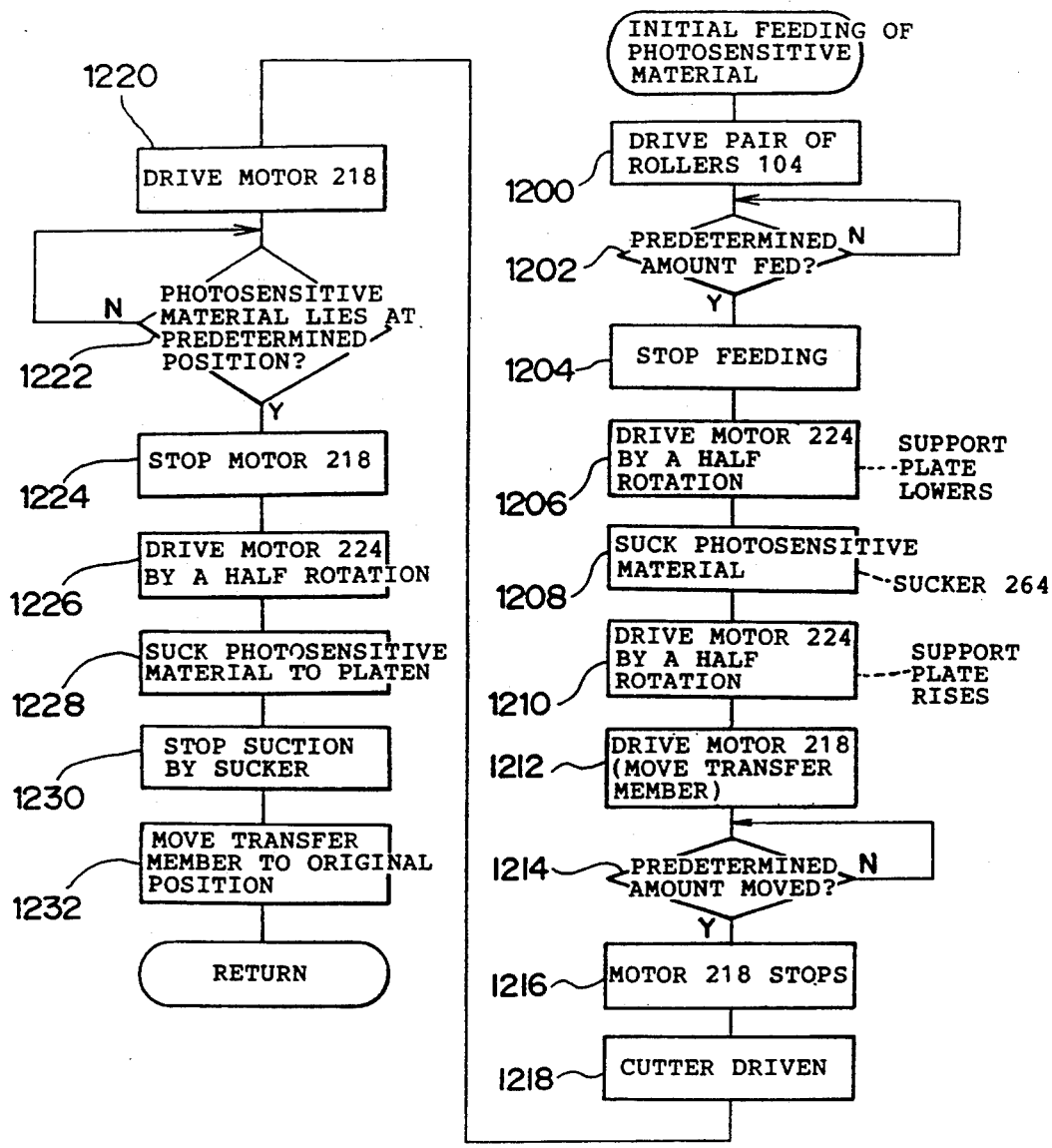
Figure 36:
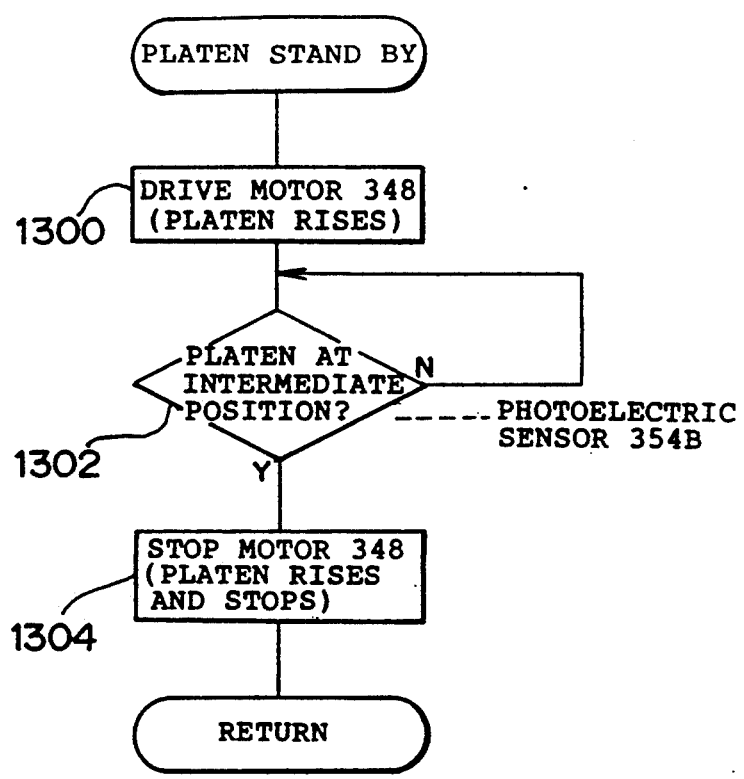
Figure 37:
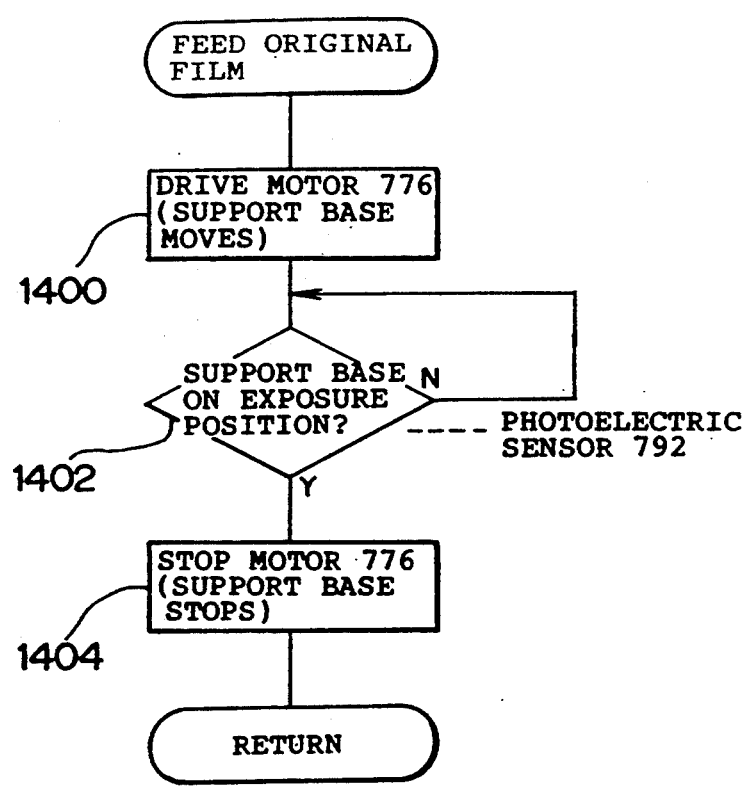
Figure 38:
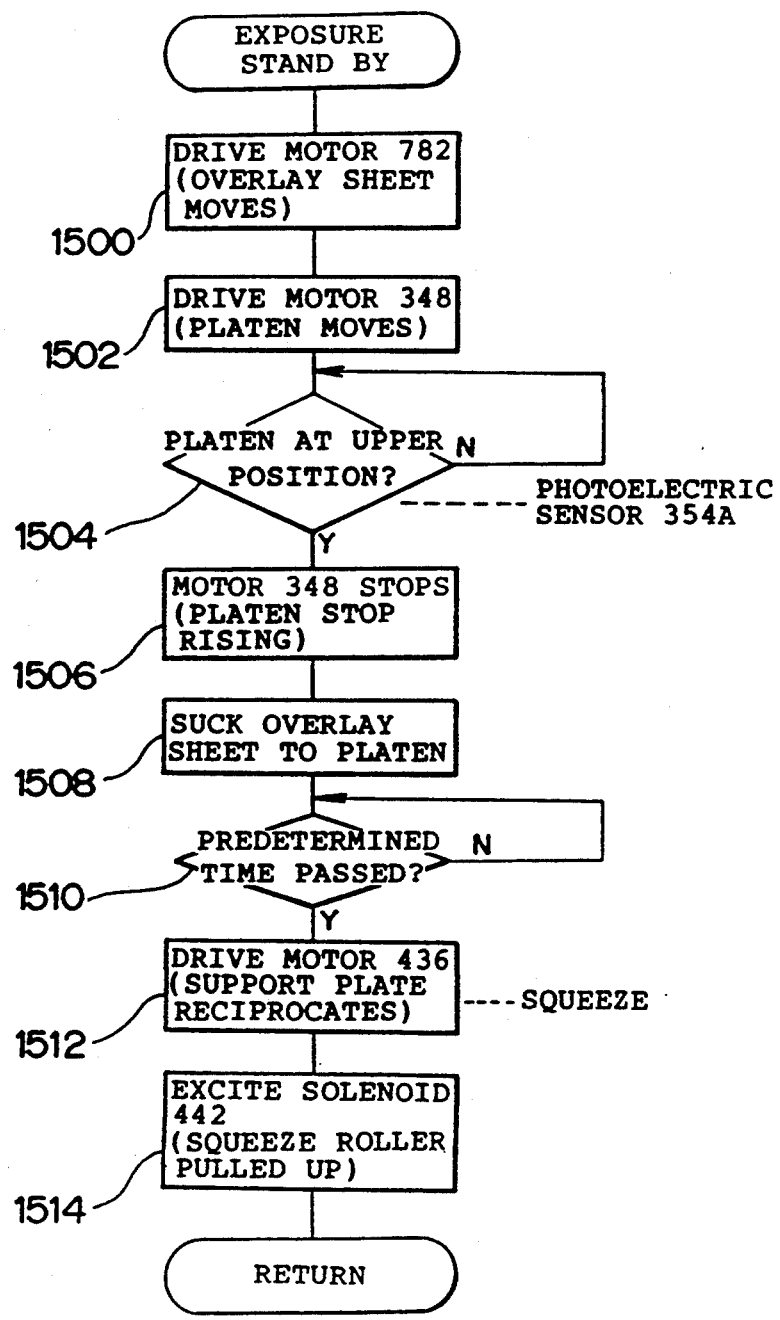
Figure 39:
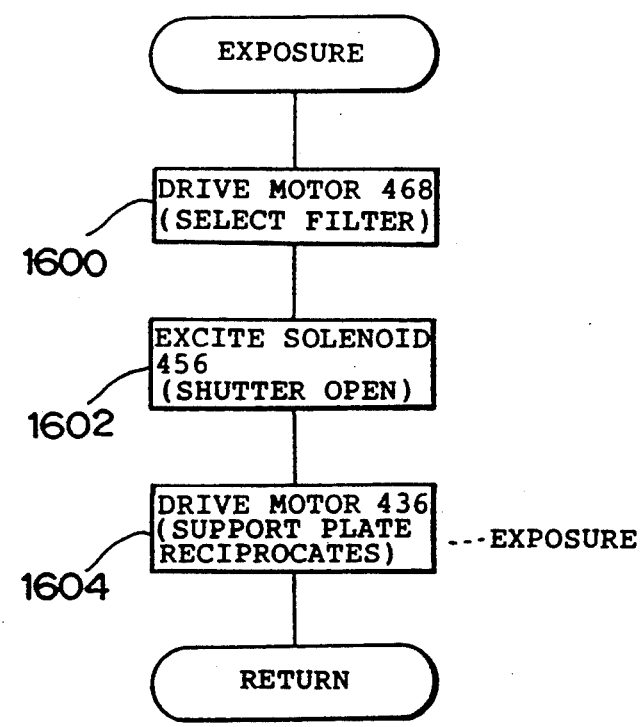
Figure 40:
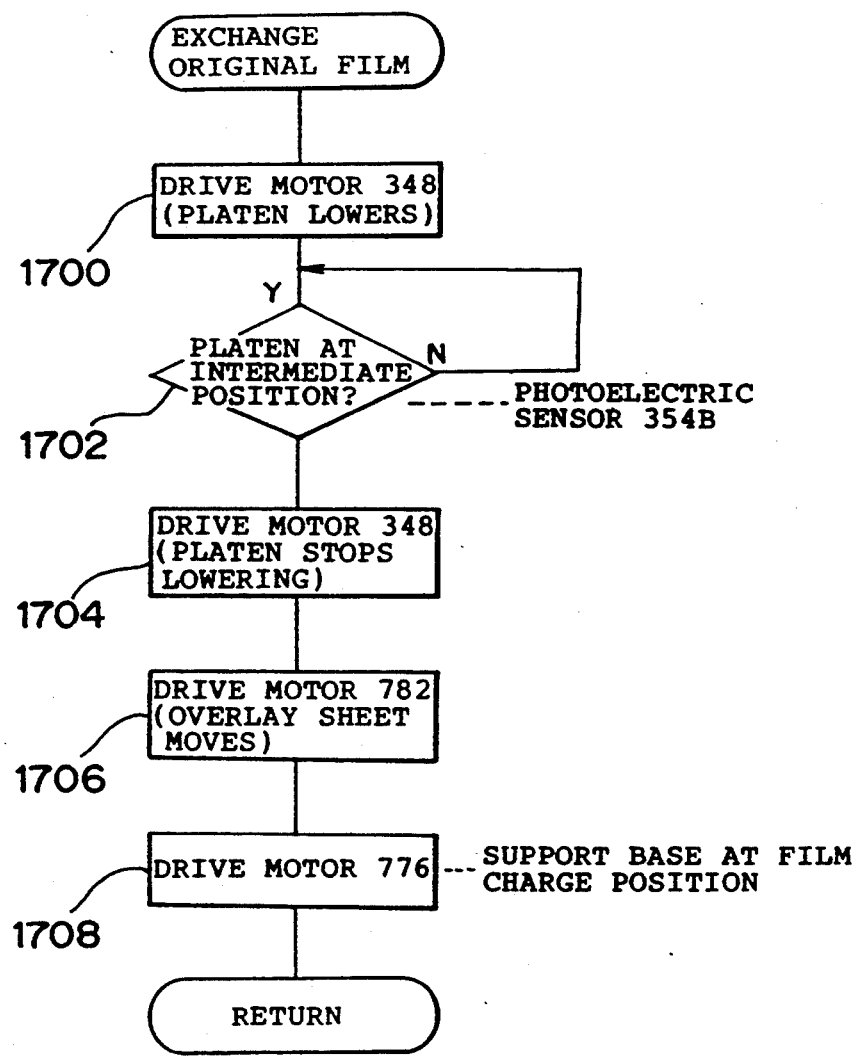
Figure 41:
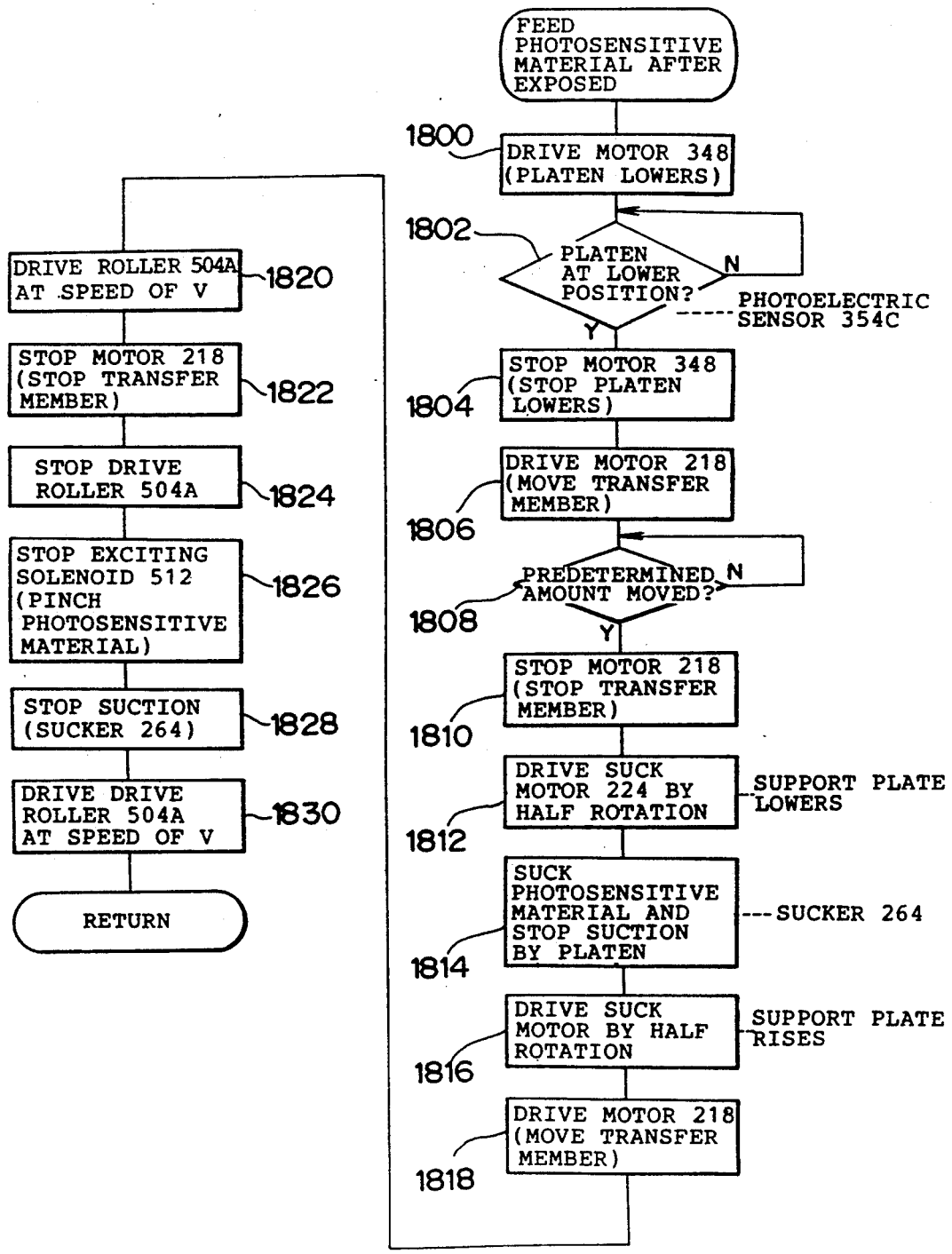
Figure 42:
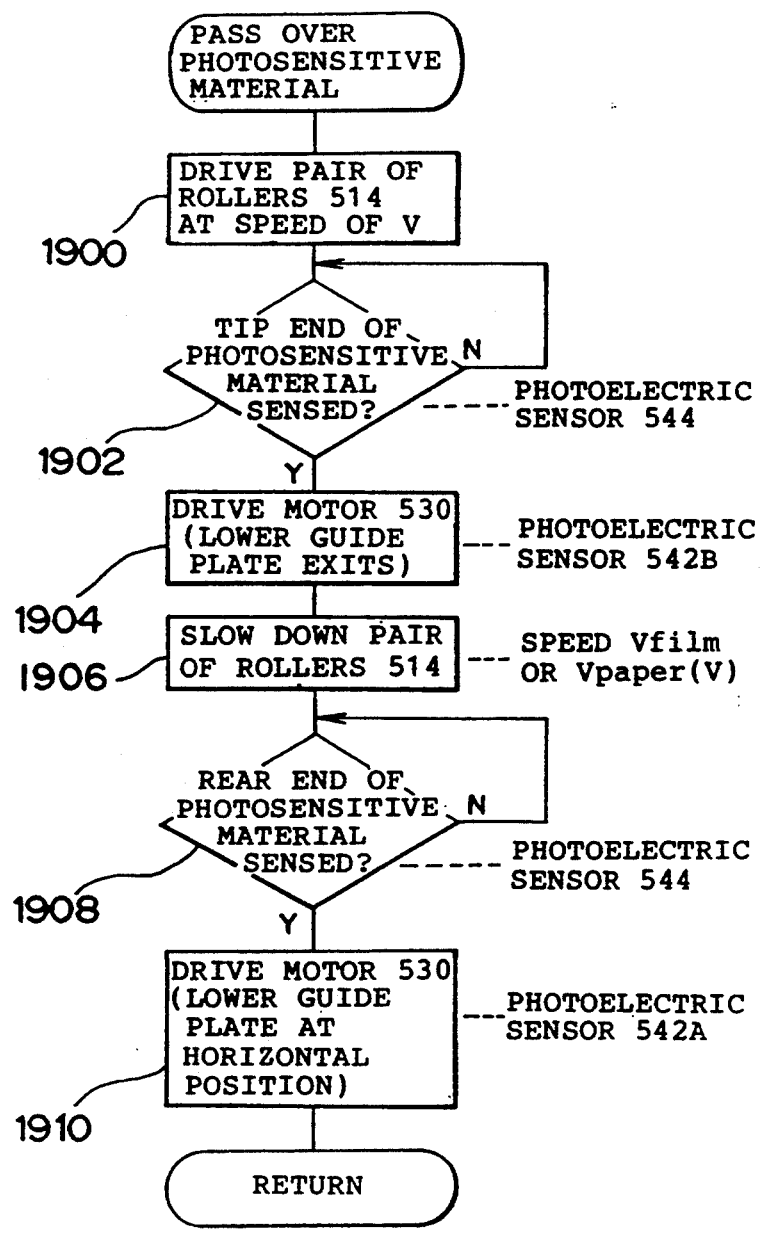

As shown in FIG. 32, the control unit includes a microcomputer 802, which is comprised of a CPU 804, RAM 806, ROM 808, I/O port 810 and buses 812 such as data bus or control bus or the like, for connecting those.

Signal lines of each portion ((1) to (7)) are connected to the I/O port 810 of the microcomputer 802. That is, at the magazine loading portion 100, a signal line of a limit switch 114 is connected to the cutter 116 via a driver 814.

At the photosensitive material feeding portion 200, a photoelectric sensor 220 is connected to the motor 218 via a driver 816, to the motor 224 via a driver 818 and to a solenoid 268 via a driver 826 respectively.

At the platen portion 300, photoelectric switches 354A to C are each connected to a solenoid valve 326 via a driver 822, to a solenoid valve 336 via a driver 824 and to a motor 348 via a driver 826.

At the exposure portion 400, a photoelectric sensor 490 is connected to a motor 436 via a driver 828, to a solenoid 442 via a driver 830, a fluorescent lamp socket 450 via a driver 832, to a solenoid 456 via a driver 836 and to a motor 468 via a driver 836 respectively.

At the photosensitive material transfer portion 500, photoelectric sensors 542A to B and 544 are each connected to a solenoid 512 via a driver 838 and to a motor 530 via a driver 840 respectively.

At the processor portion 600, a fan 648 is connected via a driver 842 while a heater 650 is connected via a driver 844. Incidentally, although not illustrated, a signal line for supplying a driving signal is also connected to drive each pair of rollers at the processor portion 600.

At the film loading portion 700, a photoelectric sensor 792 is connected to a motor 776 via a driver 846 and to a motor 782 via a driver 848 respectively.

The operation of this embodiment s hereinafter described with reference to control flowcharts of FIGS. 33 through 42.

In the first place, in step 1000 of a main routine (FIG. 33), if an operation switch is turned ON, then in step 1002, each portion is initialized (see a initializing routine of FIG. 4). At the magazine loading portion 100, the magazine 102 is charged into the magazine loading chamber 106. If the light reflecting sheet 110 is adhered to the magazine, then the light from the photoelectric sensor 114 is reflected against the light reflecting sheet 110 to pass through the rectangular hole 112 provided on the wall surface 106A internal to the magazine loading chamber 106 to return again to the photoelectric sensor 114. Its number to be adhered and the positions where it is to be adhered are determined depending on the size and kind of the photosensitive material 14 stored within the magazine 102. As a result, the size and kind of the photosensitive material charged in accordance with the on/off signal of the photoelectric sensor 114 can be recognized by the control unit 800. (step 1100)

In the next step 1102, it is determined at the photosensitive material feeding portion 200 whether the transfer member 202 is detected by the left side photoelectric sensor 220 of FIG. 2 or not, and if no, the motor 218 is actuated. Driving of this motor 218 causes the chain 214 to be driven via the sprocket 215 with the result that the transfer member 202 is moved along the rail 210 to be stopped at the left side of FIG. 2, where the sucker 264 departs from the platen 302 to be disposed onto the base plate 279 with a slight gap. In addition, at this position, since the photosensitive material squeeze rollers 274 climb up onto the cam plate 276, a gap through which the photosensitive material 14 passes is also created between the base plate 270 and the squeeze roller 274.

Next, in step 1104, the platen 302 at the platen portion 300 is disposed to the lowermost position. It is determined by the photoelectric sensor 354C whether the screen plate 356 is detected or not, and if not, then the motor 348 is driven to move the rack 340 downwardly by a driving force of the motor 348 transmitted via the gear box 350. At the moment the screen plate 256 is positioned between the light emitting portion and the light receiving portion of the sensor 354C, the rack 340 is stopped. As a result, the platen 270 is stopped at a position flush with the base plate 270.

In step 106, at the exposure portion 400, the supporting plate 406 suspended over to the rail 404 is positioned to this side of the apparatus 10. At this time, the squeeze roller 438 is retained with its rotating shaft 438A climbing up on the bracket 444.

In step 1108, at the photosensitive material transfer portion 500, it is determined by the photoelectric sensor whether the screen plate 538 is detected or not, and if not, the motor 530 is driven to rotate the worm gear 538 mounted about its rotating shaft 532 to thereby rotate the bevel gear 528. This rotation in turn causes the rotating shaft 526 to be rotated in the clockwise direction of FIG. 24. As a result, the lower guide plate 518 is rotated so as to be positioned in the horizontal direction (indicated by a solid line of FIG. 24). When the lower guide plate 518 is positioned in the horizontal plane, the screen plate 538 is detected by the photoelectric sensor 542A to stop driving of the motor 530. This motor 530 has a self-braking function and may be held in the above-described horizontal position because the lower guide plate 518 cannot rotate in the clockwise direction of FIG. 24 by its own weight through engagement of the bevel gear 528 with the worm gear 534.

At the film loading portion 700, in step 1110, it is determined by the right side photoelectric sensor 792 of FIG. 2 whether the screen plate is detected or not. If not, the motor 776 is driven. This driving of the motor 776 causes the sprocket 770 to be rotated to drive the chain 766. Since the supporting base 728 is fixed to part of the chain 766 via the bracket 768, it is moved in the rightward direction of the apparatus 10, as viewed in FIG. 2, as the chain 766 is driven. In addition, the supporting base 728 presses the roller 748 mounted to the lid member 730 as it travels to rotate the lid member 730 against the force energized by the tension coil spring 736 with the shaft as its axis. As a result, the supporting base 728 can be moved toward the film loading portion 700 passing through the rectangular hole 726. When the right side photoelectric sensor 792 of the apparatus 10, as viewed in FIG. 2, detects the presence of the screen plate, driving of the motor 776 is stopped. As a result, the supporting base 728 will be positioned at the film loading position 700. Incidentally, in this condition, since the blocking member 756 of the supporting base 728 blocks the rectangular hole 726 via the light shielding members 758 and 762, entrance of light through the film loading portion into the exposure 400 can be prevented.

In addition, the overlay sheet 708 is retained disposed downwardly of the gear 780A by means of the motor 782.

The sizing plate 788 is magnetically attached to the positioning plate 786 depending on the size of the original 16 applied. The circular hole 16A is provided for the original 16. The knocking pin 788A provided on the sizing plate 788 is inserted into the circular hole 16A to place the original 16 onto the overlay sheet 708. By this, loading operation of the original 116 is completed. Incidentally, although loading of the original 16 is conducted by opening the small lid 704, the small lid 704 is compact and lightweight because the exposure unit or the like is not mounted to the small lid 704. In addition, the supporting base 728 as the carriage cannot be withdrawn into working space. Consequently, loading of the original is thereby eased to improve the working efficiency.

When the initializing of each portion is completed, the procedure is shifted to step 1004 of the main routine, where control over the initial feeding of the photosensitive material (see FIG. 35) is conducted.

First, the photosensitive material 14 is withdrawn form the outlet 108 of the magazine to be conveyed toward the upper portion of FIG. 2. In step 1200, the pair of rollers 104 is driven and the photosensitive material 14 is rolled by the pair of rollers 104 so that its feeding direction is converted by 90 degrees. (step 1200)

The converted photosensitive material 14 passes through the cutter 116 to be inserted into the gap between the base plate 270 and the sucker 264. In this case, since the photosensitive material squeeze roller 274 climbs up onto the cam plate 276 and the rotating shaft 274A is disposed at the upper end of the elongated hole 272A, any interference cannot take place between the photosensitive material 14 and the squeeze roller 274.

After the tip end portion of the photosensitive material 14 is fed into the above-described gap by a predetermined amount (step 1202), the feeding by the pair of rollers 104 is stopped (step 1204).

Next, when, in step 1206, the motor 224 is driven, the cam 228 is rotated by a half rotation via the gear box 226. This rotation of the cam causes the coupling shaft 230 to be rotated about the rotating center of the cam 228 to lower the bearing 234. Since the bearing 234 is fixed to the supporting plate 232 by means of brackets 236A, 236B, the supporting plate 232 lowers. In this case, since the supporting plate 232 is moved toward the transfer member 202 via the fixed base 238 guided by a shaft rod 244, it remans parallel to the transfer member and lowers without being relatively rotated.

As the supporting plate 232 lowers, the lowermost end portion of the sucker 264 comes in contact with the photosensitive material 14 so that the photosensitive material is pinched by this sucker 264 and the base plate 270. In step 1208, in this condition, the solenoid valve 268 which communicates with the suction unit 18 is open to suck the photosensitive material 14 by the sucker 264. In this case, the sucker unit 254 is provided at four points including its reference position, depending on the crosswise size of the photosensitive material 14. The solenoid valve 268 interposed between the sucker unit 254 and the suction unit 18 is controlled depending on the crosswise dimension of the photosensitive material 14 detected by the photoelectric sensor 114 to designate a sucker 264 which performs suction. Therefore, the sucker 264 which is not pinching the photosensitive material 14 generates no suction force.

When the cam 228 is further rotated by a half rotation with the sucker sucking the photosensitive material 14 (step 1210), the supporting plate 232 is returned to the initial position.

In this case, the sucker 264 according to this embodiment is of small diameter and two suckers 264 are provided for each sucker unit 254. As a result, the suction force by a single sucker 264, which is the case with this embodiment, can be made smaller than that of one large diameter sucker when it is disposed one by one. In addition, since the photosensitive material 14 is sucked at numerous points, the photosensitive material 14 cannot ripple in the direction of the wall of the sucker 264.

In the next step 1212, the motor 218 is driven with the photosensitive material 14 sucked by the sucker 264, to move the transfer member 202 in the rightward direction along the rail 210. At this time, the feeding speed of the photosensitive material 14 by the pair of rollers 104 is made to coincide with the traveling speed of the transfer member 202 so that the photosensitive material may be conveyed retaining a constant degree of tension. In addition, the squeeze roller 274 leaves the cam plate 276 to be placed onto the platen 302 via the photosensitive material. As a result, it is moved together with the transfer member 202 without being rotated on the photosensitive material 14.

When the photosensitive material 14 is fed by a predetermined amount depending on its size detected by the photoelectric sensor 114 (step 1214), the transfer member 202 is stopped once (step 1216) and the cutter 116 is actuated (step 1218) to sever the photosensitive material 14. As a result, the photosensitive material 14 of predetermine size can be separated off the rolled photosensitive material 14.

When severance by the cutter 116 is completed, the procedure is shifted to step 1220 where movement of the transfer member is resumed to feed the tip end portion of the photosensitive material 14 to the predetermined position of the platen 302 (steps 1222 and 1224). When the tip end portion of the photosensitive material 14 is positioned to the predetermined position on the platen 302, in step 1226, the motor 224 is rotated to rotate the cam 228 by a half rotation. As a result, the photosensitive material 14 becomes pinched between the sucker 264 and the platen 302. At this time, the solenoid valve 326 which communicates with the sucker 18 is open to suck the photosensitive material 14 by a plurality of holes 308 provided on the platen body 306 (step 1228).

The platen 302 is of triple layer construction with the pattern forming plate 310 pinched by the platen body 306 and the base plate 31, which allows the suction force to be generated for each pattern space in accordance with the size of the photosensitive material 14. In consequence, since air is sucked into the pattern space only through the holes 308 covering the portion on which the photosensitive material 14 is placed, no useless suction results and the photosensitive material 14 can be reliably sucked. Incidentally, this suction is continued until the photosensitive material 14 is conveyed from on the platen 302 after subjected to the exposure operation.

Since the pattern forming plate 310 is formed of a sponge-like soft material, even if the numerous (eight) pattern spaces are present as in this embodiment, each pattern can be formed by a simple punching operation resulting in an excellent workability and a reduced cost. Further, a spacer 318 is inserted into the circular hole 316 of this pattern forming plate 310. Therefore, it is pinched with the platen body 306 and the base pate 312 by the screw 320, only the axial length (2 mm) of the spacer 318 is collapsed and thus the pattern can be readily formed. Incidentally, since the soft member applied to the pattern forming plate 310 is of closed cell structure, no air can leak therefrom.

Next, in step 1230, suction of the photosensitive material 14 by the sucker 264 is released and the cam 228 is rotated again by a half rotation to separate the photosensitive material 14 from the sucker 264. At this time, the squeeze roller 274 remains placed on the photosensitive material 14.

When the suction of the photosensitive material 14 by the sucker 264 is released and the photosensitive material 14 is separated, the transfer member 202 is moved once up to the foremost portion and then moved along the rail 10 so as to return to the initial position (step 1232). At this time, the squeeze roller 274 is moved rotated on the photosensitive material 14. As a result, air bubbles generating between the photosensitive material 14 and the platen 302 can be squeezed to closely attach the photosensitive material 14 onto the platen 302. That is, even if the peripheral edge portion of the photosensitive material 14 cannot be securely sucked by only the holes 308 of the platen 302, or the photosensitive material 14 itself is deformed in the direction of its thickness due to the surrounding environment and the like, it can be reliably and closely adhered onto the platen 302 by the squeezing action of the squeezing roller 274.

Next, in step 1006 of the main routine, a control over the platen stand-by (see FIG. 350) is conducted.

In step 1300, two motors 348 are drive in synchronism to move the rack 340 upwardly, as viewed in FIG. 2, via the gear box 350.

Two sliding shafts 364 are provided at the platen 30. Since the vertical movement of the platen 302 is guided by these sliding shafts 364, the platen 302 is vertically moved while remaining parallel to the intermediate base 20 as the motor 348 is driven.

At this time, when the photoelectric sensor 354B detects the presence of the screen plate 346 (step 1302), driving of the motor 348 is stopped (step 1304).

Next, in step 1400, a control over feeding of the original (see FIG. 7) is conducted.

First, in step 1400, at the film loading portion, the motor 776 is driven, with the original 16 set; to move the supporting base 728 toward the exposure portion 400 along the guide shafts 718, 720. In this case, when the presence of the screen plate 790 is detected by the left side photoelectric sensor 792 of FIG. 2 (step 1402), movement of the supporting base 728 is stopped (step 1404).

The supporting base 728, when positioned at the film loading portion 700, is supported against the guide shaft 718 via the rollers 748, 754. This guide shaft 718 is separated from the guide shaft 720 of the exposure portion 400 at the lateral surface 400 on which the rectangular hole 726 is provided. However, the rollers 748, 754 are provided at six positions of the supporting base 728. Even if the rollers 748, 754, which lie at the tip end of the supporting base 728, as viewed in its traveling direction, are removed from the guide shaft 718 by movement of the supporting base 728, since the supporting base is supported against the shaft 718 at the other four points, these tip end rollers 748, 754 can be smoothly moved from the guide shaft 718 to the guide shaft 720. In addition, the intermediate rollers 748, 754 can be smoothly moved from the guide shaft 718 to the guide shaft 720 because the tip end rollers 748, 754 are supported against the guide shaft 720 while the rear end rollers 748, 754 are supported against the guide shaft 718. Further, the rear end rollers 748, 754 can be also smoothly moved because the tip end and intermediate rollers 748, 754 are supported against the guide shaft 720. That is, since the supporting base 728 is supported against the guide shaft 718 or 720 at least four points, even if they are separated from each other, the movement of the supporting base 728 can be smoothed.

As the supporting base 728 moves toward the predetermined position of the exposure portion 400, the lid member 730 which is open by this supporting base 728 is rotated by the force energized by the torsion coil spring 738, with the shaft 734 as its axis, to close the rectangular hole 726 via the light shielding member 738. As a result, entrance of light from this hole 726 into the exposure portion 400 can be prevented.

Incidentally, when the supporting base 728 lies at a predetermined position of the exposure portion 400, the overlay sheet 708 and the platen 302 remain slightly separated.

Next, in step 1010 of the main routine, a control over the exposure stand-by (see FIG. 38) is conducted.

First, in step 1500, the motor 782 mounted to the supporting base 728 is driven to drive the chain 784. As a result, the overlay sheet 708 is moved with the chain 784 and is inverted by the gear 780A at the innermost side of the apparatus to be moved upwardly of the gear 780A. By this operation, the original 16 placed on the overlay sheet 708 is placed onto the photosensitive material 14.

When the overlay sheet 708 is disposed upwardly of the gear 780A and the original 16 is placed onto the photosensitive material 14, the procedure is shifted to step 1502, here the motor 348 is driven over again and the platen 302 is further elevated. If the screen plate 356 is detected by the photoelectric sensor 354A (step 1504), then driving of the motor 348 is stopped (step 1506) and elevation of the platen 302 is stopped. In this state, the platen 302 and the positioning plate 786 are positioned and the photosensitive material 14, original 16 and the overlay sheet 708 are in laminated contacting state.

At this time, when the solenoid valve 336 which communicates with the suction unit 18 is open, a sucking action is caused on a groove 328 formed on the platen body 306 to suck the peripheral edge of the overlay sheet 708 placed on this groove 328 (step 1508). As a result, the photosensitive material 14 and the original 16 can be retained pinched by the platen 302 and the overlay sheet 708.

When suction of the overlay sheet 78 by the groove 328 has continued over a predetermined period of time (step 1510), in step 1512, the motor 436 at the exposure portion 400 starts to be driven. This driving force of the motor 436 is transmitted to the shaft 430 via the wheel 432 to rotate the sprocket 424. As a result, the chain 426 wound about the sprocket 424 is driven so that the supporting plate 406 is moved from this side toward the innermost side of the apparatus along the rail 404.

At that time, the squeeze roller 438, which had climbed up on the high level portion 444A of the cam bracket 444, is placed onto the platen 302 via the overlay sheet 708 passing through the slanted surface portion 444B. As the supporting plate 406 moves along the rail 404, the squeeze roller 438 is moved while rotating on the overlay sheet 708. In addition, the photosensitive material 14, original 16 and the overlay sheet 708 are sucked and adhered onto the platen 302. As a result, the air which exists between the overlay sheet 708 and the platen 302 is forced out so that the photosensitive material 14 and the original 16 may be completely adhered on the platen 302.

When the supporting plate 406 reaches the innermost end of the apparatus, the squeeze roller 438 is gradually separated from the overlay sheet 708 by the cam bracket 444. When the supporting plate 406 is stopped, in step 1514, the solenoid 442 is energized to withdraw the actuator 442A. As a result, the squeeze roller 438 is lifted up via the suspension bracket 440 for retention. In this case, since the squeeze roller 438 has climbed up on the cam bracket 444, in the lifting stroke, a distance over which the load of the squeeze roller is applied is short, which allows a small-size solenoid 442 with a small energized force to be applied.

Next, in step 1600, a filter (one of B, G, R, BK) corresponding to the kind of the original 16 and the photosensitive material 14 is disposed onto the slit hole 476A by driving of the motor 468.

In addition, in step 1602, when the supporting plate is returned from the innermost side of the apparatus to the original position, the solenoid 456 is driven and the shutter 452 is open so that the slit hole 446A is open.

Accordingly, the light beams from the fluorescent lamp 448 is illuminated from the slit hole 406 through a lens (for example, SELFOC lens).

The image of the original 16 is printed onto the photosensitive material 14 by moving the supporting plate 406 to the original position in this condition (step 1604).

Next, in step 1014 of the main routine, a control over the exchange of the original (see FIG. 40) is conducted.

When the supporting plate 406 is returned to the original position, the platen 302 is lowered (step 1702, 1704) down to a position where the screen plate 356 is detected by the photoelectric sensor 354B, by driving of the motor 348 (step 1700). Next, in step 1706, the motor 782 mounted to the supporting base 728 of the film loading portion 700 is rotated in the same direction as one described above, and the overlay sheet 708 is rotated by a half rotation as the chain 784 is driven. Thus the original can be placed again onto the overlay sheet 708. Incidentally, when this overlay sheet 708 moves, the solenoid valve 336 is closed and suction of the overlay sheet 708 onto the platen 302 is stopped. When the original 16 has been placed onto the overlay sheet 798, the procedure is shifted to step 1708, where the supporting base 728 is moved toward the film loading portion 700 by driving of the motor 776 to be supported against the guide shaft 718. At this time, since locking of the small lid 704 is released, the small lid 704 is open by grasping the handle 706 and the original 16 is exchanged with the next to repeat the above-described exposure control procedure by predetermined times (step 1016 of the main routine). Incidentally, since the exchange of the original 16 can be also readily conducted as in loading the same, working efficiency can be improved.

When the exposure operation is completed, the supporting base 728 is moved toward the film loading portion 700 to stand by supported against the guide shaft 718, and the procedure is shifted from step 1016 to step 1018 of the main routine, where a control over feeding of the exposed photosensitive material is conducted (see FIG. 1).

First, in step 1800, by driving of the motor 348, the platen 302 is lowered down to the lowermost position, where the screen plate 356 is detected by the photoelectric sensor 354C (steps 1802, 1804).

Next, the motor 218 of the photosensitive material feeding portion 200 is driven (step 1806) and the transfer member 202 is moved along the rail 210. When the sucker 264 is moved in a predetermined amount up to the tip end portion of the photosensitive material 14 (step 1808), movement of the transfer member 202 is stopped (step 1810). The program is shifted to step 1812 to drive the motor 224. As a result, the supporting plate 232 is lowered and the photosensitive material 14 is pinched by the sucker 264 and the platen 302. At this time, the solenoid valve 268 which communicates with the suction unit 18 is open to suck the photosensitive material 14 by the sucker 264 while releasing suction of the photosensitive material 14 by the platen 302 (step 1816) to elevate the supporting plate 232 again to retain the photosensitive material 14, which is in the sucked condition (step 1816). Incidentally, at this time, the solenoid valve 326 is closed and suction of the photosensitive material 14 onto the platen 302 is stopped.

In the next step 1818, the transfer member 202 is further moved in the same direction to move the sucker 254 onto the guide 502, and the procedure is shifted to step 1820 to start rotation of the driving roller 504A. At this time, the solenoid 512 has been actuated to move the driven roller 504B in the direction separating from the driving roller 504A. As a result, even if the tip end of the photosensitive material 14 sucked to the sucker 264 is somewhat curled, it can be readily guided between the driving roller 504A and the driven roller 504B so that it may be reliably inserted between the rollers.

When the sucker 264 reaches the extreme tip end to be stopped (step 1822), rotation of the driving roller 504A is stopped once (step 1824) to stop operation of the solenoid 512 (step 1824). As a result, the driven roller 504B is moved in the direction in which it comes in contact with the driving roller 504A and the photosensitive material 14 is pinched. Next, in step 1828, suction of the photosensitive material 14 by the sucker 264 is released and the transfer member 202 is retracted along the rail 210 to return to its original position.

In the next step 1830, rotation of the driving roller 504A is resumed at a speed of V to feed the photosensitive material 14 in the direction of the processor 600.

Next, in step 1020 of the main routine, a control over he photosensitive material passing-over(see FIG. 42) is conducted.

First, in step 1900, the pair of rollers 514 is rotated at a speed equal to that of the above-described pair of rollers 504. As a result, the photosensitive material 14 is conveyed while being pinched by the pair of rollers 504 to be guided into the gap between the upper and lower guide plates 516 and 518 to also be pinched by the pair of rollers 514.

In this case, when, in step 1902, the tip end portion of the photosensitive material 14 reaches the upper portion of the photoelectric sensor 544, it is detected by the sensor 544 to drive the motor 530 (step 1904).

By driving the motor 530, the bevel gear 528 is rotated via the worm gear 534 and the rotating shaft 526 is rotated in the clockwise direction of FIG. 24. As a result, along with the swing base 524, the lower guide plate 518 is rotatingly moved from the position of solid line of FIG. 24 to the position of imaginary line to open the area below the lower surface of the photosensitive material 14.

Next, in step 1906, the feeding speed of the pair of rollers 514 is slowed down to the same speed as that of the processor portion 600 (Vfilm, Vpaper), which is slower than the above-described speed V. As result, a loosening results to the photosensitive material 14 lying between the pair of rollers 504 and the pair of rollers 514, the loosening being formed in a substantially U-form. When the rear end of the photosensitive material 14 passes through the pair of rollers 504, the photosensitive material 14 is stored into the tray 546 retained by the pair of rollers 514.

The photosensitive material 14 is pinched by the pair of rollers 604 of the processor portion 600. The feeding speed of this pair of rollers 604 is slightly faster than that of the above-described pair of rollers 514. Therefore, the photosensitive material 14 is conveyed tensioned between the pair of rollers 514 and the pair of rollers 604. In this case, since an one-way clutch 606 is mounted to the pair of rollers 514, a predetermined tension can be held for the photosensitive material 14.

The photosensitive material 14 is gradually conveyed to the processor portion 600 and when its rear end portion passes through the pair of rollers 514 and then the photoelectric sensor 554 (step 1908), the motor 530 is rotated in the opposite direction in accordance with the signal from the photosensitive material 544 (step 1910)

to rotatingly move the raise guide plate 518 from the position of imaginary line to the position of solid line of FIG. 24 via the swing base 524. As a result, feeding of the next photosensitive material 14 can be reliably guided.

Next, in step 1022 of the main routine, a developing operation is conducted. That is, at the processor portion 600 the photosensitive material 14 is first immersed into the developing tanks 612, 614 and, guided by the pair of rollers 624 and guide plate 626 of the treating rack 622. It is sequentially conveyed in a substantially U-form into the bleaching/fixing tank 616, and then rinsing tanks 618 and 620 for treating. The treated photosensitive material 14 is guided to the drying portion 640 by means of the pair of rollers 642, from which it is conveyed while being pinched by the pair of rollers 643. During this feeding, hot air created by the fan 648 and the heater 650 is delivered out of the port portion 646 of the duct 644 to be blown against the photosensitive material 14 for drying. The photosensitive material 14, which has been dried, is taken out from the outlet 22 formed at the casing 12.

As described above, according to the present invention, the original loading portion having the loading opening provided for loading the original is provided side by side with the exposure portion, and the carriage is arranged so as to move in the substantially horizontal direction between the exposure position of the exposure portion and the copy exchange position corresponding to the above-described loading opening. As a result, the working efficiency as when the original is exchanged can be remarkably improved.

In addition, according to the present invention, the partitioning plate having a window through which the carriage passes is disposed between the original loading portion and the exposure portion, and the light shielding member, moved together with the carriage, may close the window with the carriage positioned at the original loading position to screen the light. As a result, the light shielding member can be made small while its arrangement can be made simple because the driving means for moving the light shielding member becomes unnecessary.

In addition, according to the present invention, the guide shaft is coaxially disposed in the traveling direction of the carriage and separated into the exposure portion side and the original loading portion side with the window as its boundary and is provided at each of both end portions of the carriage, as viewed in its crosswise direction. A plurality of supporting members are interposed between the carriage and the guide shaft. These supporting members are disposed so that while a portion thereof passes through the above-described separating portion the other portion is each supported by the above-described shafts disposed at both end portions of the carriage, as viewed in the crosswise direction and these supporting points amount to at least two or more in the feeding direction. As a result, the carriage can be smoothly moved between the exposure portion and the original loading portion.

Still further, according to the present invention, a lid member is provided corresponding to the window. The lid member closes the window by the force energized by the energizing means while when the carriage moves from the exposure portion toward the original loading portion it is pressed to retract from the closing position of the window against the force energized by the energizing means. As a result, the arrangement of the apparatus is simplified and the exposure portion can be reliably screened.

What is claimed is:

1. Apparatus for making a color proof comprising:
   a platen portion to which a photosensitive material and an original film are each fed and positioned;
   an exposure portion disposed in opposition to said platen portion for printing an image recorded on the original film onto the photosensitive material;
   an original film loading portion disposed at a side of the exposure portion and extending parallel thereto, said original film load portion having a loading opening for loading the original film;
   a lid member for opening and closing the loading opening;
   a carriage, on which the original film can be placed, capable of horizontally moving between the exposure stage of said exposure portion and an original film exchange position, which faces the loading opening, provided at the original film loading portion so that the original film can be placed on the carriage when the carriage is positioned at the original film exchange position;
   a processor portion provided at a side of the platen portion for processing the photosensitive material after exposure; and
   a transfer portion for transferring the photosensitive material, onto which the image has been exposed, from said platen portion to said processor portion.

2. Apparatus as defined in claim 1 further comprising:
   a partitioning plate disposed between the original film loading portion and the exposure portion the positioning plate having a window formed therein for permitting movement of the carriage between the original film exchange position and the exposure position; and
   a first light shielding plate movable along with the carriage for closing the window as the carriage is positioned at the original film exchange position to shield the exposure portion from the original film loading portion.

3. Apparatus as defined in claim 2 further comprising:
   a lid member provided corresponding to the window for closing the window due to the force of an urging means and said lid member being retracted from the closing position of the window against the force of the urging means by being pressed by the carriage as the carriage is moved from the exposure portion toward the original film loading portion.

4. Apparatus as defined in claim 3 wherein a second light shielding means is provided at the partition plate at the periphery of the window to shield the exposure portion from the film loading portion by contacting the edge portion of the lid member with the shielding means as the window is closed by the lid member.

5. Apparatus as defined in claim 4 wherein the lid member is provided with a roller, which is first pressed against the top end surface of the carriage in the traveling direction, to retract the lid member from the closing position and then contacts the bottom surface of said carriage while rotating.

6. Apparatus as defined in claim 2 wherein the first light shielding means comprises a closing member supported by the lateral end portion of the exposure portion of the carriage for abutting against the surface of the exposure portion side of the partition plate at the periphery of the window when the carriage reaches the original film exchange portion to shield light.

7. Apparatus as defined in claim 2 further comprising:

an inhibitor means for inhibiting movement of the lid member in the direction of opening the loading opening when the window is not closed by the first light shielding means.

8. Apparatus as defined in claim 2 further comprising:

guide shafts each disposed at both side edge portions of the carriage respectively and extending in the transverse direction and separated by the window, which forms a boundary dividing said guide shafts into an exposure portion side and an original film loading portion side, so that the carriage can run coaxially in the traveling direction of the carriage along the guide shafts; and a plurality of supporting means interposed between the carriage and the guide shaft to support the carriage on the guide shaft while when a part of the carriage passes through the boundary the other part thereof is supported on the guide shafts, said supporting means providing at least two or more supporting points along the traveling direction of said carriage.

9. Apparatus as defined in claim 8 wherein the supporting means is provided with a roller means for smoothly moving said carriage.

10. Apparatus for making a color proof comprising:

a magazine loading portion for loading a magazine in which the photosensitive material is wound in a roll;

a platen portion for positioning said photosensitive material, which is pulled out from the magazine and cut to a predetermined length, and an original film;

an exposure portion disposed in opposition to the platen portion for printing an image recorded on the original film onto the photosensitive material;

an original film loading portion disposed side by side at the exposure portion and provided with a loading opening for loading the original film;

a lid member capable of swinging between the closing position for closing the loading opening and the opening position for opening the loading opening;

a carriage capable of moving in a substantially horizontal direction between an exposure position of the exposure portion and an original film exchange position disposed at said original film loading portion and facing the loading opening, and for placing or exchanging the original film when the carriage is positioned at the original film exchange position;

a processor portion disposed at a side of said platen portion for processing the photosensitive material after exposure thereof as well as for drying the photosensitive material after processing; and a transfer portion for transferring the image-exposed photosensitive material from the platen portion to the processor portion.

11. Apparatus as defined in claim 10 further comprising:

a partitioning plate disposed between the original film loading portion and the exposure portion, and having a substantially rectangular window formed therein for permitting movement of said carriage between the original film exchange position and the exposure position; and a first light shielding member moved along with said carriage for closing the window as the carriage is positioned at the original film exchange position, to shield the exposure portion from the original loading portion.

12. Apparatus as defined in claim 11 further comprising:

a lid member provided corresponding to the window, said lid member being swingable between a first position for opening the window and a second position for closing the window, and being capable of closing the window by an urging force of a spring, the lid member being swung from the second position toward the first position against the urging force of the spring by being pressed by the carriage as the carriage is moved from the exposure position toward the original film exchange position.

13. Apparatus as defined in claim 12 wherein a second light shielding member is provided at the partition plate in the periphery of the window to shield the exposure portion from the original film loading portion by contacting the edge portion of the lid member with the shielding member when the window is closed by the lid member.

14. Apparatus as defined in claim 13 wherein the lid member is provided with a roller, which is first pressed by the top end surface of the carriage in its traveling direction, to swing the lid member from the second position to the first position, as the carriage is moved from the exposure position toward the original film exchange position, and thereafter, the roller contacts the bottom surface of the carriage to guide the movement of the carriage while the roller rotates.

15. Apparatus as defined in claim 11 wherein the first light shielding member comprises a closing member supported by the lateral end portion of the exposure portion of the carriage for abutting the surface of the exposure portion side of the partition plate a the periphery of the window when the carriage reaches the original film exchange position to shield light.

16. Apparatus as defined in claim 11 further comprising:

a locking means for preventing movement of the lid member in the direction of opening the loading opening when the window is not closed by the first light shielding member.

17. Apparatus as defined in claim 1 further comprising:

a first pair of guide shafts disposed at both side edge portions of the carriage respectively in the transverse direction when the carriage is located at the exposure portion;

a second pair of guide shafts disposed coaxially with the first guide shafts, and separated therefrom by the window, said second pair of guide shafts extending along both side edge portions of the carriage respectively, in the transverse direction thereof, when the carriage is located at the original film position; and a plurality of supporting means mounted at predetermined intervals on the carriage for supporting the carriage on the first pair of guide shafts as the carriage positioned at the exposure position and for supporting the carriage on the second pair of guide shafts as the carriage is positioned at the original film exchange position so that when the carriage passes through the window the carriage is supported by the first and second guide shafts at at least two points in the traveling direction of the carriage.

18. Apparatus as defined in claim 17 wherein the supporting means is provided with a roller for smoothly moving the carriage.

* * * * *